(12) United States Patent
Sekine

(10) Patent No.: US 7,123,424 B2
(45) Date of Patent: Oct. 17, 2006

(54) OBJECTIVE LENS FOR OPTICAL INFORMATION RECORDING MEDIUM

(75) Inventor: Minoru Sekine, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/149,270

(22) Filed: Jun. 10, 2005

(65) Prior Publication Data

US 2005/0275955 A1 Dec. 15, 2005

Related U.S. Application Data

(63) Continuation of application No. PCT/JP03/15802, filed on Dec. 10, 2003.

(30) Foreign Application Priority Data

Dec. 10, 2002 (JP) ............... 2002-357564

(51) Int. Cl.
G02B 3/02 (2006.01)
G11B 7/00 (2006.01)

(52) U.S. Cl. ............... 359/719; 359/718; 369/112.23

(58) Field of Classification Search ............... 359/718, 359/719, 796; 369/112.11, 112.23
See application file for complete search history.

(56) References Cited

U.S. PATENT DOCUMENTS

| | | | | |
|---|---|---|---|---|
| 4,938,573 | A * | 7/1990 | Saito | 359/719 |
| 5,852,508 | A * | 12/1998 | Kubota et al. | 359/355 |
| 5,936,782 | A * | 8/1999 | Nomura et al. | 359/719 |
| 5,986,818 | A | 11/1999 | Hashimura | |
| 6,236,513 | B1 * | 5/2001 | Mallary | 359/642 |
| 6,373,807 | B1 | 4/2002 | Ohtaki et al. | |
| 6,982,838 | B1 * | 1/2006 | Maruyama et al. | 359/719 |
| 6,995,929 | B1 * | 2/2006 | Hendriks | 359/719 |
| 2001/0028514 | A1 * | 10/2001 | Asoma | 359/719 |
| 2003/0103271 | A1 * | 6/2003 | Ohta | 359/719 |

FOREIGN PATENT DOCUMENTS

| | | |
|---|---|---|
| EP | 1 117 096 | 7/2001 |
| EP | 1 174 866 | 1/2002 |
| EP | 1 184 855 | 3/2002 |
| JP | 61-9601 | 1/1986 |
| JP | 62-14109 | 1/1987 |
| JP | 5-100161 | 4/1993 |
| JP | 8-227002 | 9/1996 |
| JP | 2000-90477 | 3/2000 |
| JP | 2001-13406 | 1/2001 |
| JP | 2001-216678 | 8/2001 |
| JP | 2002-6210 | 1/2002 |
| JP | 2002-55274 | 2/2002 |
| JP | 2002-237078 | 8/2002 |
| JP | 2003-232997 | 8/2003 |
| JP | 2004-29050 | 1/2004 |

* cited by examiner

Primary Examiner—David N. Spector
(74) Attorney, Agent, or Firm—Oblon, Spivak, McClelland, Maier & Neustadt, P.C.

(57) ABSTRACT

An objective lens capable of recording or reproducing informations of HD, DVD and CD is provided. A reference lens 2a and a close-contact lens 2b are closely in contact and bonded, the material of the close-contact lens 2b is different from the material of the reference lens 2a, a lens surface of the reference lens and a lens surface of the close-contact lens have aspherical shapes, the reference lens has a light-converging function, and the close-contact lens has a region providing a positive refractive power and a region providing a negative refractive power to construct an objective lens for optical information recording media.

31 Claims, 35 Drawing Sheets

— SAG Value of 1st surface
—△— SAG value of 2nd surface
—○— SAG value of 3rd surface — θ of 1st surface
-o- θ of 2nd surface
-△- θ of 3rd surface Wavefront aberration at HD (λ=405 nm)

Wavefront aberration at DVD (λ=655 nm)

— SAG value of 1st surface
-○- SAG value of 2nd surface
-△- SAG value of 3rd surface Distance from optical axis (mm)

— θ of 1st surface
—o— θ of 2nd surface
—△— θ of 3rd surface

Wavefront aberration at HD ($\lambda$=405 nm)

Wavefront aberration at DVD ($\lambda$=655 nm)

Distance from optical axis (mm)

— θ of 1st surface
—o— θ of 2nd surface
—△— θ of 3rd surface

Wavefront aberration at HD (λ=405 nm)

Wavefront aberration at DVD (λ=655 nm)

Distance from optical axis (mm)

—— θ of 1st surface
—○— θ of 2nd surface
—△— θ of 3rd surface

Wavefront aberration at HD (λ=405 nm)

Wavefront aberration at DVD (λ=655 nm)

Wavefront aberration at CD (λ=785 nm)

— SAG value of 1ˢᵗ surface
-o- SAG value of 2ⁿᵈ and 3ʳᵈ surface
-△- SAG value of 4ᵗʰ surface — θ of 1st surface
—○— θ of 2nd surface and 3rd surface
—△— θ of 4th surface Wavefront aberration at HD (λ=405 nm)

Wavefront aberration at DVD (λ=660 nm)

— SAG value of 1st surface
-○- SAG value of 2nd and 3rd surface
-△- SAG value of 4th surface Wavefront aberration at HD (λ=405 nm)

Wavefront aberration at DVD (λ=655 nm)

Wavefront aberration at CD (λ=785 nm)

OBJECTIVE LENS FOR OPTICAL INFORMATION RECORDING MEDIUM

TECHNICAL FIELD

The present invention relates to an objective lens to be employed in an optical pickup device which is suitable for recording or reproducing a blue-laser optical disk (HD), a digital video disk (DVD) and a compact disk (CD) and has a performance of diffraction limit, and relates to such an optical pickup device.

TECHNICAL BACKGROUND

Heretofore, as shown in FIG. 2, as an objective lens to be employed for an optical pickup device suitable for recording or reproducing HD or DVD, an optical pickup has been reported (refer to JP-A-2000-90477. Hereinafter, referred to as Patent Document 1), which employs as an objective lens 62 a complex lens constituted by a reference lens 62a having a converging power made of a synthesized resin or a glass material and a close-contact lens 62b made of a UV-curable resin material in close contact with the reference lens 62a.

Here, in FIG. 2, 62e indicates a surface of the reference lens 62a on the side of a light source (a surface of an objective lens 62 on the side of the light source), 62f indicates a surface of the reference lens 62a on the side of an optical disk (a surface of the close-contact lens 62b on the side of the light source) and 62g indicates a surface of the close-contact lens 62b on the side of the optical disk.

According to this conventional example, it is reported to be possible to compensate chromatic aberrations for two laser light beams of different wavelengths including a red laser light beam of wavelength of about 650 nm and a blue laser light beam of wavelength of about 430 nm.

According to this conventional example, a compatible performance can be obtained for optical disks of HD having a plurality of protective layers and of DVD having a plurality of protective layers. However, there is no specific description as to the thickness of the protective layers of these optical disks or the numerical aperture of the objective lens, and examples of this conventional example only describes as to a wavefront aberration for blue laser light and a wavefront aberration for red laser light, and it is unclear that correction to the spherical aberration can actually be effected when how much difference is given between the thickness of the protective layers.

Further, there is no description in the Patent Document 1 as to recording or reproducing of an information of CD by employing a red laser light of wavelength of about 780 nm. Therefore, it is considered that the conventional example does not have a compatible performance of recording or reproducing HD, DVD and CD, and there has been a problem that recording or reproducing of CD has not been possible.

DISCLOSURE OF THE INVENTION

The present invention has been made to solve the above mentioned problems, and it is an object of the present invention to provide an objective lens for an optical pickup having a high optical performance of a diffraction-limit performance for light such as laser light of wavelength of about 405 nm, wavelength of about 650 nm and a wavelength of about 780 nm, and to provide such an optical pickup device.

The present invention provides an objective lens for an optical information recording medium, comprising a reference lens and a close-contact lens bonded or joined so as to be closely in contact or substantially closely in contact with a lens surface of the reference lens, the material of the close-contact lens being a material different from the material of the reference lens, and the lens surface of the reference lens and a lens surface of the close-contact lens each having an aspherical shape, wherein the reference lens has a converging function, and the close-contact lens has a region providing a positive refractive power and a region providing a negative refractive power.

Further, the present invention provides an objective lens for an optical information recording medium, comprising a reference lens and a close-contact lens bonded or joined so as to be closely in contact or substantially closely in contact with a lens surface of the reference lens, the material of the contact lens being different from the material of the reference lens, and the lens surface of the reference lens and a lens surface of the close-contact lens each having an aspherical shape, wherein the reference lens has a converging function, and a close-contact lens-outer surface has an aspherical shape where the close-contact lens-outer surface is a surface of the close-contact lens on the side opposite from the reference lens, and the close-contact lens-outer surface has a region in which the aspherical shape of the close-contact lens-outer surface deviates in the direction opposite from the reference lens as the distance from the optical axis increases.

Further the present invention provides an objective lens for an optical information recording medium, comprising a reference lens and a close-contact lens bonded or joined so as to be closely in contact or substantially closely in contact with a lens surface of the reference lens, the material of the close-contact lens being different from the material of the reference lens, and the lens surface of the reference lens and a lens surface of the close-contact lens each having an aspherical shape, wherein the reference lens has a converging function, each surface of the close-contact lens has an aspherical shape, and when a plane perpendicular to the optical axis is designated as a reference plane and an angle between the reference plane and a tangential plane tangential to an optional point within the effective diameter of one surface or both surfaces of the close-contact lens, is designated as $\theta$, the one surface or the both surfaces of the close-contact lens have such a shape that when the optional point is moved from the top of the surface towards the outer periphery, the optional point moves to the side of increasing the thickness of the close-contact lens as the distance from the optical axis increases, and wherein the one surface or the both surfaces of the close-contact lens have such a shape that when the optional point is moved until the outer-most periphery of the effective diameter, the value and the sign of $\theta$ change and there is at least one point where $\theta$ is 0° other than the top point.

Further, the present invention provides an optical pickup device which converges, for recording or reproducing a blue-laser optical disk, light of wavelength from 385 to 425 nm emitted from a light source on an information recording plane of the blue-laser optical disk through the objective lens, and irradiates a photo-receiving element with reflected light from the information recording plane through the objective lens to record or reproduce data of the information recording plane, which converges, for recording or reproducing of a digital video disk, light of wavelength from 617 to 683 nm from a light source on an information recording plane of the digital video disk through the objective lens, and irradiates a photo-receiving element with reflected light from the information recording plane through the objective lens to record or reproduce data of the information recording plane, and which converges, for recording or reproducing of a compact disk, light of wavelength from 745 to 825 nm from a light source on an information recording plane of the compact disk through the objective lens, and irradiates a photo-receiving element with reflected light from the information recording plane through the objective lens to record or to reproduce data of the information recording plane.

Further, the present invention provides an optical pickup device which converts, for recording or reproducing blue-laser optical disk or of a digital video disk, light from a light source into a parallel light, transmits the light through the objective lens, and converges it on an information recording plane of the blue-laser optical disk or on an information recording plane of the digital video disk, and irradiates a photo-receiving element with reflected light from the information recording plane of the blue-laser optical disk or from the information recording plane of the digital video disk through the objective lens to record or reproduce data of the information recording plane, and which, for recording or reproducing a compact disk, makes a light from a light source incident in the objective lens as a divergent light and transmits it through the objective lens so as to converge the light on an information recording plane of the compact disk, and irradiates a photo-receiving element with reflected light from the compact disk through the objective lens to record or reproduce data of the information recording plane.

BEST MODE FOR CARRYING OUT THE INVENTION

Figure 1:
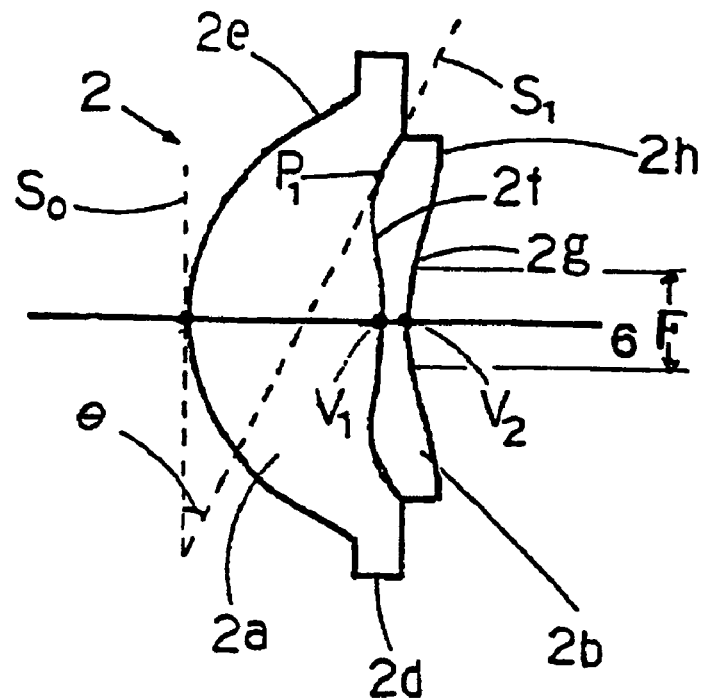
FIG. 1 is a view showing the construction of an example of the objective lens of the present invention.
Figure 2:
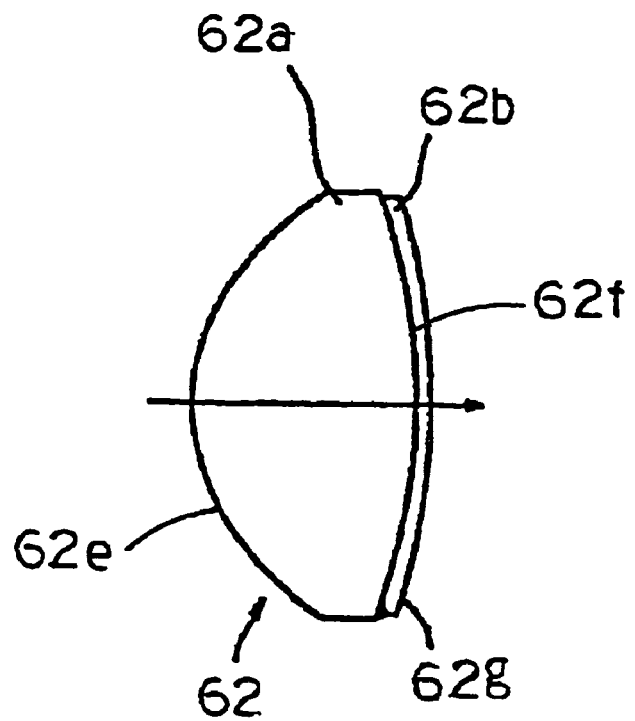
FIG. 2 is a view showing the construction of an objective lens of a conventional example.
Figure 3:
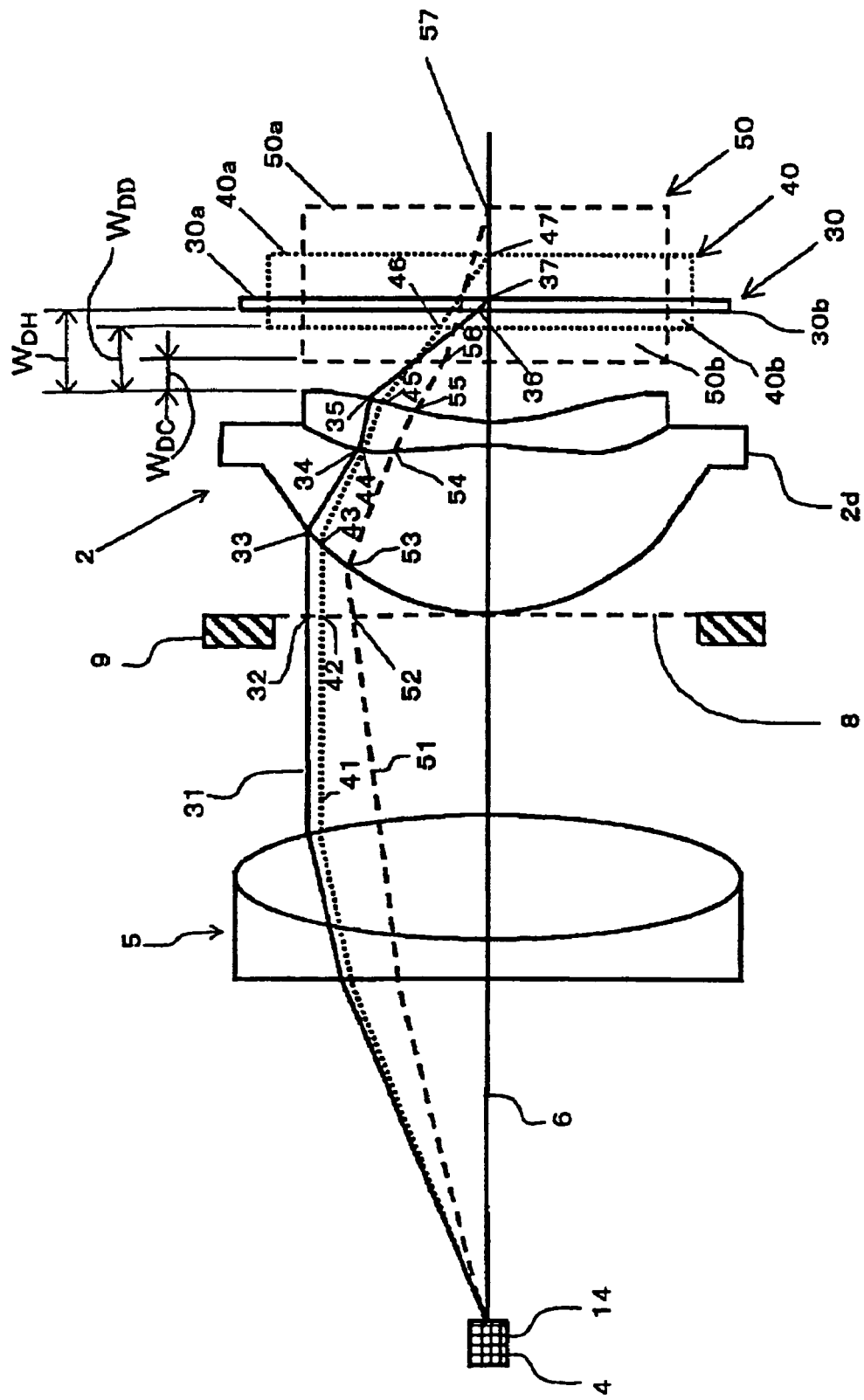
FIG. 3 is a view showing the construction of an example of the optical pickup device of the present invention.

In the following, the present invention will be described in detail with reference to drawings. FIG. 1 is a view showing the construction of an example of the objective lens of the present invention, and FIG. 3 is a view showing the construction of an example of the optical pickup device of the present invention. Both FIGS. 1 and 2 are cross-sectional views showing a cross-section including the optical axis and in parallel with the optical axis observed in a direction perpendicular to the cross-section. In the following descriptions, the units of dimensions, distances and intervals are mm and directions are those on the planes of the drawings unless otherwise specified.

In FIG. 1, a reference numeral 2 indicates the objective lens of the present invention, 2a indicates a reference lens, 2b indicates a close-contact lens, 2d indicates a holding frame, 2e indicates a surface of the reference lens 2a on the side of a light source (a surface of the objective lens 2 on the side of the light source), 2f indicates a surface of the close-contact lens 2b on the side of the light source (a surface of the reference lens 2a on the side of an optical disk), 2g indicates a surface of the close-contact lens 2b on the side of the optical disk, 2h indicates a surface of the close-contact lens closest to the optical disk (a surface of the close-contact lens 2b closest to the close-contact lens, which is perpendicular to the optical axis 6 (reference plane of working distance)), $S_0$ indicates a reference plane as a plane perpendicular to the optical axis, $P_1$ indicates an optional point on the second surface $2f$, $V_1$ indicates the top point of the second surface $2f$, $V_2$ is the top point of the third surface $2g$, $S_1$ is a tangential plane tangent at the point $P_1$ and $\theta$ indicates an angle between the reference plane $S_0$ and the tangential plane $S_1$.

Here, the close-contact lens of the present invention has a refractive power gradually changing from negative through 0 to positive from the optical axis towards the lens periphery.

Here, the first surface $2e$ is a surface of the reference lens $2a$ on the side opposite from the close-contact lens $2b$, and the surface $2e$ is also referred to as a reference lens-outer surface or a first surface. Further, the second surface $2f$ is a surface of the close-contact lens on the side of the reference lens, and the surface $2f$ is also referred to as a close-contact lens-inner surface or a second surface. Further, the surface $2g$ is a surface of the close-contact lens on the side opposite from the reference lens, and $2g$ is also referred to as a close-contact lens-outer surface or a third surface. The first surface $2e$, the second surface $2f$ and the third surface $2g$ are all surfaces within the effective diameter.

The reference lens $2a$ and the close-contact lens $2b$ are closely in contact or substantially closely in contact with each other at the second surface $2f$ by bonding or by joining, and accordingly, the surface of the reference lens $2a$ bonded or joined to the close-contact lens $2b$ in the surface of the reference lens $2a$ on the side of the close-contact lens $2b$, also has an aspherical shape the same or substantially the same as the second surface $2f$.

The objective lens 2 of the present invention is an objective lens to be employed for an optical system for recording or reproducing an information by converging light on an information recording plane of an optical recording medium. The optical information recording medium may, for example, be an optical disk of HD, DVD or CD, but is not limited to these.

From now, descriptions will be made on examples of HD, DVD and CD as optical information recording media.

In the present invention, a light of wavelength from 385 to 425 nm (hereinafter, referred to as HD wavelength) is used for recording or reproducing HD. A light of wavelength from 617 to 683 nm (hereinafter, referred to as DVD wavelength) is used for recording or reproducing DVD. A light of wavelength from 745 to 825 nm (hereinafter, referred to as CD wavelength) is used for recording or reproducing CD.

As shown in FIGS. 1 and 3, the objective lens 2 of the present invention comprises a reference lens $2a$ for converging light from a light source and a close-contact lens $2b$ closely in contact or substantially closely in contact with the reference lens $2a$ on the optical path of the light.

In the present invention, in order to improve the optical properties of the objective lens 2, the close-contact lens $2b$ has a region of positive refractive power and a region of negative refractive power. The positive refractive power and the negative refractive power of the close-contact lens $2b$ share a common optical axis.

Further, it is preferred that a portion (region F) of the close-contact lens $2b$ constituted by an aspherical surface of the second surface $2f$ including the top point $V_1$ and in the vicinity of the top point $V_1$ and the third surface $2g$ including the top point $V_2$ and in the vicinity of the top point $V_2$, has a negative refractive power. Further, it is preferred that a region of the close-contact lens $2b$ around the region F of the close-contact lens $2b$, has a positive refractive power.

The material of the close-contact lens $2b$ is different from the material of the reference lens $2a$. In the example shown in FIGS. 1 and 3, the second surface $2f$ has a region wherein the aspherical shape of the second surface $2f$ deviates on the side of the reference lens $2a$ as the distance from the optical axis 6 increases, and the third surface $2g$ has a region wherein the aspherical shape of the third surface $2g$ deviates on the side opposite from the reference lens $2a$ as the distance from the optical axis 6 increases.

However, the construction is not limited to this, but it may be such that the second surface $2f$ has a region wherein the aspherical shape of the second surface $2f$ deviates on the side of the reference lens $2a$ as the distance from the optical axis 6 increases, or that the third surface $2g$ has a region wherein the aspherical shape of the third surface $2g$ deviates on the side of the reference lens $2a$ as the distance from the optical axis 6 increases.

As shown in FIG. 1, both surface of the close-contact lens $2b$ have such shapes that when an optional point $P_1$ is moved on the respective surfaces from the top point ($V_1$ or $V_2$) of the respective surfaces of the close-contact lens towards the respective outer peripheries on the side of the reference lens $2a$ and the other side from the reference lens $2a$, the optional point moves on the side of the close-contact lens $2b$ where the thickness of the close-contact lens $2b$ becomes thicker as the distance from the optical axis 6 increases, and when the optional point $P_1$ is moved until the outer-most periphery of the effective diameter, the value and the sign of $\theta$ change and $\theta$ becomes $0°$ a point other than the top.

As described above, when a point where $\theta$ becomes $0°$ is designated as an extreme point, the example shown in FIG. 1 is preferred since each surface of the close-contact lens $2b$ has an extreme point. However, the shape is not necessarily limited to this, and a close-contact lens $2b$ having only one surface with the extreme point, is also usable. Further, in the example shown in FIG. 1, one extreme point is present in each surface. However, a plurality of extreme points may be provided in each surface.

The reference plane $S_0$ is tangent to the top of the first surface $2e$ in example shown in FIG. 1. However, when the reference plane $S_0$ is used as the reference of $\theta$, the reference plane $S_0$ is not necessarily tangent to the top of the first surface $2e$.

It is preferred that the thickness of the close-contact lens $2b$ at an extreme point closest to a light source 4 is thicker than the thickness at the center of the close-contact lens $2b$, and that the thickness minimizes the wavefront aberration, since the optical performance is thereby improved. Here, the objective lens of the present invention is rotationally symmetrical to the optical axis.

The holding frame $2d$ has an annular shape having a substantially rectangular shape in cross-section including the optical axis 6 and in parallel to the optical axis 6. The material of the holding frame $2d$ is the same material as the reference lens $2a$, and the holding frame $2d$ is integrally formed with the reference lens $2a$. The shape of the holding frame $2d$ in cross-section including the optical axis 6 and in parallel to the optical axis 6, is not limited to a substantially rectangular shape. Further, the holding frame $2d$ is one provided as the case requires, and the peripheral portion of the reference lens $2a$ may be used as a holding frame as in the example shown in FIG. 1 without providing the holding frame $2d$.

The reference lens $2a$ is preferably disposed on the side of the light source when the objective lens 2 of the present invention is employed for the optical pickup device of the present invention. Both surfaces of the reference lens $2a$ have an aspherical shape, and both surfaces of the close-contact lens 2b also have an aspherical shape.

The outer diameter of the objective lens 2 is from 0.5 to 5.0 mmΦ. In this case, the maximum diameter of incident light flux is preferably at most 4.4 mmΦ. Here, the maximum diameter of incident light flux coincides with the effective diameter of the objective lens on the side of the light source unless the light flux from the light source is limited by an aperture.

The purpose of making the outer diameter of the objective lens 2 of the present invention to be at most 5.0 mmΦ is for miniaturization and weight saving. The preferred range of the outer diameter of the objective lens 2 of the present invention is at most 4.5 mmΦ, and the effective diameter of the objective lens 2 on the side of the light source in this case is preferably at most 3.8 mmΦ. Further, the more preferred range of the outer diameter of the objective lens 2 of the present invention is at most 4.0 mmΦ, and the effective diameter of the objective lens 2 on the side of the light source in this case is preferably at most 3.2 mmΦ.

The reason of making the outer diameter of the objective lens 2 of the present invention to be at least 0.5 mmΦ is that if it is less than 0.5 mmΦ, the curvature of the surface shape of the first surface 2e becomes small and the curvature radius is likely to be at least 0.5 mmR, whereby the fabrication of a metal mold becomes easy and its fabrication accuracy is not deteriorated.

Here, the outer diameter of the objective lens 2 of the present invention means the outer diameter of the reference lens 2a when the outer diameter of the reference lens 2a is larger than the outer diameter of close-contact lens 2b, and it means the outer diameter of the close-contact lens 2b when the outer diameter of the reference lens 2a is smaller than the outer diameter of the close-contact lens 2b.

The thickness of the reference lens 2a and the thickness of the close-contact lens 2b depend on the outer diameter of the object lens 2. Since the reference lens 2a requires a large refractive power, the curvature at the top and the depth of the curve on the light-independent side of the reference lens 2a becomes large, and since it is necessary to maintain a certain thickness at the periphery of the reference lens 2a, the thickness of the reference lens 2a at the center tends to be larger than the thickness of the close-contact lens 2b at the center.

However, in order to increase the working distance of the objective lens as possible, the thickness of the reference lens 2a at the center is preferably as thin as possible. In a case of an objective lens having an outer diameter of from 0.5 to 5.0 mmΦ, the thickness of the reference lens 2a at the center is preferably about from 0.5 mm to 3.0 mm.

The thickness (not limited to the thickness at the center) of the close-contact lens 2b is preferably from 0.01 to 0.5 mm, particularly preferably from 0.1 to 0.3 mm for the purpose of making the fabrication easy and making the attenuation of light small. Further, for the same reasons, the thickness of the close-contact lens 2b at the center is preferably from 0.01 to 0.50 mm.

The material of the reference lens 2a and the material of the close-contact lens 2b are preferably ones not containing a material harmful for environment such as lead. Further, when glass is employed for the material of the reference lens 2a and the material of the close-contact lens 2b, the glass-transition temperatures of the glass is preferably at most 550° C. in order to prolong the lifetime of metal mold for molding and produce the lens easily at low cost.

In the present invention, in order to increase the working distance as possible, the refractive index of the material of the reference lens 2a for light of wavelength from 385 nm to 825 nm is preferably from 1.75 to 2.20. It is more preferably from 1.80 to 2.20, particularly preferably from 1.90 to 2.20. The material of the reference lens 2a is preferably glass for optical use.

As the glass material for optical use having a large refractive index, a glass material containing a large amount of a component contributing to increase the refractive index such as $TeO_2$, $La_2O_3$ or $Ta_2O_5$, is preferred. One reason is that such a glass material has a low absorptance to light of HD wavelength and is excellent in the transmittance to the light of HD wavelength.

Further, another reason is that since most of such glass material has glass-transition temperature of at most 550° C., the reference lens 2a can be easily molded by a glass-press-molding process when such material is employed for the reference lens 2a of the present invention.

However, the material of the reference lens 2a is not limited to the above-mentioned, and such a glass material may be employed which has a low absorptance to light of HD wavelength, light of DVD wavelength and light of CD wavelength, and is excellent in transmittance for light of HD wavelength. Further, the glass material for optical use having a large refractive index, is preferably a glass material containing lead lesser as possible. This is because glass material free from lead is excellent in transmittance to light of HD wavelength since lead increases absorptivity of light of HD wavelength. Therefore, the glass material to be employed for the reference lens 2a of the present invention is preferably a glass material containing a large amount of components contributing to increase the refractive index such as $TeO_2$, $La_2O_3$ or $Ta_2O_5$ and free from lead.

The material of the close-contact lens 2b preferably has a refractive index of 1.20 to 2.20, more preferably from 1.30 to 1.70, particularly preferably from 1.40 to 1.60 for light of wavelength from 385 nm to 825 nm. This is for the purpose of making the aspherical shape of the close-contact lens 2b gentle so that it can be easily fabricated considering the combination with the reference lens 2a.

The material of the close-contact lens 2b is preferably an optical glass material or a synthetic resin material having a high transmittance for light of wavelength from 385 nm to 825 nm and being excellent in bonding property with the reference lens 2a. Further, in such synthetic resin material, a material excellent in properties such as low-dispersion property, high-transmittance, light-resisting property and water-resistant property, is preferred. This is because such properties are desired properties for an objective lens of an optical pickup device to be provided with.

As a synthetic resin material to be employed for the material of the close-contact lens 2b, may, for example, be a polyolefin type synthetic resin, a polycarbonate, a polystyrene, an acryl, a PMMA (polymethyl methacrylate), an olefin type resin or a fluoro resin.

Among these synthetic resin materials, a polyolefin type synthetic resin is preferred. This is because among these polyolefin type synthetic resins, there is a type having a transmittance of as high as about 90% for light having a wavelength of at least 400 nm transmitting through a 2 mm-thick plate of polyolefin type synthetic resin. Among such polyolefin type synthetic resins, there is one having a refractive index of 1.5597 for light of HD wavelength, which is suitable as the material for the close-contact lens 2b.

Cytop (trade name) as a fluoro resin manufactured by Asahi Glass Company has a low refractive index. Therefore, it is preferably used as a material for the close-contact lens 2b in a case where a low refractive index is required to the close-contact lens 2b at a time of designing. When the close-contact lens 2b is joined to the reference lens 2a with an adhesive agent whereby an adhesive layer of adhesive agent is present between the reference lens 2a and the close-contact lens 2b, it is preferred to take the thickness and the refractive index of the adhesive layer into consideration at a time of optical design. The thickness of the adhesive layer made of the adhesive agent is preferably from 0.01 to 20 μm particularly preferably from 0.01 to 10 μm so as to minimize influence to the optical characteristics of the objective lens 2.

The outer-most periphery (holding frame 2d in the example shown in FIG. 1) of the objective 2 of the present invention, is preferably made of a glass material to increase the strength. Further, the outer diameter of the objective lens is preferably at most 5.0 mmΦ, particularly preferably 4.0 mmΦ for the purpose of miniaturization.

A centering error occurs in a step of fixing the objective lens 2 at a time of attaching the objective lens 2 of the present invention to an optical pickup device. Accordingly, it is preferred to secure the light flux from a light source and to use the aspherical surface of the objective lens 2 effectively.

For this purpose, in a case of making the outer diameter of the objective lens 2 to be at most 5.0 mmΦ, it is preferred to determine the diameter of incident light flux to be at most 4.2 mmΦ, whereby the working distance tends to be small. Further, in a case of making the outer diameter of the objective lens 2 to be at most 4.0 mmΦ, it is preferred to determine the diameter of the incident light flux to be at most 3.2 mmΦ, whereby the working distance tends to be further small.

Actually, when recording or reproducing of an CD is carried out using light of CD wavelength, since the thickness of CD protective layer is as thick as 1.2 mm, the working distance becomes less than 0.3 mm in some cases, whereby there is a risk that the objective lens contacts the recording protection layer when an auto focus device functions.

Therefore, in the present invention, when the outer diameter of the objective lens is from 0.5 to 5.0 mmΦ, the refractive index of the reference lens 2a, the aspherical shape of the reference lens 2a, the refractive index of the close-contact lens 2b and the aspherical shape of the close-contact lens 2b are preferably determined so that the diameter E of incident light flux of light from the light source and the working distance L between the objective lens and an optical information recording medium satisfy L/E≦⅙ when the wavelength of the light from the light source is HD wavelength, L/E≧⅙ when the wavelength of the light from the light source is DVD wavelength, and L/E≧¹/₁₀ when the wavelength of the light from the light source is CD wavelength.

In the present invention, in order to obtain the above-mentioned ranges of L/E, when the outer diameter of the objective lens 2 is from 0.5 to 5.0 mmΦ, the refractive index of the reference lens 2a with respect to the HD wavelength is preferably from 1.80 to 2.20, particularly preferably from 1.90 to 2.20.

As described above, in the present invention, even if the outer diameter of the objective lens 2 is at most 5.0 mmΦ, it is possible to obtain a large working distance by making the size of the light flux incident into the objective lens 2 close to the outer diameter of the objective lens 2 in its design.

However, in order to securely attach the objective lens 2 to the optical pickup device and fix it, it is preferred that the peripheral portion outside of the effective diameter of the objective lens 2 or the holding frame 2d, has sufficient size and area.

With respect to the effective diameter of the light-incident side of the objective lens, in a case of an objective lens 2 having an outer diameter of from 4.5 to 5.0 mmΦ, the diameter of incident light flux is preferably from 3.2 to 4.2 mmΦ, and the surface diameter of the light-incident side of the objective lens 2 is preferably from 3.5 to 4.5 mmΦ.

Further, in a case of an objective lens 2 having an outer diameter of at least 4.0 mmΦ and less than 4.5 mmΦ, the diameter of the incident light flux is preferably from 2.8 to 3.4 mmΦ and the surface diameter of the light-incident side of the objective lens is preferably from 3.0 to 3.6 mmΦ.

Further, if the effective diameter is larger than these and the lens-surface diameter of the objective lens 2 is larger to obtain a large working distance, the shape of the holding frame 2d becomes too small and a problem of lowering the reliability of servo drive may occur when such a lens is attached and fixed to an optical pickup device.

With respect to the numerical aperture (NA) at the optical-disk-side of the objective lens of the present invention, when recording or reproducing of HD is carried out with light of HD wavelength, NA is preferably from 0.80 to 0.87, particularly preferably from 0.83 to 0.87. Further, when recording or reproducing of DVD is carried out with light of DVD wavelength, NA is preferably from 0.60 to 0.67, particularly preferably from 0.63 to 0.67. Further, when recording or reproducing of CD is carried out with light of CD wavelength, NA is preferably from 0.40 to 0.53, particularly preferably from 0.45 to 0.53.

In order to improve the optical properties of the objective lens 2, the curvature radius at the top of the first surface 2e is preferably from 0.2 to 8.0 mm. Further, in order to improve the optical properties of the objective lens 2, the curvature radius at the top of the first surface 2e and the diameter E of incident light flux satisfy a relation $$0.2 \leq E/R_1 \leq 8.0.$$

More preferable range is $0.5 \leq E/R_1 \leq 5.0$, particularly preferable range is $0.8 \leq E/R_1 \leq 2.0$.

When the wavelength of light emitted from a light source and incident into the objective lens fluctuates ±1 nm from the center wavelength of, for example, 405 nm of the wavelength of blue laser, the objective lens is preferably such that the fluctuation of the optimum imaging point in terms of root square mean of the wavefront aberration is at most ±0.2 μm since such an objective lens has an excellent wavelength-dispersion property. The fluctuation of the optimum imaging point is more preferably at most ±0.1 μm. Further, the fluctuation of the optimum imaging point is particularly preferably at most ±0.05 μm since the wavelength-dispersion property thereby becomes more excellent.

Further, when the center wavelength of the light from the light source is within the range of from 385 to 425 nm for recording or reproducing HD, within a range of from 617 to 683 nm for recording or reproducing DVD, or within a range of from 745 to 825 nm for recording or reproducing CD, the objective lens is preferably such that the refractive index of the reference lens is smaller than the refractive index of the close-contact lens so that the fluctuation of the optimum imaging point in terms of root square mean of the wavefront aberration becomes at most ±0.1 μm when the center wavelength fluctuates ±1 nm.

Further, in order to improve the optical properties of the objective lens 2, the thickness $t_1$ of the close-contact lens 2b at the extreme point and the center thickness to of the close-contact lens satisfy a relation:

$$t_0+(t_c/2)<t_1<4\cdot t_0.$$

Further, in order to improve the optical properties of the objective lens 2, the radius $h_{1max}$ of the effective diameter of the first surface 2e and the maximum depth $Z_{1max}$ of the effective diameter of the first surface 2e satisfy a relation:

$$Z_{1max}<h_{1max}.$$

More preferred range is:

$$Z_{1max} \leq (4/5)\cdot h_{1max},$$

Particularly preferable range is:

$$Z_{1max} \leq (2/3)\cdot h_{1max}.$$

Further, in order to improve the optical properties of the objective lens 2, the radius $h_{2max}$ of the effective diameter of the second surface 2f and the maximum depth $Z_{2max}$ of the effective diameter of the second surface 2f satisfy a relation:

$$0<z_{2max}<h_{2max}/2.$$

Such a case satisfies the condition that the refractive index of the reference lens is smaller than the refractive index of the close-contact lens.

Further, the radius $h_{2max}$ of the effective diameter of the second surface 2f and the maximum depth $z_{2max}$ of the effective diameter of the second surface 2f satisfy a relation:

$$h_{2max}/10 \leq z_{2max} < h_{2max}/2$$

More preferred range is $h_{2max}/8 \leq z_{2max} \leq h_{2max}/3$, particularly preferred range is $h_{2max}/6 \leq z_{2max} \leq h_{2max}/4$.

Further, in order to improve the optical properties of the objective lens 2, the radius $h_{3max}$ of the effective diameter of the third surface 2g and the maximum depth $Z_{3max}$ of the effective diameter of the third surface 2g satisfy a relation:

$$h_{3max}/12 \leq z_{3max} \leq h_{3max}/3.$$

More preferred range is $h_{3max}/10 \leq z_{3max} \leq h_{3max}/4$, particularly preferred range is $h_{3max}/8 \leq z_{3max} \leq h_{3max}/5$.

Further, in order to improve the optical properties of the objective lens 2, the curvature radius $R_1$ (mm) at the top of the first surface 2e and the refractive index $n_1$ of the material of the reference lens satisfy a relation:

$$0.1 \leq (n_1-1)/R_1 \leq 5.0.$$

More preferred range is $0.2 \leq (n_1-1)/R_1 \leq 3.0$, particularly preferred range is $0.3 \leq (n_1-1)/R_1 \leq 1.0$.

Further, in order to improve the optical properties of the objective lens 2, the refractive power $\psi_1$ of the reference lens 2a for light of wavelength from 385 nm to 825 nm and the refractive power $\psi_2$ of the close-contact lens 2b for light of wavelength from 385 nm to 825 nm, satisfy relations:

$0.3 \leq \psi_1 \leq 5.0$, $-5.0 \leq \psi_2 \leq -0.2$ and $|\psi_1+\psi_2| \leq 4.0$. More preferred range is $0.4 \leq \psi_1 \leq 4.0$, $-4.0 \leq \psi_2 \leq -0.3$ and $|\psi_1+\psi_2| \leq 3.0$, and particularly preferred range is $0.5 \leq \psi_1 \leq 3.0$, $-3.0 \leq \psi_2 \leq -0.4$ and $|\psi_1+\psi_2| \leq 2.0$.

Further, in order to improve the optical properties of the objective lens 2, it is preferred that within the effective diameter of the close-contact lens 2b, the thickness of the close-contact lens 2b at the center is thinner than the thickness of the close-contact lens 2b at a portion other than the center, and at the same time, is a thickness providing the minimum wavefront aberration.

Further, in order to improve the optical properties of the objective lens 2, it is preferred that the thickness of the close-contact lens 2b at the outer-most periphery of the effective diameter is thinner than the thickness of the close-contact lens 2b at the above-mentioned extreme point, and at the same time, is a thickness providing the minimum wavefront aberration.

The optical pickup device shown in FIG. 3 employing the objective lens 2 of the present invention will be described. In FIG. 3, a reference numeral 4 indicates a light source, 5 indicates an auxiliary lens, 6 indicates an optical axis, 8 indicates an incident pupil plane, 9 indicates an aperture, 14 indicates a photo-receiving element, 30 indicates a HD, 30a indicates an information recording plane of HD 30 (hereinafter, referred to as HD information recording plane), 30b indicates a protective layer of HD 30 (hereinafter, referred to as HD protective layer), 40 indicates a DVD, 40a indicates an information recording plane of DVD 40 (hereinafter, referred to as DVD information recording plane), 40b indicates a protective layer of DVD 40 (hereinafter, referred to as DVD protective layer), 50 indicates a CD, 50a indicates an information recording plane of CD 50 (hereinafter, referred to as CD information recording plane), 50b indicates a protective layer of CD 50 (hereinafter, referred to as CD protective layer), $W_{DH}$ indicates a working distance for recording or reproducing an information of HD 30, $W_{DD}$ indicates a working distance for recording or reproducing an information of a DVD 40, and $W_{DC}$ indicates a working distance for recording or reproducing an information of CD 50. The working distance means the minimum distance between the objective lens 2 and an optical disk, which corresponds to the above-mentioned L. The incident pupil plane 8 is tangent to the top of the first surface 2e.

Here, the working distance $W_{DH}$, the working distance $W_{DD}$ and the working distance $W_{DC}$ are each the distance between the portion closest to an optical disk (the surface 2h in an example shown in FIG. 3) of the surface of the close-contact lens 2b at the optical-disk-side (not limited to a portion within the effective diameter) and the optical disk. Therefore, if the top is the portion closest to the optical disk in the surface on the optical-disk-side of the close-contact lens 2b, those working distances become the distance between the top and the optical disk. In the example shown in FIG. 3, since the portion closest to the optical disk is a portion in the vicinity of the periphery of the close-contact lens (a surface outside the effective diameter) in the surface on the optical-disk-side of the close-contact lens, the working distances are each the distance between this portion and the optical disk.

In the example shown in FIG. 3, the reference lens 2a is disposed on the side of the light source 4 and the close-contact lens 2b is disposed on the side of the optical disk. It is preferred that these components constitute the objective lens 2 for the purpose of improving the optical properties of the objective lens 2. However, the construction is not necessarily limited to this, but such an objective lens 2 is usable which has a construction that the reference lens 2a is disposed on the side of the optical disk and the close-contact lens 2b is disposed at the side of the light source 4.

Further, in FIG. 3, 31 indicates an optional light beam passing through an optical path other than the optical axis 6 within the effective diameter when recording or reproducing of an information of HD 30 is carried out, 32 indicates the intersecting point of the incident pupil plane 8 with the light beam 31, 33 indicates the intersecting point of the first surface 2e with the light beam 31, 34 indicates the intersecting point of the second surface 2f with the light beam 31, 35 indicates the intersecting point of the third surface 2g with the light beam 31, 36 indicates the intersecting point of a surface on the light-source side of the protective layer 30b with the light beam 31, and 37 indicates the intersecting point of the HD information recording plane 30a with the light beam 31.

Further, in FIG. 3, 41 indicates an optional light beam passing through an optical path other than the optical axis 6 within the effective diameter when recording or reproducing of an information of DVD 40 is carried out, 42 indicates the intersecting point of the incident pupil plane 8 with the light beam 41, 43 indicates the intersecting point of the first surface 2e with the light beam 41, 44 indicates the intersecting point of the second surface 2f and the light beam 41, 45 indicates the intersecting point of the third surface 2g with the light beam 41, 46 indicates the intersecting point of a surface on the light-source side of the protective layer 40b with the light beam 41, and 47 indicates the intersecting point of the DVD information recording plane 40a with the light beam 41.

Further, in FIG. 3, 51 indicates an optional light beam passing through an optical path other than the optical axis 6 within the effective diameter when recording or reproducing of an information of CD 50 is carried out, 52 indicates the intersecting point of the incident pupil plane 8 with the light beam 51, 53 indicates the intersecting point of the first surface 2e with the light beam 51, 54 indicates the intersecting point of the second surface 2f with the light beam 51, 55 indicates the intersecting point of the third surface 2g with the light beam 51, 56 indicates the intersecting point of a surface on the light-source side of the protective layer 50b with the light beam 51, and 57 indicates the intersecting point of the CD information recording plane 50a with the light beam 51.

From now, optical phenomena occurring in a case of employing the objective lens 2 of the present invention in the optical pickup device shown in FIG. 3, will be described as follows, and the difference between the objective lens 2 of the present invention and a conventional objective lens (for example, the objective lens 62 shown in FIG. 2) in terms of optical phenomena occurred will be described. In the following descriptions, the reference lens means the reference lens 2a or the reference lens 62a, and the close-contact lens means the close-contact lens 2b or the close-contact lens 62b unless otherwise specified.

When recording or reproducing of an information of HD 30 is carried out, light of HD wavelength from the light source 4 is transmitted through the auxiliary lens 5, the objective lens 2 and the HD protective layer 30b in this order and converged on the HD information recording plane 30a to form a beam spot. Light reflected by the HD information recording plane 30a is transmitted through the HD protective layer 30b, the objective lens 2 and the auxiliary lens 5 in this order and converged on the photo-receiving element 14. In this case, the light beam 31 after transmitted through the auxiliary lens 5 passes the intersecting point 32, the intersecting point 33, the intersecting point 34, the intersecting point 35, the intersecting point 36 and the intersecting point 37 in this order and converged on the HD information recording plane 30a, and light reflected by the HD information recording plane 30a returns through the same optical path as that the light has just transmitted through.

When recording or reproducing of an information of DVD 40 is carried out, light of DVD wavelength from the light source 4 is transmitted through the auxiliary lens 5, the objective lens 2 and the HD protective layer 40b in this order and converged on the DVD information recording plane 40a to form a beam spot. Light reflected by the DVD information recording plane 40a is transmitted through the DVD protective layer 40b, the objective lens 2 and the auxiliary lens 5 in this order and converged on the photo-receiving element 14. In this case, the light beam 41 after transmitted through the auxiliary lens 5 passes the intersecting point 42, the intersecting point 43, the intersecting point 44, the intersecting point 45, the intersecting point 46 and the intersecting point 47 in this order and converged on the DVD information recording plane 40a, and light reflected by the DVD information recording plane 40a returns through the same optical path as that the light has just transmitted through.

When recording or reproducing of an information of CD 50 is carried out, light of CD wavelength from the light source 4 is transmitted through the auxiliary lens 5, the objective lens 2 and the CD protective layer 50b in this order and converged on the CD information recording plane 50a to form a beam spot. Light reflected by the CD information recording plane 50a is transmitted through the CD protective layer 50b, the objective lens 2 and the auxiliary lens 5 in this order and converged on the photo-receiving element 14. In this case, the light beam 51 after transmitted through the auxiliary lens 5 passes the intersecting point 52, the intersecting point 53, the intersecting point 54, the intersecting point 55, the intersecting point 56 and the intersecting point 57 in this order and converged on the CD information recording plane 50a, and light reflected by the CD information recording plane 50a returns through the same optical path as that the light has just transmitted through.

The objective lens 2 of the present invention and the optical pickup device of the present invention are not limited to those of the example of FIG. 3, and they may be such that the light source 4 and the photo-receiving element 14 are not disposed at positions shown in FIG. 3. Further, optical media such as a half mirror and a beam splitter may be disposed on the optical axis 6.

In the example shown in FIG. 3, the single light source 4 emits all of light beams of HD wavelength, DVD wavelength and CD wavelength. However, the light beams of HD wavelength, DVD wavelength and CD wavelength may be emitted from the respective light sources. Further, in the case where the light beams of HD wavelength, DVD wavelength and CD wavelength are emitted from the respective light sources, those light sources do not have to be disposed at the same position as the light source 4. In a case where a different light source other than the light source 4 is disposed at a position other than on the optical axis 6, the construction may be such that light from the different light source is incident into the auxiliary lens 5 by means of an optical medium such as a half mirror disposed on the optical axis 6.

As the light of HD wavelength, a blue laser light is usually used. As the light of DVD wavelength, a red laser light is usually used. As the light of CD wavelength, a red laser light is usually used.

In the example shown in FIG. 3, the photo-receiving element 14 is disposed at the same position as the light source 4. However, the construction is not necessarily limited to this, and the construction may be such that an optical medium such as a half mirror is disposed on the optical axis 6 so that the reflected light from the optical information recording medium is converged on the photo-receiving element 14 disposed at a position off the optical axis 6 by means of the optical medium. Namely, in the example shown in FIG. 3, the position of the light source 4 and the position of the photo-receiving element 14 are at the same position. However, the construction is not necessarily limited to this, and the construction may be such that the light source 4 and the photo-receiving element 14 are disposed at respective positions by employing an optical medium such as a half mirror.

Further, in the example shown in FIG. 3, a single photo-receiving element 14 receives all of light beams of HD wavelength, DVD wavelength and CD wavelength. However, the construction is not necessarily limited to this and it may be such that the light beams of HD wavelength, DVD wavelength and CD wavelength are received by the respective photo-receiving elements 14.

In the example shown in FIG. 3, when recording or replaying of an information of HD 30 or DVD 40 is carried out, light from the light source 4 is converted into a parallel light by the auxiliary lens 5, transmitted through the objective lens 2 and converged on the information recording plane of HD 30 or on the information recording plane of DVD 40 and light reflected from the HD information recording plane 30a or the DVD information recording plane 40a is transmitted through the objective lens 2 and incident into the photo-receiving element 14, whereby the data of HD information recording plane 30a or DVD information recording plane 40a is recorded or reproduced.

Further, in the example shown in FIG. 3, when recording or reproducing of CD is carried out, light from the light source 4 is incident into the objective lens 2 as a divergent light and transmitted through the objective lens 2 and converged on a CD information recording plane 50a, and light reflected from CD 50 is transmitted through the objective lens 2 and incident into the photo-receiving element 14, whereby data is recorded to or reproduced from the CD information recording plane 50a.

Namely, in the example shown in FIG. 3, the specification of the auxiliary lens 5 is determined so that when recording or reproducing of HD 30 or DVD 40 is carried out, the auxiliary lens 5 functions as a collimator lens, and when recording or reproducing of CD is carried out, the auxiliary lens 5 does not function as a collimator lens but light from the light source 4 incident into the auxiliary lens 5 is converted to a divergent light by being transmitted through the auxiliary lens 5. In this case, when recording or reproducing of HD 30 or DVD 40 is carried out, the objective lens 2 functions as an infinity type lens and when recording or reproducing of CD is carried out, the objective lens 2 functions as a finite type lens.

If the auxiliary lens 5 as a single lens functions as a collimator lens when recording or reproducing of HD 30 or DVD 40 is carried out, and if it has a function of generating a divergent light when recording or reproducing of CD is carried out, such auxiliary lens 5 can be employed. However, the construction is not necessarily limited to this, and it may be such that an auxiliary lens 5 dedicated for HD is employed when recording or reproducing of HD 30 is carried out, an auxiliary lens 5 dedicated for DVD is employed when recording or reproducing of DVD 40 is carried out and one dedicated for CD is employed when recording or reproducing of CD 50 is carried out. Namely, the auxiliary lens 5 may be changed for every type of optical disk.

Although not described in FIG. 3, the construction may be such that when recording or reproducing of HD 30 or DVD 40 is carried out, light from the light source 4 is converted into a parallel light by the collimator lens and incident into the objective lens 2, and when recording or reproducing of CD 50 is carried out, light from the light source (including a light source other than the light source 4) is incident into the objective lens 2 directly or by means of an optical medium such as a half mirror or a beam splitter without being transmitted through the collimator lens.

The aperture 9 functions to change the numerical aperture. The purpose of providing the aperture 9 is that when numerical apertures to be used for recording or reproducing HD 30, DVD 40 and CD 50 respectively are different from each other, the numerical aperture is adjusted by the aperture 9.

The aperture 9 may be a mechanical aperture or an optical aperture and is not particularly limited. As an example of the mechanical aperture, means of preparing and exchanging a plurality of plates each having an opening of a diameter corresponding to a numerical aperture, may, for example, be mentioned.

The close-contact lens 2b of the present invention preferably has at least one extreme point. On the other hand, the close-contact lens 2b of the objective lens 62 shown in FIG. 2 has no extreme point.

From now, with reference to an example shown in FIG. 3, optical phenomena of the present invention will be described. The thickness of the reference lens at the center (distance on the optical axis) is designated as $t_2$, the thickness at the center of the close-contact lens (the distance on the optical axis) is designated as $t_3$, the refractive index of the material of the reference lens for light of HD wavelengths is designated as $n_{a2}$, the refractive index of the material of the reference lens for light of DVD wavelengths is designated as $n_{b2}$, and the refractive index of the material of the reference lens for light of CD wavelengths is designated as $n_{c2}$. Further, the refractive index of the material of the close-contact lens for light of HD wavelengths is designated as $n_{a3}$, the refractive index of the material of the close-contact lens for light of DVD wavelengths is designated as $n_{b3}$ and the refractive index of the material of the close-contact lens for light of CD wavelength is designated as $n_{c3}$.

Provided that the distance between the objective lens (close-contact lens) and HD 30 on the optical axis is designated as $t_{a4}$, the thickness of a HD protective layer 30b is designated as $t_{a5}$, its refractive index is designated as $n_{a5}$, a medium before and after the objective lens is assumed to be air and the refractive index of the air is assumed to be 1.0, when recording or reproducing of HD is carried out using light of HD wavelength, the optical path $AP_0$ on the optical axis 6 from the incident pupil plane 8 to the HD information recording plane 30a is represented by the following formula (1).

$$AP_0 = n_{a2} \cdot t_2 + n_{a3} \cdot t_3 + t_{a4} + n_{a5} \cdot t_{a5} \quad (1)$$

When recording or reproducing of DVD 40 is carried out using light of DVD wavelength, when the distance on the optical axis between the objective lens and DVD 40 is designated as $t_{b4}$, the thickness of DVD protective layer 40b is designated as $t_{b5}$ and its refractive index is designated as $n_{b5}$, the optical path $BP_0$ on the optical axis 6 from the incident pupil plane 8 to the DVD information recording plane 40a is represented by the following formula (2).

$$BP_0 = n_{b2} \cdot t_2 + n_{b3} \cdot t_3 + t_{b4} + n_{b5} \cdot t_{b5} \quad (2)$$

When recording or reproducing of CD 50 is carried out with using light of CD wavelength, provided that the distance on the optical axis between the objective lens and CD 50 is designated as $t_{c4}$, the thickness of CD protective layer is 50b is designated as $t_{c5}$ and its refractive index is designated as $n_{c5}$, the optical path $CP_0$ on the optical axis 6 from the incident pupil plane 8 to the CD information recording plane 50a is represented by the following formula (3).

$$CP_0 = n_{c2} \cdot t_2 + n_{c3} \cdot t_3 + t_{c4} + n_{c5} \cdot t_{c5} \quad (3)$$

When recording or reproducing of HD 30 is carried out with light of HD wavelength, provided that the distance from the intersecting point 32 to the intersecting point 33 is designated as $t_{i1}$, the distance from the intersecting point 33 to the intersecting point 34 is designated as $t_{i2}$, the distance from the intersecting point 34 to the intersecting point 35 is designated as $t_{i3}$, the distance from the intersecting point 35 to the intersecting point 36 is designated as $t_{i4}$ and the distance from the intersecting point 36 to the intersecting point 37 is designated as $t_{i5}$, the optical path $AP_i$ of the light beam 31 from the incident pupil plane 8 to the HD information recording plane 30a is represented by the formula (4) by using the above-mentioned definition of the refractive index of the medium.

$$AP_i = t_{i1} + n_{a2} \cdot t_{i2} + n_{a3} \cdot t_{i3} + t_{i4} + n_{a5} \cdot t_{i5} \quad (4)$$

When recording or reproducing of DVD 40 is carried out with light of DVD wavelength, provided that the distance from the intersecting point 42 to the intersecting point 43 is designated as $t_{j1}$, the distance from the intersecting point 43 to the intersecting point 44 is designated as $t_{j2}$, the distance from the intersecting point 44 to the intersecting point 45 is designated as $t_{j3}$, the distance from the intersecting point 45 to the intersecting point 46 is designated as $t_{j4}$ and the distance from the intersecting point 46 to the intersecting point 47 is designated as $t_{j5}$, the optical path $BP_j$ of the light beam 41 from the incident pupil plane 8 to the DVD information recording plane 40a is represented by the formula by using the above-mentioned definition of the refractive index of the medium.

$$BP_j = t_{j1} + n_{b2} \cdot t_{j2} + n_{b3} \cdot t_{j3} + t_{j4} + n_{b5} \cdot t_{j5} \quad (5)$$

When recording or reproducing of CD 50 is carried out with light of CD wavelength, provided that the distance from the intersecting point 52 to the intersecting point 53 is designated as $t_{k1}$, the distance from the intersecting point 53 to the intersecting point 54 is designated as $t_{k2}$, the distance from the intercepting point 54 to the intersecting point 55 is designated as $t_{k3}$, the distance from the intersecting point 55 to the intersecting point 56 is designated as $t_{k4}$ and the distance from the intersecting point 56 to the intersecting point 57 is designated as $t_{k5}$, the optical path $CP_k$ of the light beam 51 from the incident pupil plane 8 to the CD information recording plane 50a is represented by the formula (6) by using the above-mentioned definition of the refractive index of the medium.

$$CP_k = t_{k1} + n_{c2} \cdot t_{k2} + n_{c3} \cdot t_{k3} + t_{k4} + n_{c5} \cdot t_{k5} \quad (6)$$

Provided that the intersecting point of the optical axis 6 with the HD information recording plane 30a is designated as 30p, and recording or reproducing of HD 30 is carried out with light of HD wavelength, if an optical system including the auxiliary lens 5, the objective lens 2 and the HD protective layer 30b has no aberration, the intersecting point 37 coincides with the intersecting point 30p and the optical path $AP_i$ becomes equal to the optical path $AP_0$. However, since there is aberration in actual cases, an optical path difference $Wa_i$ represented by the formula (7) occurs.

$$Wa_i = AP_i - AP_0 \quad (7)$$

The optical path difference $Wa_i$ can be regarded as a wavefront aberration of the optical system including the auxiliary lens 5, the objective lens 2 and the HD protective layer 30b. Further, since a wavefront aberration generated by the auxiliary lens 5 can be reduced to a negligible amount independently from the objective lens, the wavefront aberration of the auxiliary lens 5 is ignored, whereby the wavefront aberration of this optical system is as follows.

The optical path difference $Wa_i$ can be approximated by the sum of a wavefront aberration generated by the objective lens 2 and a wavefront aberration generated by the HD protective layer 30b in the optical system including the auxiliary lens 5, the objective lens 2 and the HD protective layer 30b.

With respect to an RMS wavefront aberration at a time of recording or reproducing HD 30 with light of HD wavelength, a root mean square value Wa as the RMS wavefront aberration is represented by the formula (8) by a unit of HD wavelength $\lambda_H$ to be used.

$$Wa = (\langle (Wa_i)^2 \rangle - \langle Wa_i \rangle^2)^{1/2} \quad (8)$$

In formula (8) $\langle Wa_i \rangle$ indicates a mean value of wavefront aberrations (calculated value) of i light beams, and $\langle (Wa_i)^2 \rangle$ means a root mean square value of wavefront aberrations (calculated value) of i light beams.

According to Marechal's criterion of the optical system, if the value of Wa of the objective lens is at most 0.07 $\lambda_H$, the objective lens provides a good wavefront aberration of diffraction limit. Namely, in order to obtain an objective lens having a good performance, it is preferred to make the optical path difference $Wa_i$ of i light beams as a large number of beams small to minimize the fluctuation of the optical path differences $Wa_i$ as possible.

In the example of FIG. 3, provided that the intersecting point of the optical axis 6 with the DVD information recording plane 40a is designated as 40p, and recording or reproducing of DVD 40 is carried out with light of DVD wavelength, if an optical system including the auxiliary lens 5, the objective lens 2 and the DVD protective layer 40b has no aberration, the intersecting point 47 coincides with the intersecting point 40p and the optical path $BP_j$ becomes equal to the optical path $BP_0$. However, since there is aberration in actual cases, an optical path difference $Wb_j$ represented by the formula (9) occurs.

$$Wb_j = BP_j - BP_0 \quad (9)$$

The optical path difference $Wb_j$ can be regarded as a wavefront aberration of the optical system including the auxiliary lens 5, the objective lens 2 and the DVD protective layer 40b. Further, since a wavefront aberration generated by the auxiliary lens 5 can be reduced to a negligible amount, the wavefront aberration of the auxiliary lens 5 is ignored, whereby the wavefront aberration of this optical system becomes as follows.

The optical path difference $Wb_j$ can be regarded approximately as a wavefront aberration difference given by the sum of a wavefront aberration generated by the objective lens 2 and a wavefront aberration generated by the DVD protective layer 40b in the optical system including the auxiliary lens 5, the objective lens 2 and the DVD protective layer 40b.

Since the optical path difference $Wb_j$ is generated, a spot image having a certain size is formed on the DVD information recording plane 40a. The smaller the size of the spot image is, the smaller the wavefront aberration becomes and the more ideal the objective lens becomes.

Namely, with respect to an RMS wavefront aberration at a time of recording or reproducing DVD 40 with light of DVD wavelength, formula (10) is obtained in the same way as the way of obtaining the RMS wavefront aberration at the time of recording or reproducing HD 30 with light of HD wavelength.

$$Wb = (\langle (Wb_j)^2 \rangle - \langle Wb_j \rangle^2)^{1/2} \quad (10)$$

In formula (10) $\langle Wb_j \rangle$ indicates a mean value of wavefront aberrations (calculated value) of j light beams, and $\langle (Wb_j) \rangle$ means a root mean square value of wavefront aberrations (calculated value) of j light beams.

According to Marechal's criterion of the optical system, if the value of Wb of the objective lens is at most $0.07 \lambda_D$, the objective lens provides a good wavefront aberration of diffraction limit. Namely, in order to obtain an objective lens having a good performance, it is preferred to make the optical path difference $Wb_j$ of j light beams as a large number of beams small to minimize the fluctuation of the optical path differences $Wb_j$ as possible.

In the example of FIG. 3, provided that the intersecting point of the optical axis 6 with the CD information recording plane 50*a* is designated as 50*p*, and recording or reproducing of CD 50 is carried out with light of HD wavelength, if an optical system including the auxiliary lens 5, the objective lens 2 and the CD protective layer 50*b* has no aberration, the intersecting point 57 coincides with the intersecting point 50*p* and the optical path $CP_k$ becomes equal to the optical path $CP_0$. However, since there is aberration in actual cases, an optical path difference $Wc_k$ represented by the formula (11) occurs.

$$Wc_k = CP_k - CP_0 \quad (11)$$

The optical path difference $Wc_k$ can be regarded as a wavefront aberration of the optical system including the auxiliary lens 5, the objective lens 2 and the CD protective layer 50*b*. Further, since a wavefront aberration generated by the auxiliary lens 5 can be reduced to a negligible amount, the wavefront aberration of the auxiliary lens 5 is ignored, whereby the wavefront aberration of this optical system becomes as follows.

The optical path difference $Wc_k$ can be regarded approximately as a wavefront aberration given by the sum of a wavefront aberration generated by the objective lens 2 and a wavefront aberration generated by the CD protective layer 50*b* in the optical system including the auxiliary lens 5, the objective lens 2 and the CD protective layer 50*b*.

Since the optical path difference $Wc_k$ is generated, a spot image having a certain size is formed on the CD information recording plane 50*a*. An ideal objective lens can be realized wherein the wavefront aberration becomes smaller as the size of the spot image is made smaller.

Namely, with respect to an RMS wavefront aberration at a time of recording or reproducing CD 50 with light of CD wavelength, formula (12) is obtained in the same way as the way of obtaining the RMS wavefront aberration at the time of recording or reproducing HD 30 with light of HD wavelength by a unit of CD wavelength $\lambda_C$ to be employed.

$$Wc = (\langle (Wc_k)^2 \rangle - \langle Wc_k \rangle^2)^{1/2} \quad (12)$$

In formula (12) $\langle Wc_k \rangle$ indicates a mean value of wavefront aberrations (calculated value) of k light beams, and $\langle (Wc_k)^2 \rangle$ means a root mean square value of wavefront aberrations (calculated value) of k light beams.

According to Marechal's criterion of the optical system, if the value of Wc of the objective lens is at most $0.07 \lambda_C$, the objective lens provides a good wavefront aberration of diffraction limit. Namely, in order to obtain an objective lens having a good performance, it is preferred to make the optical path difference $Wc_k$ of k light beams as a large number of beams small to minimize the fluctuation of the optical path differences $Wc_k$ as possible.

As described above, in order to obtain an objective lens usable for an optical system to record or reproduce HD, DVD and CD, it is necessary for the RMS wavefront aberration Wa, the RMS wavefront aberration Wb and the RMS wavefront aberration Wc to satisfy formula (13), formula (14) and formula (15) respectively. Namely, it is necessary to satisfy all of formula (13), formula (14) and formula (15).

$$Wa \leq 0.07 \cdot \lambda_H \quad (13)$$

$$Wb \leq 0.07 \cdot \lambda_D \quad (14)$$

$$Wc \leq 0.07 \cdot \lambda_C \quad (15)$$

Further, in order to satisfy all of formula (13), formula (14) and formula (15), the optical path difference $Wa_i$ is preferably smaller than $\lambda_H$, the optical path difference $Wb_j$ is preferably smaller than $\lambda_D$ and the optical path difference $Wc_k$ is preferably smaller than $\lambda_C$. These conditions will be described as follows.

When recording or reproducing of HD 30 is carried out with light of HD wavelength, formula (16) is satisfied with respect to the objective lens from formula (1), formula (4) and formula (7).

$$\begin{aligned} Wa_i &= AP_i - AP_0 \\ &= t_{i1} + n_{a2} \cdot (t_{i2} - t_2) + n_{a3} \cdot (t_{i3} - t_3) + \\ & \quad (t_{i4} - t_{a4}) + n_{a5} \cdot (t_{i5} - t_{a5}) \end{aligned} \quad (16)$$

In formula (16), the value of the second term "$n_{a2} (t_{i2} - t_2)$" depends on the shape of the reference lens or the refractive index of the material of the reference lens, and the value of the third term "$n_{a3} \cdot (t_{i3} - t_3)$" depends on the shape of the close-contact lens or the refractive index of the material of the close-contact lens.

As described above, when recording of reproducing of HD 30 is carried out with light of HD wavelength, since the auxiliary lens 5 functions as a collimator lens, $t_{i1}$ becomes the distance between a surface of the reference lens on the light-source side and the incident pupil plane 8 in the direction in parallel to the optical axis 6. Therefore, in formula (16), in order to obtain a small objective lens 2 having a large numerical aperture of NA0.80 to 0.87, the surface of the reference lens on the light-source side preferably has a small curvature radius towards the light-source side so that it becomes a convex surface having a large curvature. Therefore, the value of the first term of formula (16) preferably becomes a large positive value as the distance of light from the optical axis increases.

In order to avoid collision of the objective lens with HD 30, the working distance $W_{DH}$ is preferably large, and it is preferably at least 0.3 mm when the effective diameter of the objective lens is from 2.0 to 4.5 mm. Further, it is more preferably at least 0.5 mm, particularly preferably at least 0.7 mm. Further, when the effective diameter of the objective lens is less than 2.0 mm, the working distance $W_{DH}$ is preferably at least 0.15 mm. Therefore, the value of the fourth term $(t_{i4} - t_{a4})$ of formula (16) unlikely becomes a negative value and unlikely becomes a large positive value.

Further, since both surfaces of the HD protective layer 30*b* are substantially flat planes, $(t_{i5} - t_{a5})$ in the fifth term of formula (16) also takes a positive value as the distance of light from the optical axis increases. Further, the refractive index $n_{a2}$ of the reference lens 2a, the refractive index $n_{a3}$ of the close-contact lens 2b and the refractive index $n_{a5}$ of HD protective layer 30b are each a positive large number.

Namely, in formula (16), the value of the first term of $Wa_i$, the value of the fourth term and the value of the fifth term each becomes a large positive value as the distance of the light beam from the optical axis increases, and the value of the first term, the value of the fourth term and the value of the fifth term each tends to be a considerable large value.

However, in formula (16), if any one of the value of $(t_{i2}-t_2)$ in the second term and the value of $(t_{i3}-t_3)$ in the third term becomes a large negative value, the value of $Wa_i$ of formula (16) can be made small.

In order to increase the possibility that the objective lens has a performance of diffraction limit, with respect to an optional light beam passing though the inside of the effective diameter of the objective lens, the absolute value of the optical path difference $Wa_i$ preferably becomes at most 1 wavelength (hereinafter, referred to simply as HD diffraction limit preliminary condition). To satisfy this, it is sufficient that the value of the second term and the value of the third term are adjusted so that the absolute value of the calculation result of the right side of formula (16) becomes at most 1 wavelength. In the present invention, the shape of the objective lens is designed and the material of the objective lens is selected to determine the refractive index so as to satisfy this condition.

In the same manner as the case of recording or reproducing HD 30 with light of HD wavelength, a formula (17) is obtained from formula (2), formula (5) and formula (9) when recording or reproducing of DVD 40 is carried out with light of DVD wavelength.

$$Wb_j = BP_j - BP_0 \qquad (17)$$
$$= t_{j1} + n_{b2} \cdot (t_{j2} - t_2) + n_{b3} \cdot (t_{j3} - t_3) +$$
$$(t_{j4} - t_{b4}) + n_{b5} \cdot (t_{j5} - t_{b5})$$

Also in formula (17), the value of the first term, the value of the fourth term and the value of the fifth term each becomes a large positive value as the corresponding light beam leaves from the optical axis, and the sum of the value of the first term, the value of the fourth term and the value of the fifth term tend to be considerably large values.

However, also in formula (17), if at least any one of the value of $(t_{j2}-t_2)$ in the second term and the value of $(t_{j3}-t_3)$ in the third term becomes a large negative value, the value of $Wb_j$ of formula (17) can be reduced.

In order to increase the possibility that the objective lens has a performance of diffraction limit, with respect to light passing though the inside of the effective diameter of the objective lens, the absolute value of the optical path difference $Wb_j$ preferably becomes at most 1 wavelength (hereinafter, referred to simply as DVD diffraction limit preliminary condition). To satisfy this, it is sufficient that the value of the second term and the value of the third term are adjusted so that the absolute value of the calculation result of the right side of formula (17) becomes at most 1 wavelength. In the present invention, the shape of the objective lens is designed and the material of the objective lens is selected to determine the refractive index so as to satisfy this condition.

In the same manner as the case of recording or reproducing DVD 40 with light of DVD wavelength, a formula (18) is obtained from formula (3), formula (6) and formula (11) when recording or reproducing of CD 50 is carried out with light of CD wavelength.

$$Wc_k = CP_k - CP_0 \qquad (18)$$
$$= t_{k1} + n_{c2} \cdot (t_{k2} - t_2) + n_{c3} \cdot (t_{k3} - t_3) +$$
$$(t_{k4} - t_{c4}) + n_{c5} \cdot (t_{k5} - t_{c5})$$

Also in formula (18), the value of the first term, the value of the fourth term and the value of the fifth term each becomes a large positive value as the corresponding light beam leaves from the optical axis, and the sum of the value of the first term, the value of the fourth term and the value of the fifth term tends to be considerably large values.

However, also in formula (18), if at least any one of the value of $(t_{k2}-t_2)$ in the second term and the value of $(t_{k3}-t_3)$ in the third term becomes a large negative value, the value of $Wc_k$ of formula (18) can be reduced.

In order to increase the possibility that the objective lens has a performance of diffraction limit, with respect to light passing though the inside of the effective diameter of the objective lens, the absolute value of the optical path difference $Wc_k$ preferably becomes at most 1 wavelength. To satisfy this, it is sufficient that the value of the second term and the value of the third term may be adjusted so that the absolute value of the calculation result of the right side of formula (18) becomes at most 1 wavelength (hereinafter, referred to simply as CD diffraction limit preliminary condition). In the present invention, the shape of the objective lens is designed and the material of the objective lens is selected to determine the refractive index so as to satisfy this condition.

As described above, in order to make it possible to record or reproduce HD 30 with light of HD wavelength, to record or reproduce DVD 40 with light of DVD wavelength and to record or reproduce CD 50 with light of CD wavelength with a single objective lens, it is preferred to satisfy three conditions of HD diffraction limit preliminary condition, DVD diffraction limit preliminary condition and CD diffraction limit preliminary condition. Hereinafter, these three conditions all together are referred to simply as 3-type diffraction limit preliminary conditions.

Since it is possible to record or reproduce HD 30 with light of HD wavelength with use of the objective lens 62 (conventional example) such as the one described in Patent Document 1, the aspherical surface is likely to be optimized for HD 30 and the HD diffraction limit preliminary condition is likely to be satisfied in the objective lens. Under this assumption, whether or not recording or reproducing of DVD 40 with light of DVD wavelength is possible, is studied. As described above, recording or reproducing of DVD 40 is likely to be possible if the objective lens satisfies the DVD diffraction limit preliminary condition. This will be studied.

Considering an optional light beam of DVD wavelength incident into the same point on the surface 62e of the objective lens 62 as the point where an optional light beam is incident at a time of recording or reproducing HD 30 with light of HD wavelength (the optional light beam of DVD wavelength is transmitted through an optical path different from the light beam of HD wavelength after it is incident in the objective lens 62), since the shape of the objective lens 62 is unchanged and constant, the value of the first term is the same and the value of the fourth term is slightly smaller in formula (17), but the refractive index of the DVD protective layer 40b becomes slightly smaller than the case where the optional light beam is of HD wavelength.

However, since the thickness of the DVD protective layer 40b becomes sixth times as thick as the HD protective layer 30b, the value (positive value) as the sum of the value of first term, the value of the fourth term and the value of the fifth term in formula (17) becomes considerably large as compared with the case where the optional light beam is of HD wavelength.

By the way, as described above in the explanation of formula (17), in formula (17), the value of the second term depends on the shape of the reference lens and the refractive index of the material of the reference lens, and the value of the third term depends on the shape of the close-contact lens and the refractive index of the material of the close-contact lens. Therefore, the refractive index of the objective lens 62 becomes smaller for light of DVD wavelength, and as a result, the optical path difference represented by the second term and the third term which may be negative values, in formula (17) becomes smaller.

Namely, with respect to the optical path difference of light transmitted through the objective lens 62, since both of the refractive index of the reference lens 62a and the refractive index of the close-contact lens 62b become smaller, the sum of the value of the second term and the value of the third term of formula (17) counteracts the sum of the value of the first term, the value of the fourth term and the value of the fifth term, and as a result, the absolute value of the calculation result of formula (17) unlikely becomes at least 1 wavelength (the absolute value of the optical path difference $Wb_j$ unlikely becomes at most 1 wavelength), and the DVD diffraction limit preliminary condition is not likely to be satisfied.

Further, considering from a viewpoint of the shape of the objective lens, since it is assumed that recording or reproducing of HD 30 is possible with light of HD wavelength with the objective lens 62 of conventional type, it is understood that aspherical surfaces each optimized to minimize the optical path difference $Wa_j$ for light of HD wavelength, are employed for both surfaces of the objective lens 62.

Further, as shown in FIG. 2, in the objective lens 62, the reference lens 62a is a convex lens and the aspherical surface of the reference lens 62a and the aspherical surface of the close-contact lens 62b do not have the extreme point. In the objective lens 62 having such a shape, since DVD wavelength is longer than HD wavelength, the refractive index of the objective lens 62 becomes small and the absolute value of the optical path difference $Wb_j$ of formula (17) becomes by far larger than 1 wavelength, whereby it becomes completely impossible to record or reproduce DVD 40 with light of DVD wavelength.

Further, study is made with respect to the objective lens 62 as to whether or not recording or reproducing of CD 50 is possible with light of CD wavelength. As described above, the recording or reproducing of CD 50 is likely to be possible if the objective lens satisfies the CD diffraction limit preliminary condition. Therefore, this will be studied.

In this case, cases of recording or reproducing HD 30 and DVD are compared. At a time of recording or reproducing CD 50, there is an advantage that the value of the first term of formula (18) becomes small since the numerical aperture becomes small. However, the refractive index of the material of the objective lens 62 further becomes smaller and the thickness of the CD protective layer 50b becomes twice as thick as the thickness of the DVD protective layer 40b, whereby the value of the fifth term of formula (18) increases and the absolute value of the optical path difference $Wb_j$ of formula (18) becomes by far larger than 1 wavelength, and it becomes completely impossible to record or reproduce CD 50 with light of CD wavelength.

Then, since it is possible to record or reproduce DVD 40 with light of DVD wavelength with use of the objective lens 62 described in Patent Document 1, the aspherical surface is likely to be optimized for DVD 40 and the DVD diffraction limit preliminary condition is likely to be satisfied. Under this assumption, whether or not recording or reproducing of HD 30 with light of HD wavelength is possible, is studied. As described above, recording or reproducing of HD 30 is likely to be possible if the objective lens satisfies the HD diffraction limit preliminary condition. This will be studied as follows.

When recording or reproducing of HD 30 is carried out with light of HD wavelength, the absolute value of the sum of the value of the second term and the value of the third term of formula (16) becomes too large, and the absolute value of the calculation result of formula (16) unlikely becomes at most 1 wavelength, whereby the objective lens unlikely satisfies the HD diffraction limit preliminary condition.

When recording or reproducing of HD 30 is carried out with light of CD wavelength, the value of the sum of the value of the first term, the value of the fourth term and the value of the fifth term of formula (18) becomes too large, and the absolute value of the calculation result of formula (18) unlikely becomes at most 1 wavelength, whereby the objective lens unlikely satisfies the CD diffraction limit preliminary condition.

Then, optical phenomena occurring in a case of employing the objective lens 2 of the present invention for an optical pickup device shown in FIG. 3, will be described below. Here, the description will be made assuming that the thickness of the objective lens 2 at the center (the sum of the thickness of the reference lens 2a at the center and the thickness of the close-contact lens 2b at the center) and the effective diameter are the same as those of the objective lens 62, and the reference index of the material of the reference lens 2a and the refractive index of the material of the close-contact lens 2b are the same as those of the objective lens 62.

According to the above-mentioned explanation of formula (16), the first term, the fourth term and the fifth term of formula (16) usually tends to take large values to obtain an objective lens having a large numerical aperture and a large working distance.

In the objective lens 2 shown in FIG. 1, the extreme point of the second surface 2f is closer to the light source 4 than to the top $V_1$ as shown in FIG. 1. Further, the thickness of the close-contact lens 2b at the extreme point is thicker than the thickness of the close-contact lens 2b at the center.

Therefore, when light passing through the extreme point of the second surface 2f or light passing through the vicinity of the extreme point is observed, since the optical path of the light beam passing through the reference lens 2a becomes shorter in a case of employing the objective lens 2 than the case of employing the objective lens 62, the value of the second term of formula (16) can be made a large negative value in the case of employing the objective lens 2.

Here, in a case where the value of the second term of formula (16) becomes an excessively large negative value as a result that the optical path of the light beam passing through the reference lens 2a becomes shorter, the thickness of the reference lens 2 in the vicinity of the extreme point of the second surface 2f is increased so as to increase the optical path of the light beam passing through the close-contact lens 2b, whereby it is possible to make the value of the third term of formula (16) to be a positive value to compensate the value of the second term of formula (16) which has an excessively large negative value.

Here, the value of the second term of formula (16) may be adjusted by appropriately selecting the aspherical shape of the second surface 2f and the aspherical surface of the third surface 2g. Further, as the case requires, the value of the fourth term of formula (16) can be adjusted by appropriately selecting the aspherical shape of the third surface 2g.

As described above, the value of $Wa_1$ of formula (16) can be made at most 1 wavelength by making the absolute value of the calculation result of formula (16) at most 1 wavelength. By appropriately selecting the aspherical shape of the second surface 2f and the aspherical shape of the third surface 2g, recording or reproducing of HD 30 can be carried out with light of HD wavelength with the objective lens 2 of the present invention.

An optional light beam of DVD wavelength incident into the same position in the first surface 2e of the objective lens 2 as the position of an optional light beam for recording or reproducing HD 30 with light of HD wavelength, is considered (the optional light beam of DVD wavelength is transmitted through a different optical path from the light beam of HD wavelength after it is incident into the objective lens 2). Since the shape of the objective lens 2 is unchanged and constant, according to the explanation of formula (17), the first term, the fourth term and the fifth term of formula (17) usually tend to take large positive values to obtain an objective lens having a large numerical aperture and a large working distance.

In the objective lens 2 shown in FIG. 1, the extreme point of the second surface 2f is closer to the light source 4 than to the top $V_1$ as shown in FIG. 1. Further, the thickness of the close-contact lens 2b at the extreme point is thicker than the thickness of the close-contact lens 2b at the center. Therefore, with respect to light passing through the extreme point of the second surface 2f or a light beam passing through the vicinity of the extreme point, since the optical path of light passing through the reference lens 2a becomes shorter in a case of using the objective lens 2, than the case of using the objective lens 62, the value of the second term of formula (17) can be a large negative value in the case of using the objective lens 2.

Here, in a case where the value of the second term of formula (17) becomes an excessively large negative value as a result that the optical path of light passing through the reference lens 2a becomes shorter, the thickness of the close-contact lens 2b at the vicinity of the extreme point of the second surface 2f is increased so as to increase the optical path of light passing through the close-contact lens 2b, whereby it is possible to make the value of the third term of formula (17) to be a positive value to cancel the value of the second term of formula (17) which has an excessively large negative value.

Here, the value of the second term of formula (17) may be adjusted by appropriately selecting the aspherical shape of the second surface 2f and the aspherical shape of the third surface 2g. Further, as the case requires, the value of the fourth term of formula (17) can be adjusted by appropriately selecting the aspherical shape of the third surface 2g. In the manner as described above, the absolute value of the calculation result of formula (17) can be at most 1 wavelength, whereby the value of $Wb_t$ of formula (17) can be made at most 1 wavelength.

As described above, by appropriately selecting the aspherical shape of the second surface 2f and the aspherical shape of the third surface 2g, recording or reproducing of DVD 40 can be carried out with light of DVD wavelength with the objective lens 2 of the present invention.

As described above, in the present invention, by optimizing the value of the second term and the value of the third term of formula (16) and the value of the second term and the value of the third term of formula (17), it becomes possible to make the right side of formula (16) and the right side of formula (17) to be within 1 wavelength with respect to each of HD wavelength and DVD wavelength, whereby recording or reproducing of HD 30 and recording or reproducing of DVD 40 can be achieved.

In the preset invention, when recording or reproducing of CD 50 is carried out with light of CD wavelength with the objective lens 2, it is preferred to optimize the value of the second term and the value of the third term of formula (18) to make the value of $Wc_k$ of formula (18) within a CD wavelength.

However, as described above, the objective lens 2 of the present invention is subjected to a limitation in the specification of the objective lens required to achieve recording or reproducing of HD 30 and DVD 40. Further, the refractive indexes $n_{c2}$ and $n_{c3}$ in formula (18) are almost fixed and there is little flexibility.

Further, since the numerical aperture for recording or reproducing CD is as small as NA 0.4° to 0.53, not only light of HD wavelength but also light of DVD wavelength is transmitted through within the diameter in the objective lens 2 corresponding to this numerical aperture. Accordingly, it is not allowed to independently design the shape of the objective lens 2 within the numerical aperture, for CD, and it is difficult to optimize the value of the second term and the value of the third term of formula (18).

Further, since the thickness of the CD protective layer 50b is as thick as 1.2 mm, the fifth term of formula (18) becomes a large positive value. Therefore, it is difficult to make the value of $Wc_k$ of formula (18) within a CD wavelength, and the working distance tends to be the shortest as compared with the cases of recording or reproducing HD and DVD, such being not preferred.

Therefore, at a time of recording or reproducing of CD 50 with light of CD wavelength with the objective lens of the present invention, even if an auxiliary lens 5 is used to function as a collimator lens to let a parallel light incident in the objective lens 2 of the present invention, it is difficult to obtain an optical system having a performance of diffraction limit.

In the present invention, at a time of recording or reproducing CD 50 with light of CD wavelength, the light of CD wavelength is let incident in the objective lens 2 as a divergent light so that the objective lens 2 function as a definite system.

In this case, by adjusting the angle of the divergent light with respect to the optical axis 6, it is possible to adjust the optical path of the light beam from the incident pupil plane 8 through the objective lens 2 to the CD information recording plane 50b, whereby the value of $Wc_k$ of formula (18) can be made within CD wavelength. Further, when light of CD wavelength is used, since the light is incident into the objective lens 2 as divergent light, the position where the divergent light is converged moves away from the objective lens 2, and as a result, the working distance $W_{DC}$ can be increased.

In the present invention, the thickness of the HD protective layer 30b is as thin as 0.1 mm while the thickness of the DVD protective layer 40b is as thick as 0.6 mm and the thickness of the CD protective layer 50b is as thick as 1.2 mm. Therefore, it is preferred to employ an optical material having a high refractive index for the material for the reference lens 2a to obtain a compatibility of recording or reproducing of HD, DVD and CD and a long working distance at the same time.

The present invention will be described with reference to Examples below. However, the present invention is not limited to these Examples and various improvements and modifications are also included in the present invention so long as those improvements and modifications do not deviate from the gist of the present invention.

EXAMPLE 1

Example of the Present Invention

An objective lens 2 as shown in FIG. 1 and an optical pickup device as shown in FIG. 3 are produced employing the objective lens 2. An optical glass material (hereinafter tentatively referred to as TS32) of high refractive index having $TeO_2$, $ZnO$ and $Na_2O$ as main components, is employed for the material of the reference lens 2a. An olefin type material "APEL (registered trademark)", manufactured by Mitsui Sekiyu Kagaku is employed for the material of the close-contact lens 2b.

At a time of recording or reproducing HD 30 with light of HD wavelength and at a time of recording or reproducing DVD 40 with light of DVD wavelength, the respective auxiliary lenses 5 are employed so that each of them functions as a collimator lens. At a time of recording or reproducing CD 50 with light of CD wavelength, light from the light source 4 is let directly incident in the objective lens 2 without using the auxiliary lens 5.

In the Example shown below, the aspherical shape of the first surface 2e, the aspherical shape of the second surface 2f and the aspherical shape of the third surface 2g are determined according to the aspherical shape represented by the following formula (19). Here, also in the Comparative Example shown below, each of the aspherical shape of the objective lens is determined by the following formula (19).

$$Z_n = (1/R_n)h^2[1+[1-(1+k_n)\cdot(1/R_n)^2 h^2]^{1/2}] + \Sigma A_{ni} h^{2i} \quad (19)$$

Here, h is the distance from the top of n-th surface on the optical axis in a direction perpendicular to the optical axis (the height from the optical axis 6), $R_n$ is the curvature radius of n-th surface of Table 1, $k_n$ is the conical constant of n-th surface also in Table 2, and $A_{ni}$ is the aspherical constant of i=1 to 8th term of n-th surface in Table 2. $z_n$ is the distance from a tangential plane tangent to the top of n-th surface determined by the above h, $R_n$, $k_n$ and $A_{ni}$ in the direction of the optical axis 6, and a curve determined by the value of $z_n$, provides an aspherical cross-sectional shape of n-th surface.

Tables 1 to 4 show the specification of the objective lens 2. The values of $R_n$, $k_n$ and $A_{ni}$ are shown in Table 2 and Table 3. With respect to the surface number in the following Tables, a surface number 0 corresponds to the light source 4, a surface number 1 corresponds to the first surface 2e, a surface number 2 corresponds to the second surface 2f (a surface of the reference lens 2a on the side of the optical disk and a surface of the close-contact lens 2b on the side of the light source 4), a surface number 3 corresponds to the third surface 2g, a surface number 4 corresponds to the surface 2h, a surface number 5 corresponds to a surface of the optical disk on the side of the light source 4 (a surface of the protective layer of the optical disk on the side of the light source 4) and a surface number 6 correspond to the information recording plane of the optical disk.

Further, an interval between surfaces and a material name in each of the following Tables, indicate the interval between the surfaces and the material name respectively in the area between the corresponding surface number and the next surface number. In the following Tables, the units of intervals and distances are mm and "E–01" to "E–04" mean $10^{-1}$ to $10^{-4}$ respectively unless otherwise specified.

Figure 4:
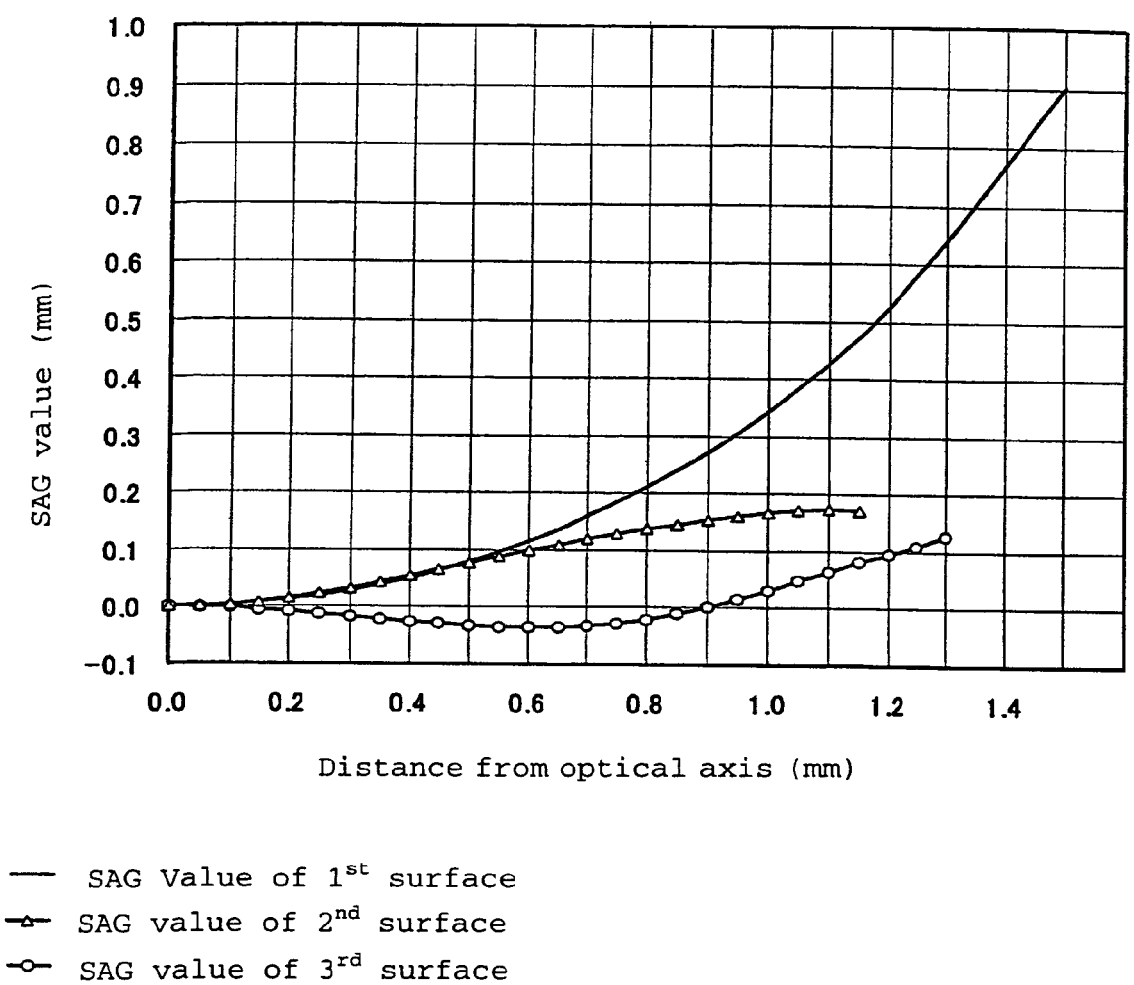
FIG. 4 is a graph showing a cross-sectional shape of the objective lens 2 of Example 1, shown by SAG value and the distance from the optical axis 6.

FIG. 4 is a graph showing the cross-sectional shape (corresponding to the shape shown in FIG. 1) of the objective lens 2 by SAG value (the distance (Sagittal Figure) in the direction of the optical axis 6) and the distance from the optical axis 6. In FIG. 4, the cross-sectional shape is shown in such a way that the positions of the top of the first surface 2e, the top of the second surface 2f and the top of the third surface 2g each present at a distance from the optical axis 6 tentatively coincide from one another by shifting these tops. Here, all of the graphs showing the relation between SAG value and the distance from the optical axis 6 are shown in the same manner.

Figure 5:
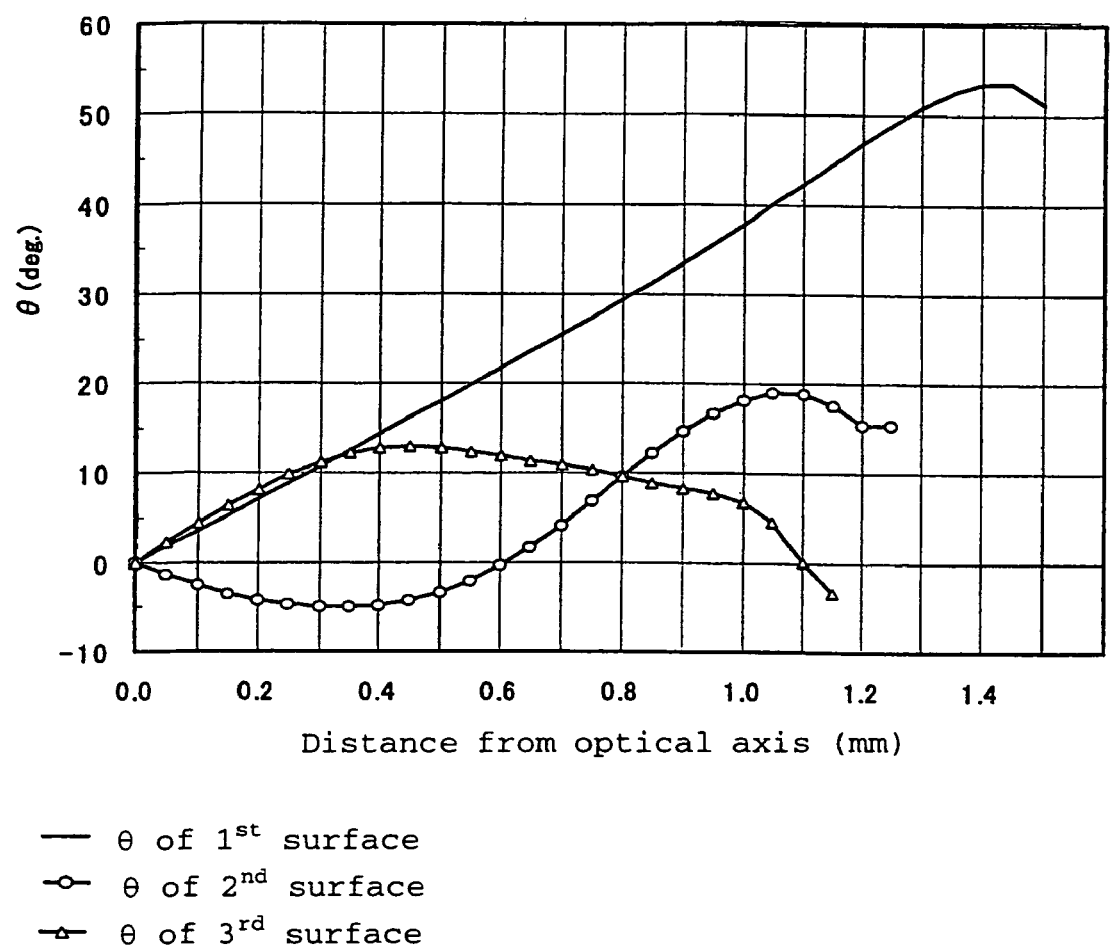
FIG. 5 is a graph showing the angle θ between the reference plane and a tangential plane, in relation to the distance from the optical axis 6 in the objective lens 2 of Example 1.
Figure 6:
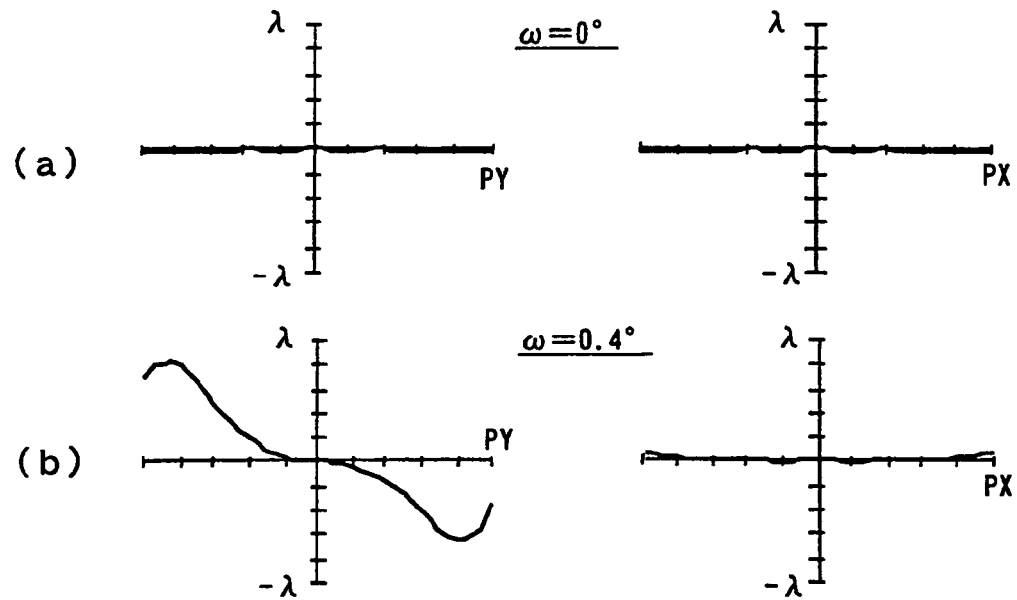
FIG. 6 is a view showing a wavefront aberration when recording or reproducing of HD 30 is carried out with the objective lens 2 of Example 1 under the condition that the incident angle of light of wavelength 405 nm is changed.

FIG. 5 is a graph showing the relation between e and the distance from the optical axis 6. FIG. 6 is a graph of an wavefront aberration at a time of recording or reproducing HD 30 with light of wavelength 405 nm under the condition that the angle ω of incident light is changed from 0.0° (FIG. 6(a)) to 0.4° (FIG. 6(b)). Here, in FIG. 6, both of PX axis and PY axis are axes in the incident pupil plane 8 and perpendicular to the optical axis 6, and the PX axis is perpendicular to the PY axis.

The condition that the angle ω of incident light is changed from 0.0° to 0.4°, is common to all of the following wavefront aberration diagrams in which PX and PY are shown.

Figure 7:
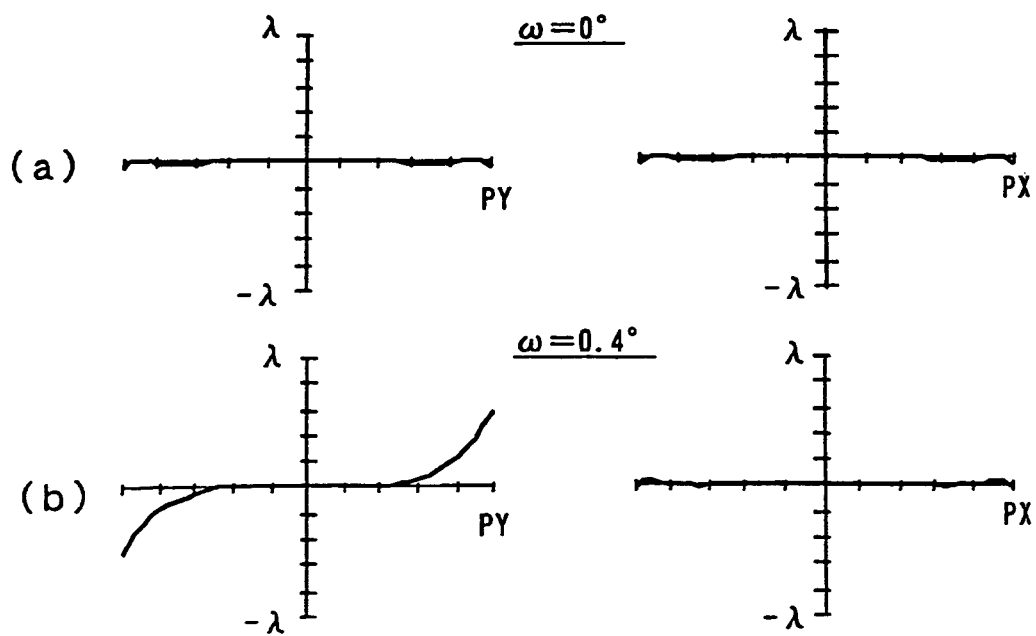
FIG. 7 is a view showing a wavefront aberration when recording or reproducing of DVD 40 is carried out with the objective lens 2 of Example 1 under the condition that the incident angle of light of wavelength 655 nm is changed.
Figure 8:
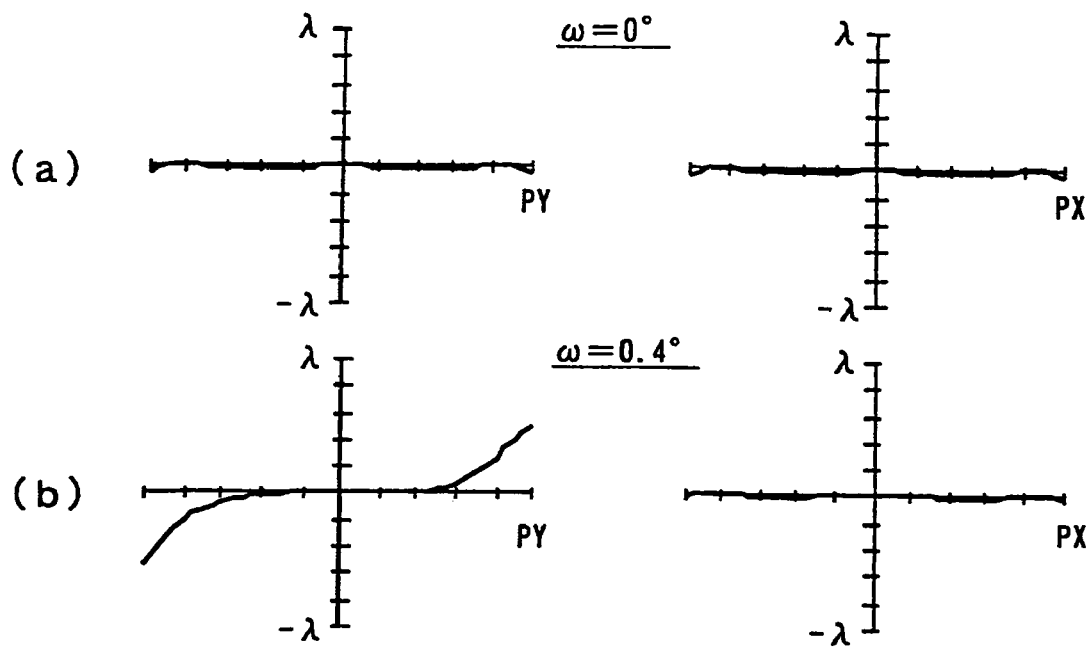
FIG. 8 is a view showing a wavefront aberration when recording or reproducing of CD 50 is carried out with the objective lens 2 of Example 1 under the condition that the incident angle of light of wavelength 785 nm is changed.

FIG. 7 is a wavefront aberration diagram in a case of recording or reproducing DVD 40 with light of wavelength 655 nm (ω=0.0° in FIG. 7(a) and ω=0.4° in FIG. 7(b)), FIG. 8 is a wavefront aberration diagram in a case of recording or reproducing CD 50 with light of wavelength 785 nm (ω=0.0° in FIG. 8(a) and ω=0.4° in FIG. 8(b)). Here, FIGS. 6 to 8 all show calculated results, and all drawings showing aberration characteristics (including RMS wavefront aberration diagrams) are all based on calculation results regardless of whether they are of Examples of the present invention or of Comparative Examples.

The values of wavefront aberrations at times of recording or reproducing HD, DVD and CD, each becomes a value of within ±1 λ (λ means 1 λ and –λ means –1 λ. This is applied to other graphs of wavefront aberration of the same type) even if the incident light angle ω of the laser light is changed from 0.0° to 0.4°.

Figure 9:
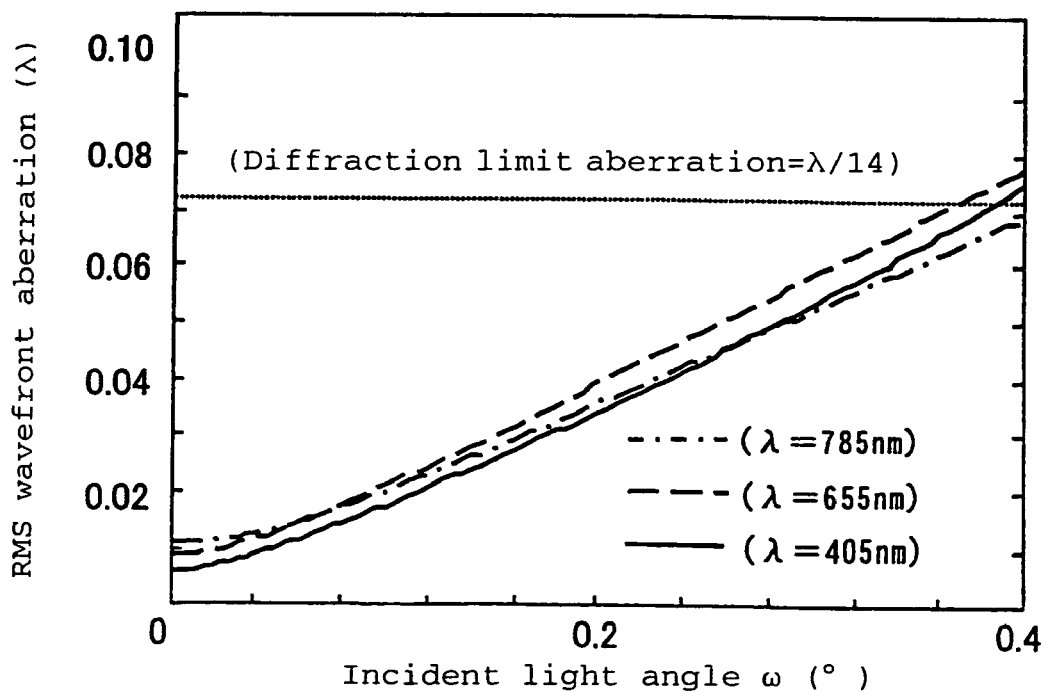
FIG. 9 is a view showing an RMS wavefront aberration of the objective lens 2 of Example 1, in which the angle ω of the incident light is taken as the abscissa.

FIG. 9 is an RMS wavefront aberration diagram having a horizontal axis representing the incident light angle (ω in e.g. FIG. 6), which shows a case of recording or reproducing HD 30 with light of wavelength 405 nm, a case of recording or reproducing DVD 40 with light of wavelength 655 nm and a case of recording or reproducing CD 50 with light of wavelength 785 nm. Here, in all of the following RMS wavefront aberration diagrams, the horizontal axis represents the incident light angle in the same manner as FIG. 9.

As shown in FIG. 9, the values of RMS wavefront aberrations in cases of recording or reproducing HD, DVD and CD, each becomes a value of at most 0.07λ within the diffraction limit under incident light angle ω of from 0 to 0.4°, which means that a good performance is achieved.

Since the aperture diameter described in Table 4 means the diameter E of incident light flux, from the working distances L described in Table 4, L/E=0.649/3.00≈1/4.622 at a time of recording or reproducing HD 30 with light of wavelength 405 nm, L/E=0.522/2.50≈1/4.789 at a time of recording or reproducing DVD 40 with light of wavelength of 655 nm, and L/E=0.260/2.08=1/8.000 at a time of recording or reproducing CD 50 with light of wavelength 785 nm. From these, it is understandable that long working distances with respect to the diameter E of incident light flux are obtained.

Generally speaking, since an objective lens for recording or reproducing HD is an objective lens of a high numerical aperture of NA=0.85, the radius of a surface on the light-source side becomes large and the shape tends to be difficult to fabricate. However, in the case of the objective lens 2 of Example 1, the maximum angle between the reference plane $S_0$ and a tangential plane tangent to an optional point on the first surface 2e is 53.5°, and the optional point is present in the vicinity of the peripheral portion of the effective diameter.

Further, θ on the second surface 2f is at most 20.0°, θ on the third surface 2g is at most 13.0°, and therefore, the metal mold for producing the aspherical surface of the objective lens can be easily produced.

Into the objective lens 2 and the optical pickup device to be produced, a parallel light flux of 3.0 mmΦ approximately in parallel with the optical axis 6 is incident to measure the wavefront aberration of the objective lens 2, by means of an optical interferometer of blue laser light of wavelength 405 nm. Further, by means of a laser interferometer of wavelength 655 nm, a parallel light flux of 2.5 mmΦ approximately in parallel with the optical axis 6 is incident to measure the wavefront aberration of the objective lens 2. Further, by means of a laser interferometer of wavelength 785 nm and a transmitting spherical reference, a finite light flux is formed, a light source arrangement providing the optimum magnification as designed is constituted. Then, the light flux is limited to be 2.08 mmΦ at a position of the aperture, and incident into the objective lens 2 to measure the wavefront aberration of the objective lens 2.

As a result, at each of the wavelengths 405 nm, 655 nm and 785 nm, RMS of wavefront aberration show a good value of from 0.02 λ to 0.04 λ provided that each wavelength is designated as λ. Each of these aberration values includes residual aberration due to deviation of wavelength of the measurement optics from the wavelength as designed. Namely, RMS wavefront aberration value of the objective lens is at most 0.04 λ, which provides an excellent optical performance. Further, the working distances are values close to the respective design values. If recording or reproducing of HD 30, DVD 40 and CD 50 are carried out with this optical pickup device, faithful recording or reproducing can be performed.

EXAMPLE 2

Comparative Example

Figure 34:
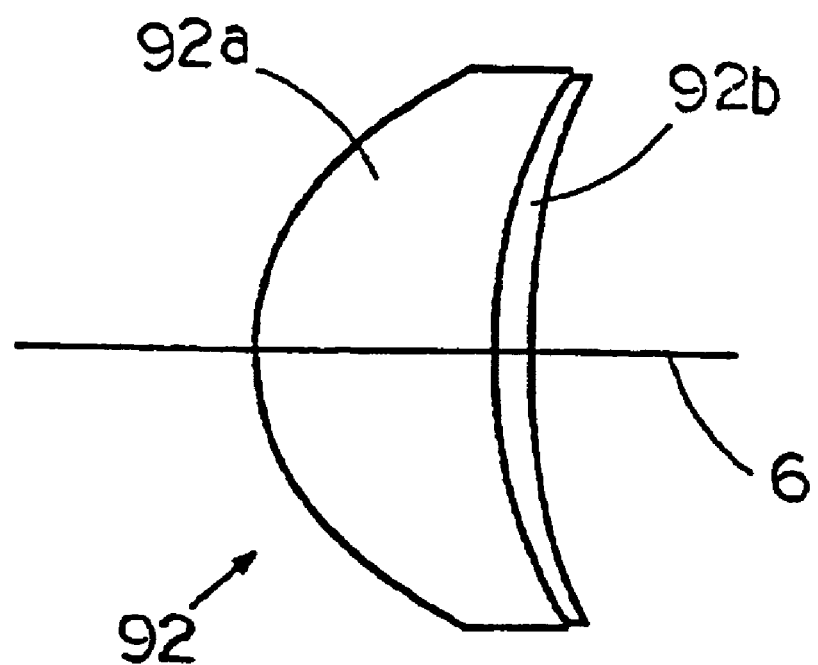
FIG. 34 is a view showing the construction of the objective lens of Example 2.

An objective lens 92 as shown in FIG. 34 is produced and an optical pickup device as shown in FIG. 3 is produced employing the objective lens 92. The material of the reference lens 92a and the material of the close-contact lens 92b are the same as those of Example 1. Tables 5 to 8 show the specification of the objective lens 92.

Figure 10:
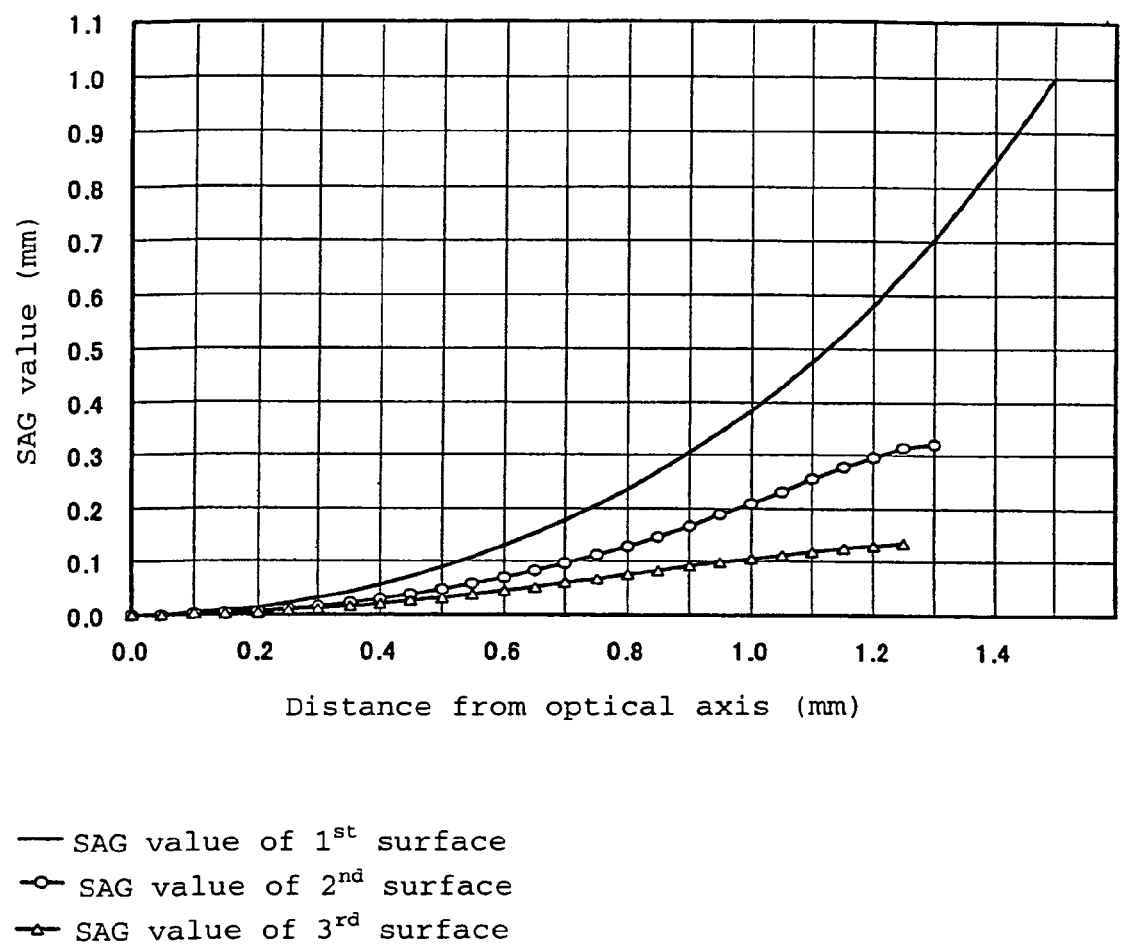
FIG. 10 is a graph showing the cross-sectional shape of the objective lens 62 of Example 2 shown by SAG value and the distance from the optical axis 6.
Figure 11:
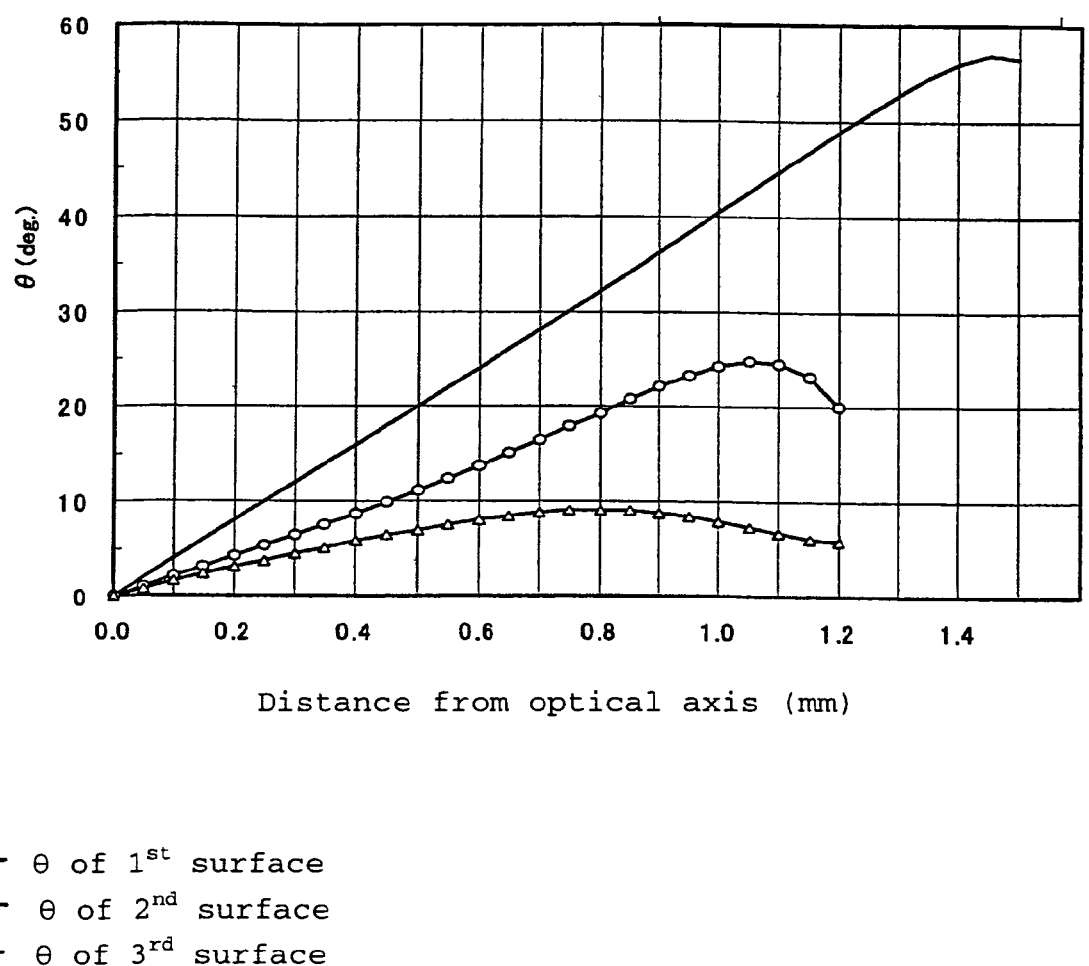
FIG. 11 is a graph showing the angle θ between the reference plane and a tangential plane, in relation to the distance from the optical axis 6 in the objective lens 2 of Example 2.

FIG. 10 is a graph showing the cross-sectional shape (corresponding to the shape shown in FIG. 2) of the objective lens 92 by SAG value and the distance from the optical axis 6. FIG. 11 is a graph showing the relation between θ and the distance from the optical axis 6.

Figure 12:
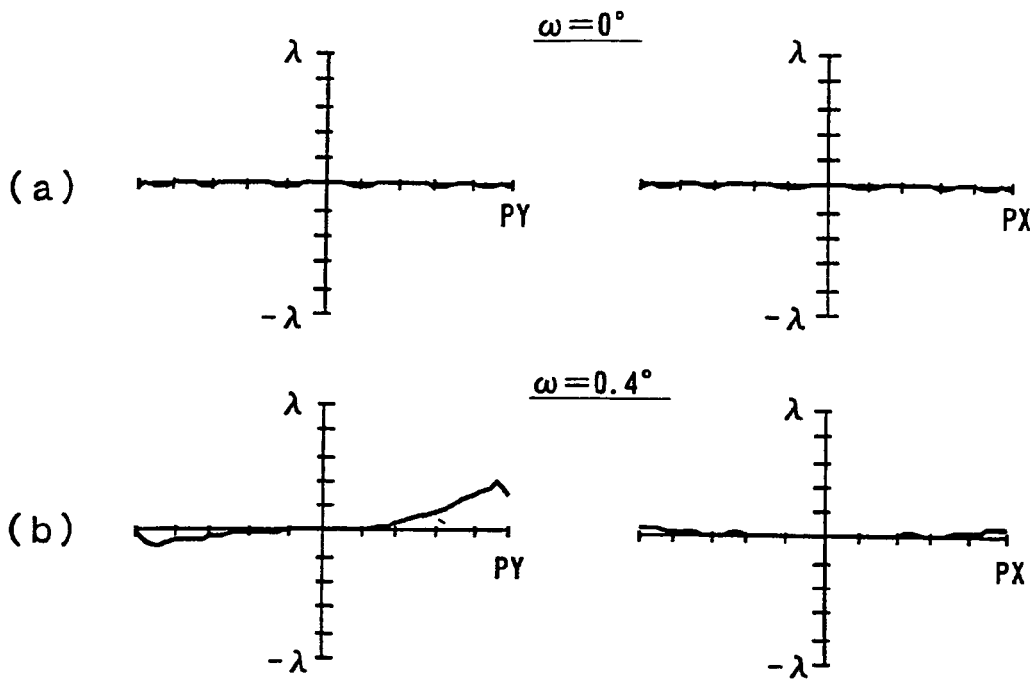
FIG. 12 is a view showing a wavefront aberration when recording or reproducing of HD 30 is carried out with the objective lens 2 of Example 2 under the condition that the incident angle of light of wavelength 405 nm is changed.
Figure 13:
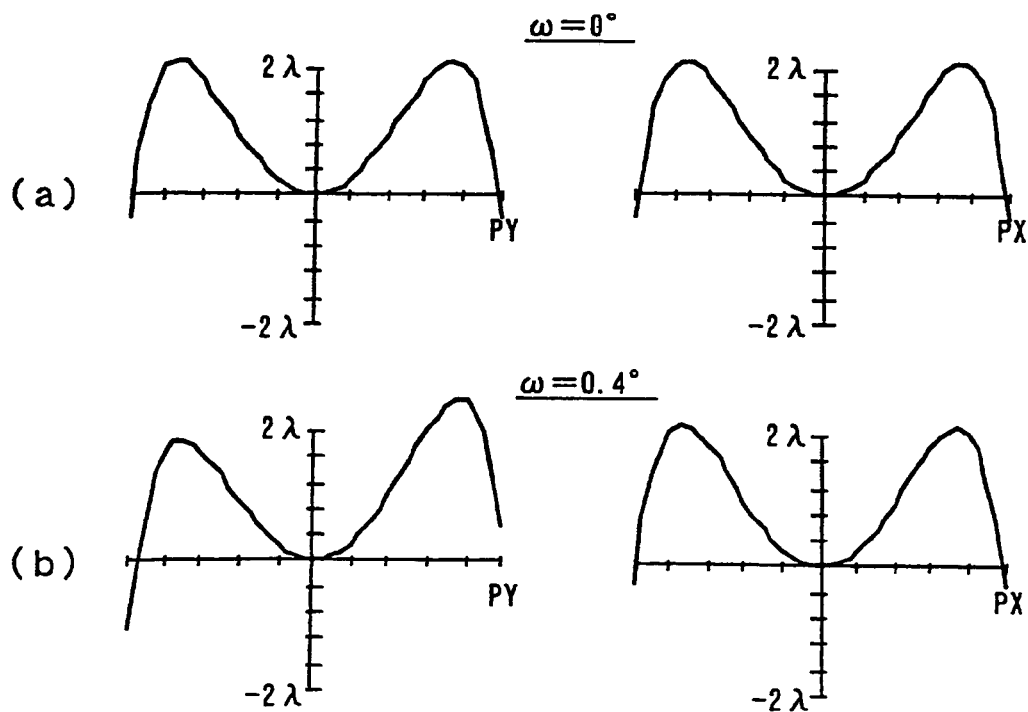
FIG. 13 is a view showing a wavefront aberration when recording or reproducing of DVD 40 is carried out with the objective lens 2 of Example 2 under the condition that the incident angle of light of wavelength 655 nm is changed.

FIG. 12 is a wavefront aberration diagram in a case of recording or reproducing HD 30 with light of wavelength 405 nm (ω=0.0° in FIG. 12(*a*) and ω=0.4° in FIG. 12(*b*)). FIG. 13 is a wavefront aberration diagram in a case of recording or reproducing DVD 40 with light of wavelength 655 nm (ω=0.0° in FIG. 13(*a*) and ω=0.4° in FIG. 13(*b*)), and FIG. 14 is a wavefront aberration diagram in a case of recording or reproducing CD 50 with light of wavelength 785 nm (ω=0.0° in FIG. 14(*a*) and ω=0.4° in FIG. 14(*b*)).

The value of the wavefront aberration at a time of recording or reproducing HD becomes, as shown in FIG. 12, a value within ±1 λ even under the conditions that the incident light angle λ of the laser light is changed from 0.0° to 0.4°. Further, as shown in FIG. 15, the value of RMS wavefront aberration at a time of recording or reproducing HD also becomes a value of at most 0.07 λ below the diffraction limit.

Figure 15:
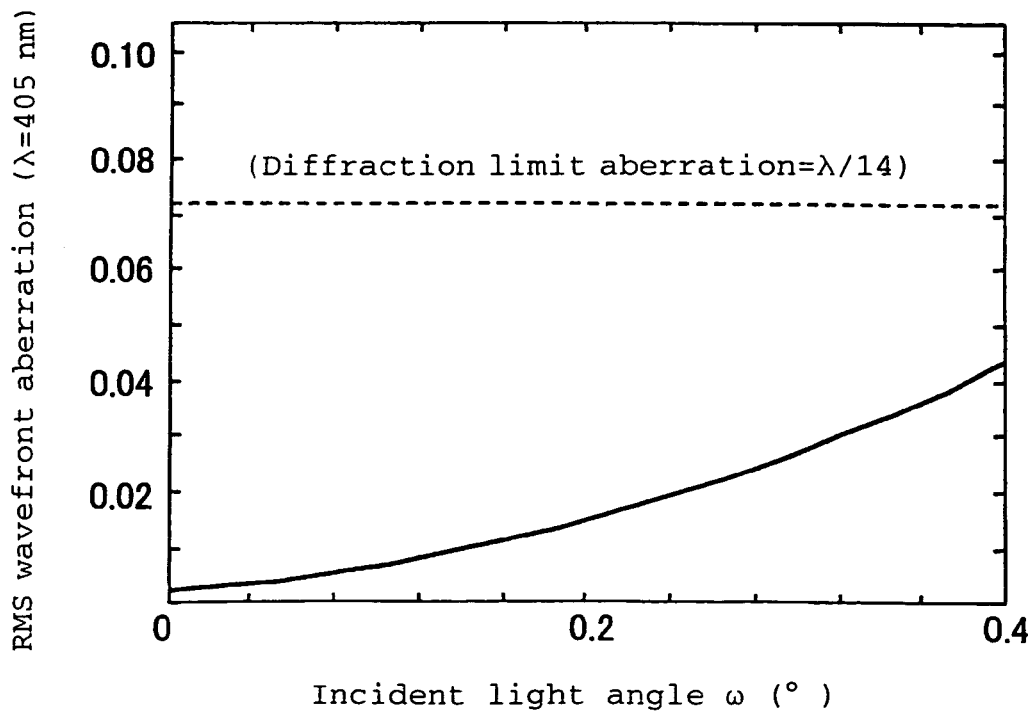
FIG. 15 is a view showing an RMS wavefront aberration of the objective lens 2 Example 2, in which the angle ω of the incident light is taken as the abscissa.

The value of RMS wavefront aberration at a time of 15' recording or reproducing DVD and CD are not shown in FIG. 15 since these values are so poor to scale out of the graph. The value of RMS wavefront aberration at a time of recording or reproducing DVD is about 0.68 λ and the value of RMS wavefront aberration at a time of recording or reproducing CD is about 0.42 λ under a range of incident light angle ω of from 0.0° to 0.4°.

Figure 14:
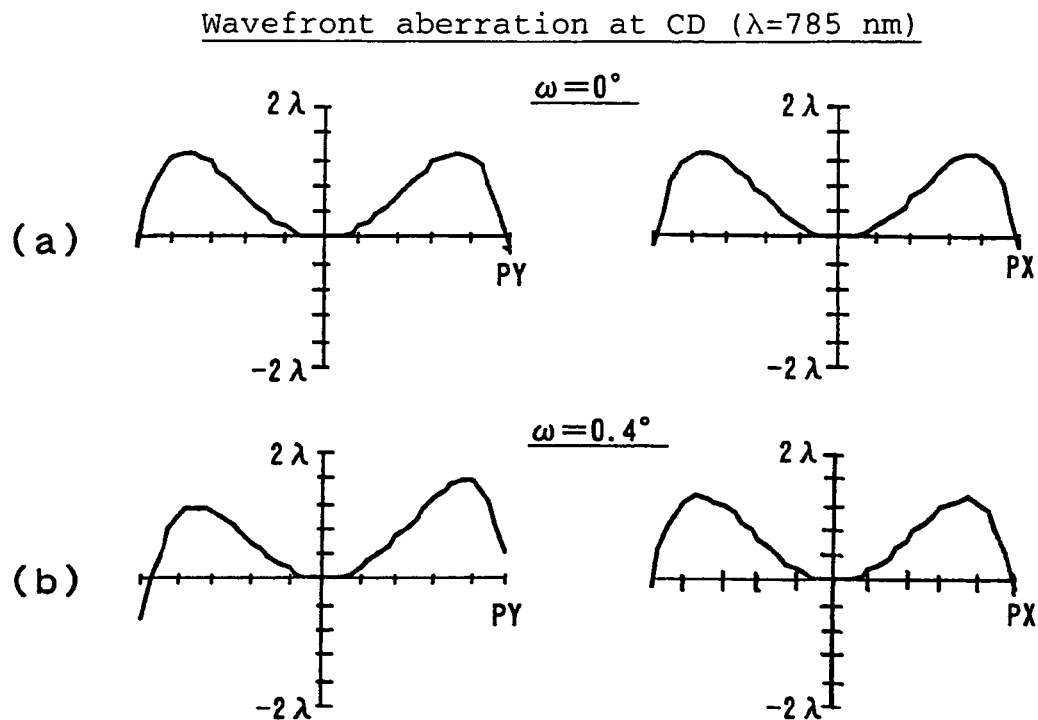
FIG. 14 is a view showing a wavefront aberration when recording or reproducing of CD 50 is carried out with the objective lens 2 of Example 2 under the condition that the incident angle of light of wavelength 785 nm is changed.

The values of wavefront aberrations at a time of recording or reproducing DVD and CD become values exceeding 2 λ even at the optimum imaging point where ω is 0.0° as shown in FIG. 13 and FIG. 14 respectively, such being not preferred. Further, as described above, the value of RMS wavefront aberration at a time of recording or reproducing DVD or CD exceeds 0.07 λ, and the diffraction limit performance cannot be achieved.

Accordingly, it is not possible to record or reproduce DVD or CD with the objective lens 62 of Example 2. When recording or reproducing of CD, DVD 40 and CD 50 are carried out with the optical pickup device, although HD 30 can be faithfully recorded or reproduced, DVD 40 and CD 50 cannot be recorded or reproduced.

EXAMPLE 3

Example of the Present Invention

An objective lens 2 as shown in FIG. 1 is produced and an optical pickup device as shown in FIG. 3 is produced employing the objective lens 2. The material of the reference lens 2a is the same as that of Example 1 and the material of the close-contact lens 2b is polycarbonate. Tables 9 to 12 show the specification of objective lens 2.

Figure 16:
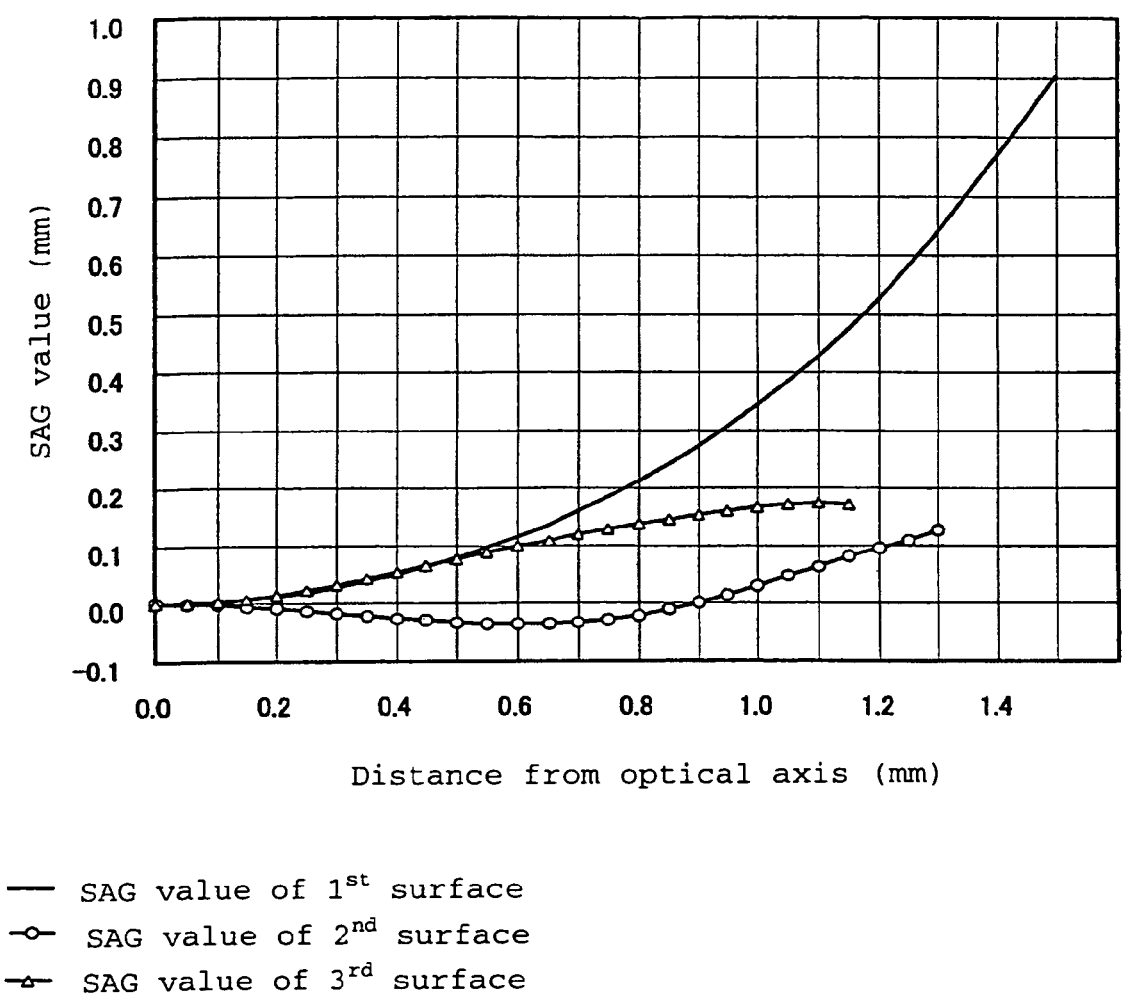
FIG. 16 is a graph showing a cross-sectional shape of the objective lens of Example 3 shown by SAG value and the distance from the optical axis 6.
Figure 17:
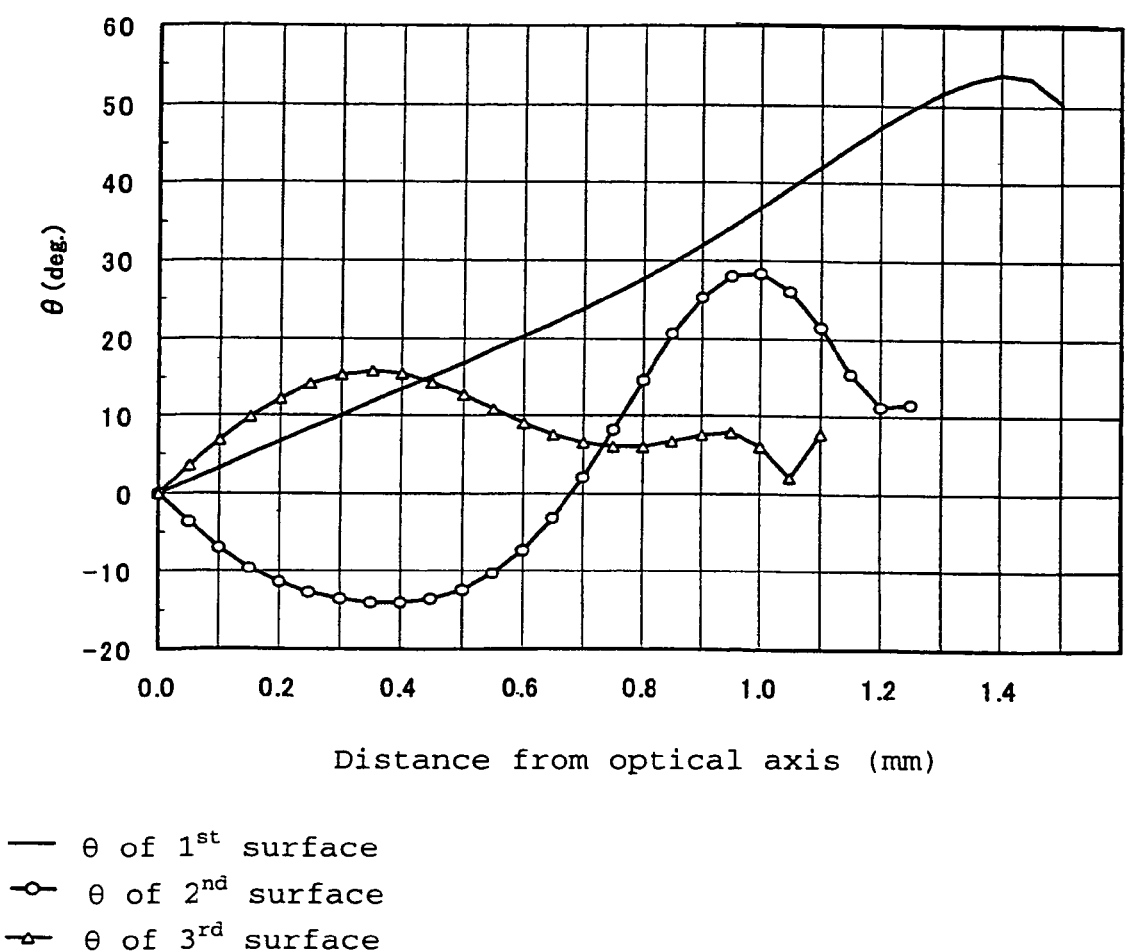
FIG. 17 is a graph showing the angle θ between the reference plane and a tangential plane, in relation to the distance from the optical axis 6 in the objective lens 2 of Example 3.

FIG. 16 is a graph showing the cross-sectional shape (corresponding to the shape shown in FIG. 1) of the objective lens 2 by SAG value and the distance from the optical axis 6. FIG. 17 is a graph showing the relation between θ and the distance from the optical axis 6.

Figure 18:
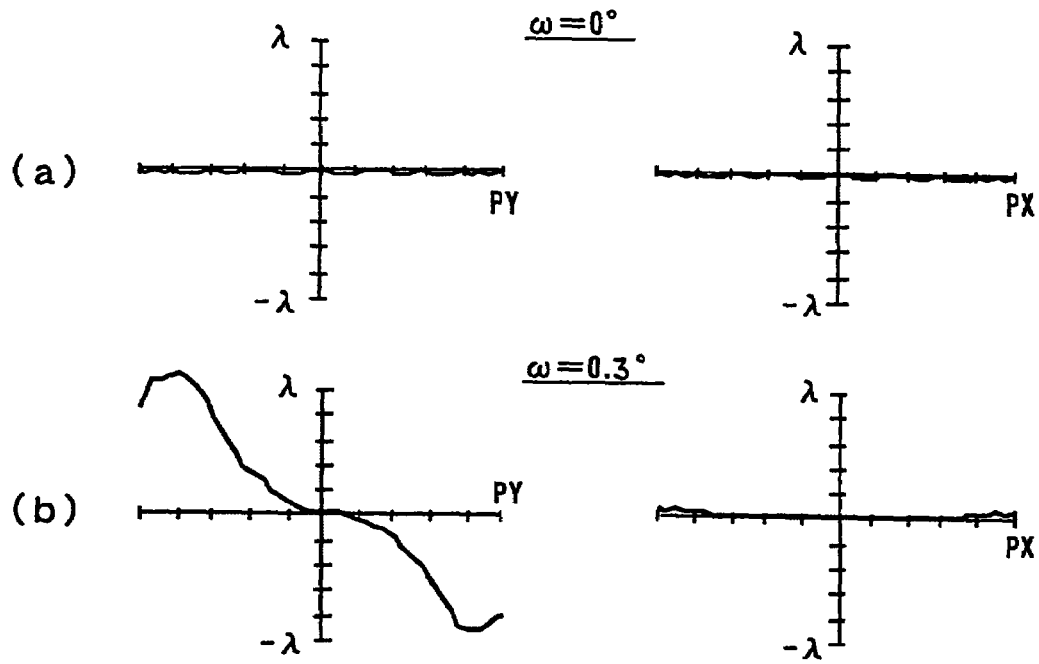
FIG. 18 is a view showing a wavefront aberration when recording or reproducing of HD 30 is carried out with the objective lens 2 of Example 3 under the condition that the incident angle of light of wavelength 405 nm is changed.
Figure 19:
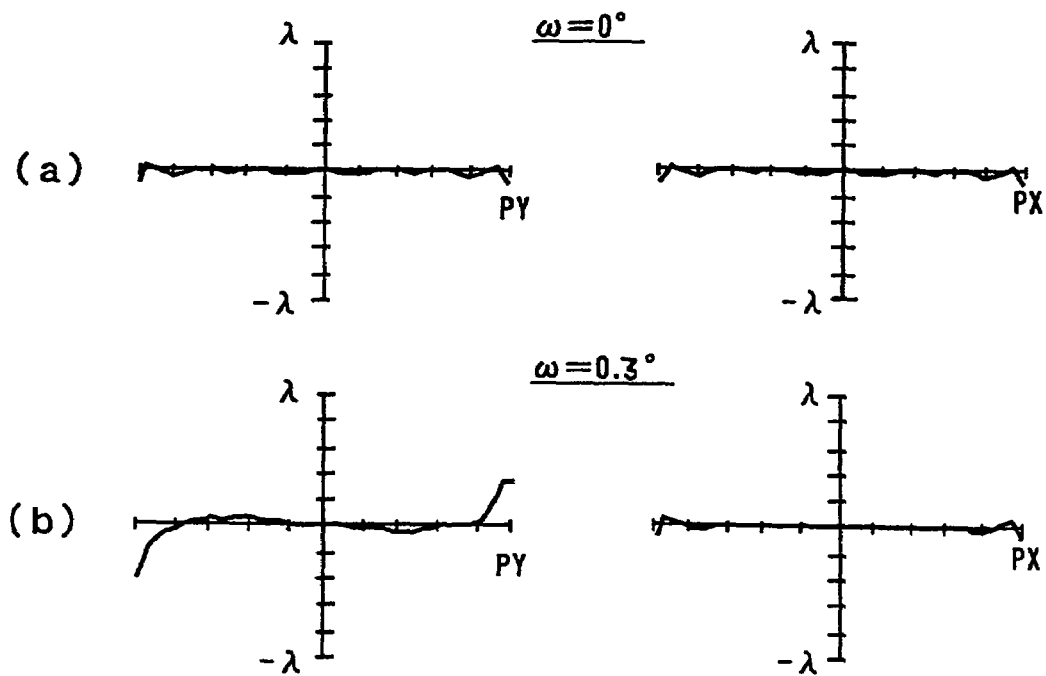
FIG. 19 is a view showing a wavefront aberration when recording or reproducing of DVD 40 is carried out with the objective lens 2 of Example 3 under the condition that the incident angle of light of wavelength 655 nm is changed.
Figure 20:
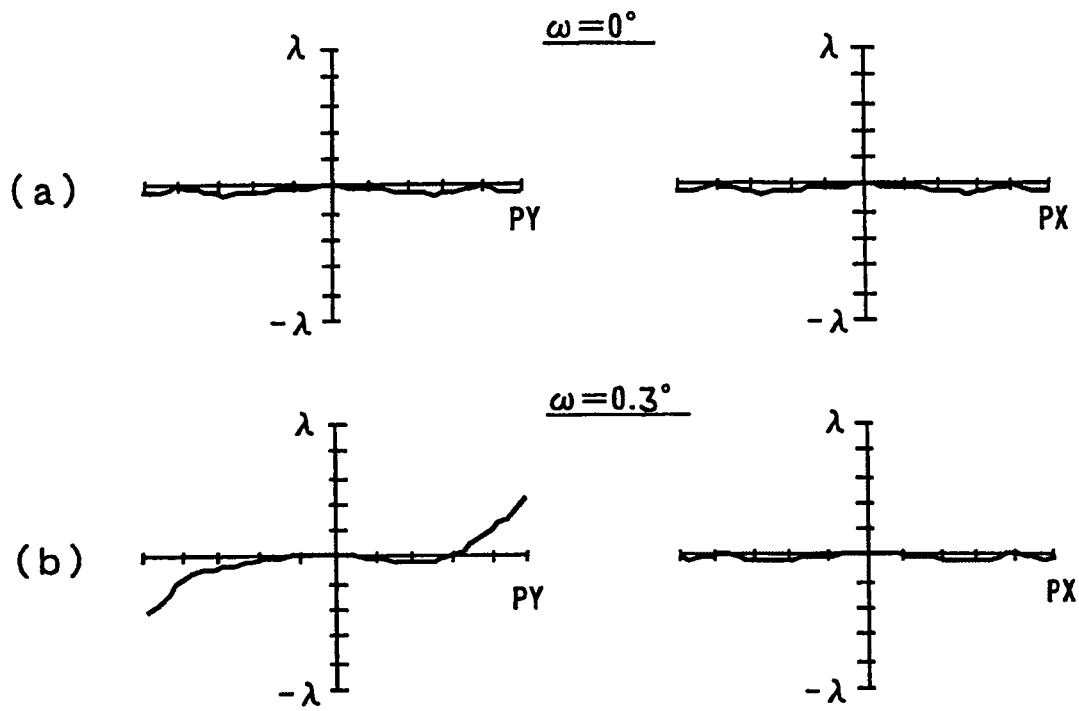
FIG. 20 is a view showing a wavefront aberration when recording or reproducing of CD 50 is carried out with the objective lens 2 of Example 3 under the condition that the incident angle of light of wavelength 785 nm is changed.

FIG. 18 is a wavefront aberration diagram at a time of recording or reproducing HD 30 with light of wavelength 405 nm (ω=0.0° in FIG. 18(*a*) and ω=0.3° in FIG. 18(*b*)). FIG. 19 is a wavefront aberration diagram in a case of recording of reproducing DVD 40 with light of wavelength 655 nm (ω=0.0° in FIG. 19(*a*) and ω=0.3° in FIG. 19(*b*)). FIG. 20 is a wavefront aberration diagram in a case of recording or reproducing CD 50 with light of wavelength 785 nm (ω=0.0° in FIG. 20(*a*) and ω=0.3° in FIG. 20(*b*)).

The values of wavefront aberrations at times of recording or reproducing HD, DVD and CD each becomes, as shown in FIGS. 18 to 20, a value within ±1 λ even under the condition that the incident light angle ω of the laser light is changed from 0.0° to 0.3°.

Figure 21:
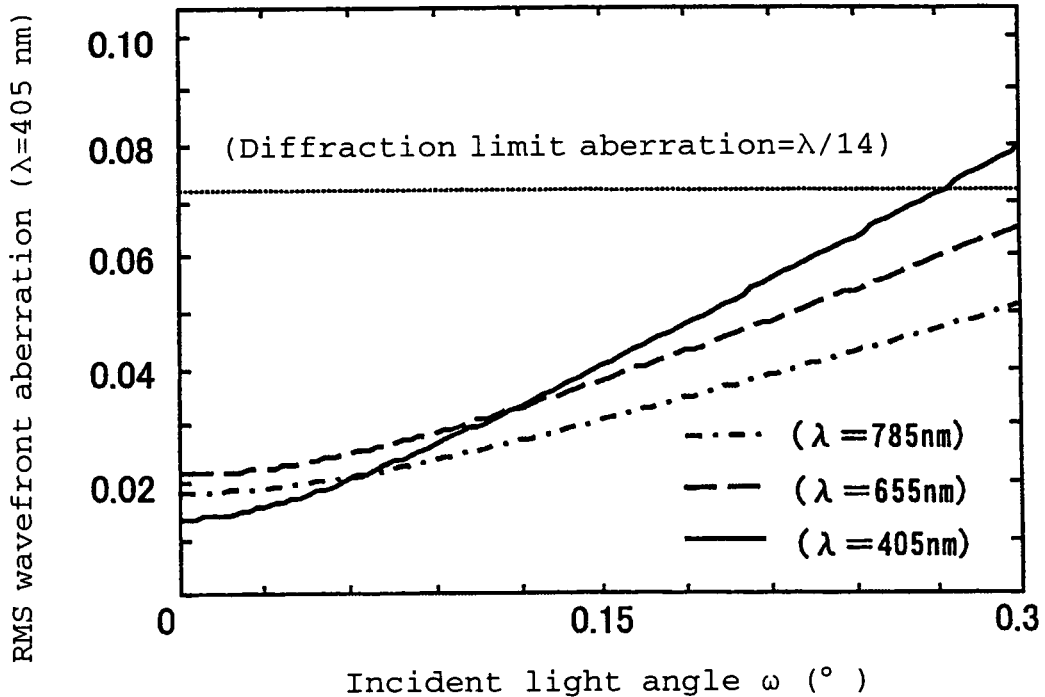
FIG. 21 is a view showing an RMS wavefront aberration of the objective lens 2 of Example 3 in which the angle ω of the incident light is taken as the abscissa.

FIG. 21 is a RMS wavefront aberration diagram whose horizontal axis represents the incident light angle ω, which shows a case of recording or reproducing HD 30 with light of wavelength 405 nm, a case of recording or reproducing DVD 40 with light of wavelength 655 nm and a case of recording or reproducing CD 50 with light of wavelength 785 nm.

As shown in FIG. 21, values of RMS wavefront aberration at times of recording or reproducing HD, DVD, and CD each becomes a value within a diffraction limit of at most 0.07 λ and achieves a good performance. If recording or reproducing of HD 30, DVD 40 and CD 50 are carried out with the optical pickup device, faithful recording or reproducing is possible.

EXAMPLE 4

Example of the Present Invention

An objective lens 2 as shown in FIG. 1 is produced and an optical pickup device as shown in FIG. 3 is produced employing the objective lens 2. The material of the reference lens 2a is the same as that in Example 1 and the material of the close-contact lens 2b is Cytop. Tables 13 to 16 show the specification of the objective lens 2.

Figure 22:
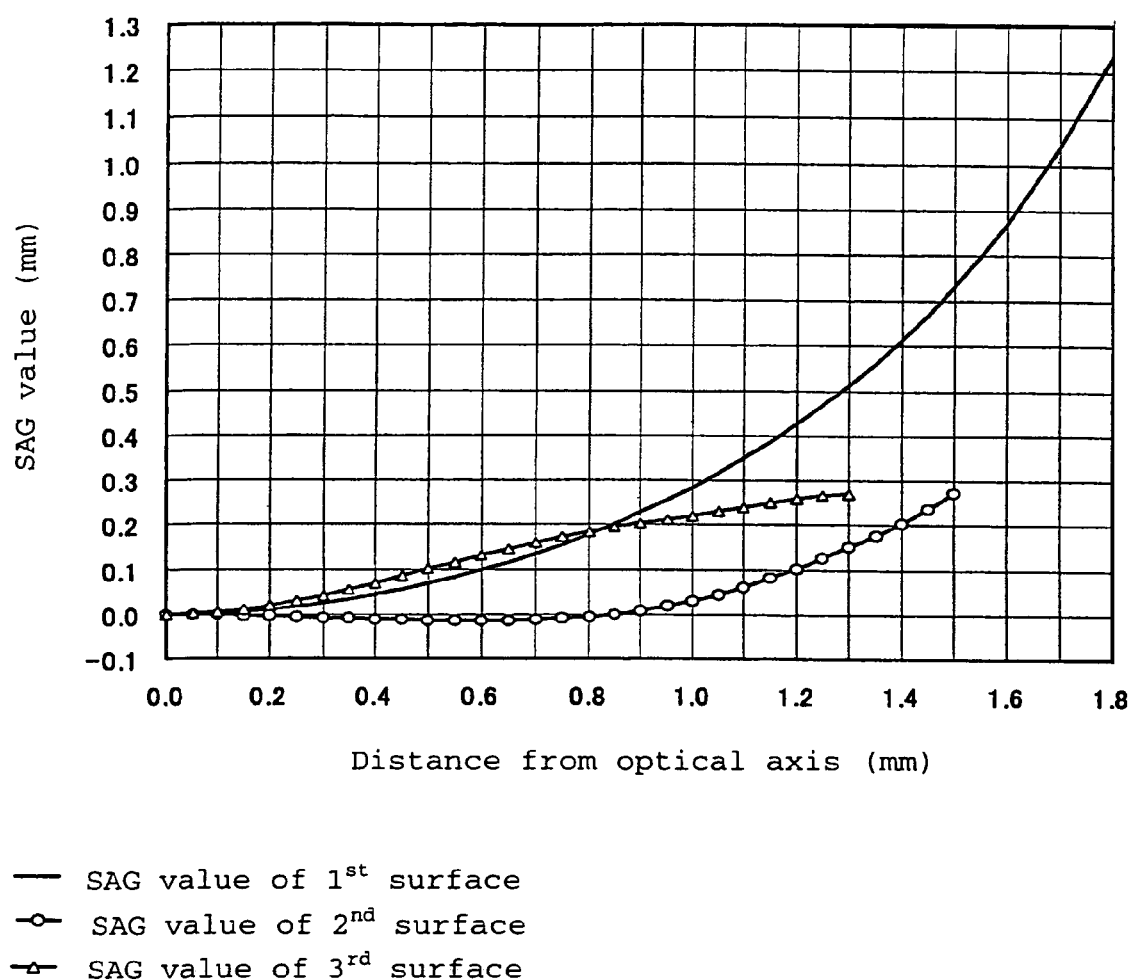
FIG. 22 is a graph showing a cross-sectional shape of the objective lens 2 of Example 4 by SAG value and the distance from the optical axis 6.
Figure 23:
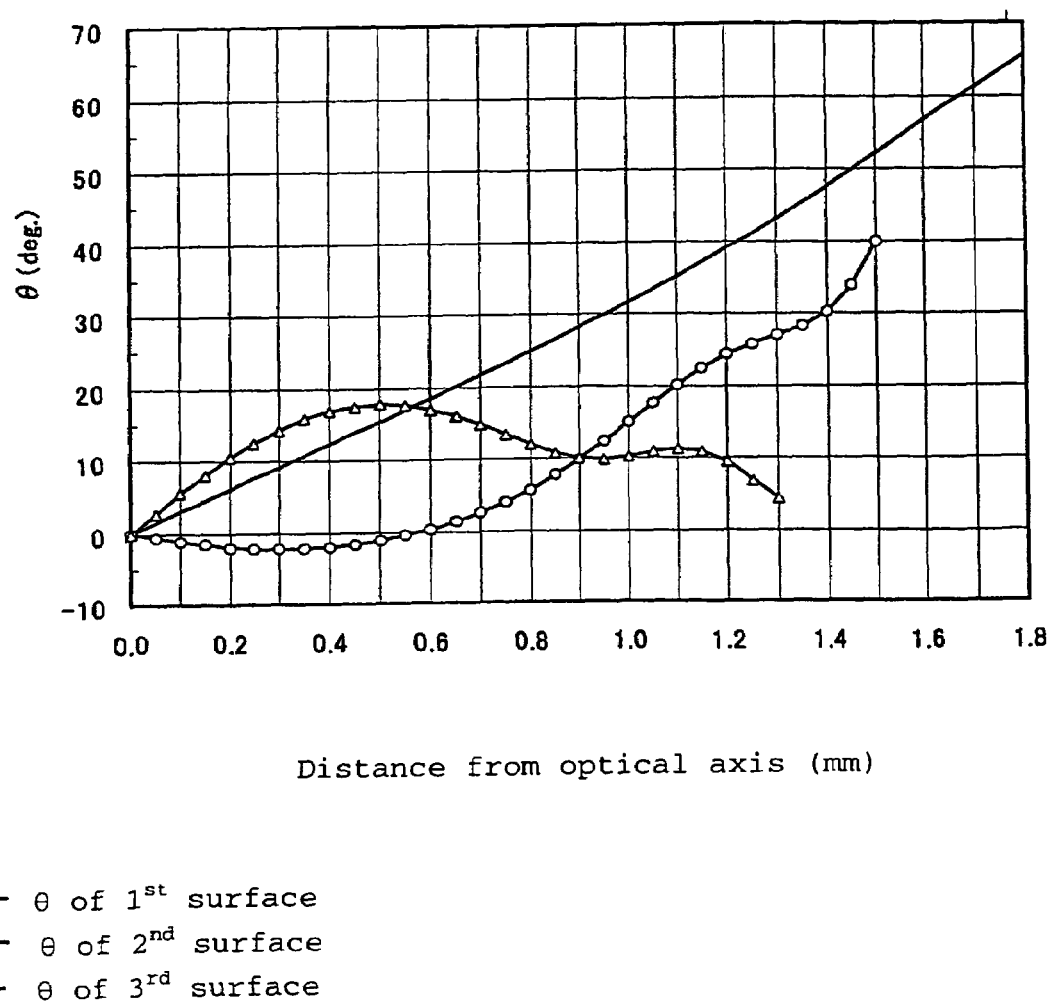
FIG. 23 is a graph showing an angle θ between the reference plane and a tangential plane, in relation to the distance from the optical axis 6 in the objective lens 2 of Example 4.

FIG. 22 is a graph showing the cross-sectional shape (corresponding to the shape shown in FIG. 1) of the objective lens 2 by SAG value and the distance from the optical axis 6. FIG. 23 is a graph showing the relation between θ and the distance from the optical axis 6.

Figure 24:
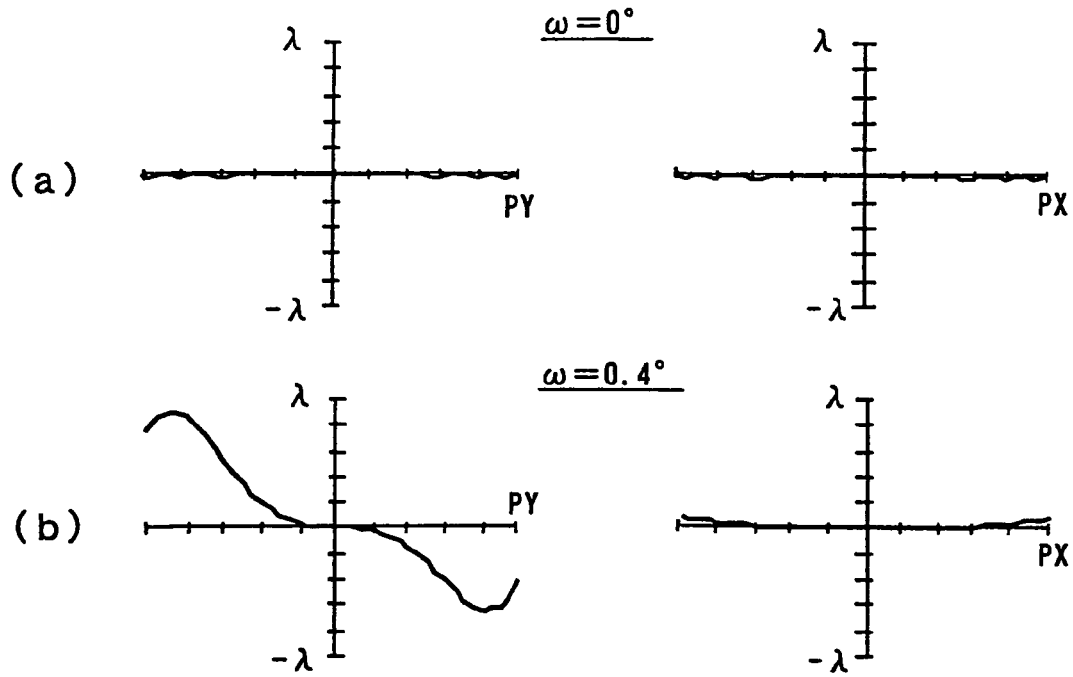
FIG. 24 is a view showing a wavefront aberration when recording or reproducing of HD 30 is carried out with the objective lens 2 of Example 4 under the condition that the incident angle ω of light of wavelength 405 nm is changed.
Figure 25:
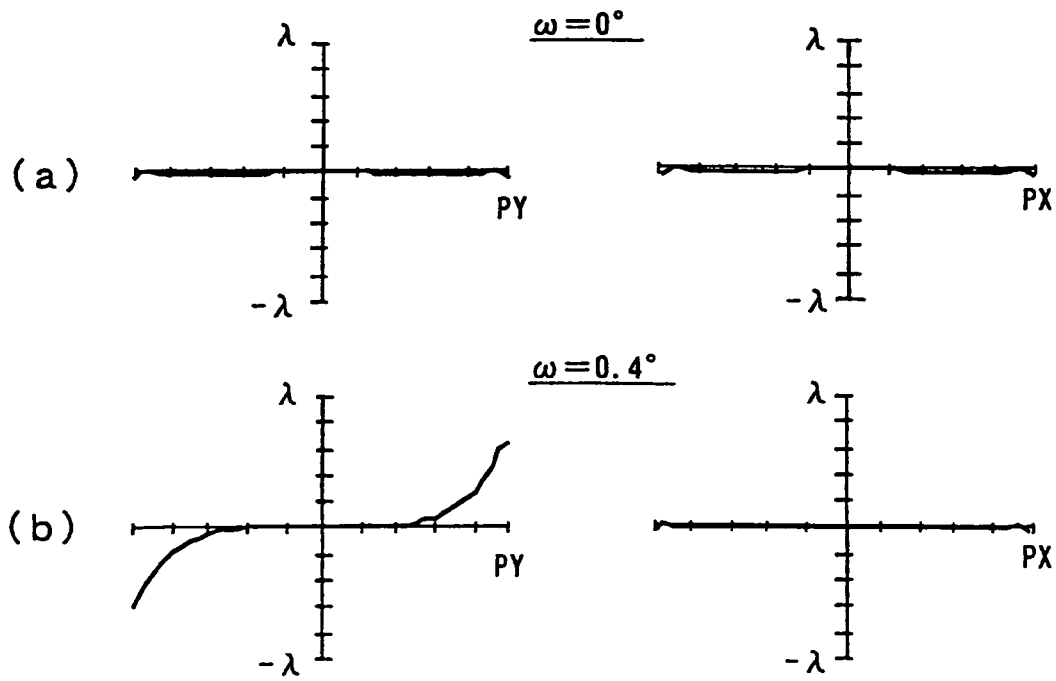
FIG. 25 is a view showing a wavefront aberration when recording or reproducing of DVD 40 is carried out with the objective lens 2 of Example 4 under the condition that the incident angle ω of light of wavelength 655 nm is changed.
Figure 26:
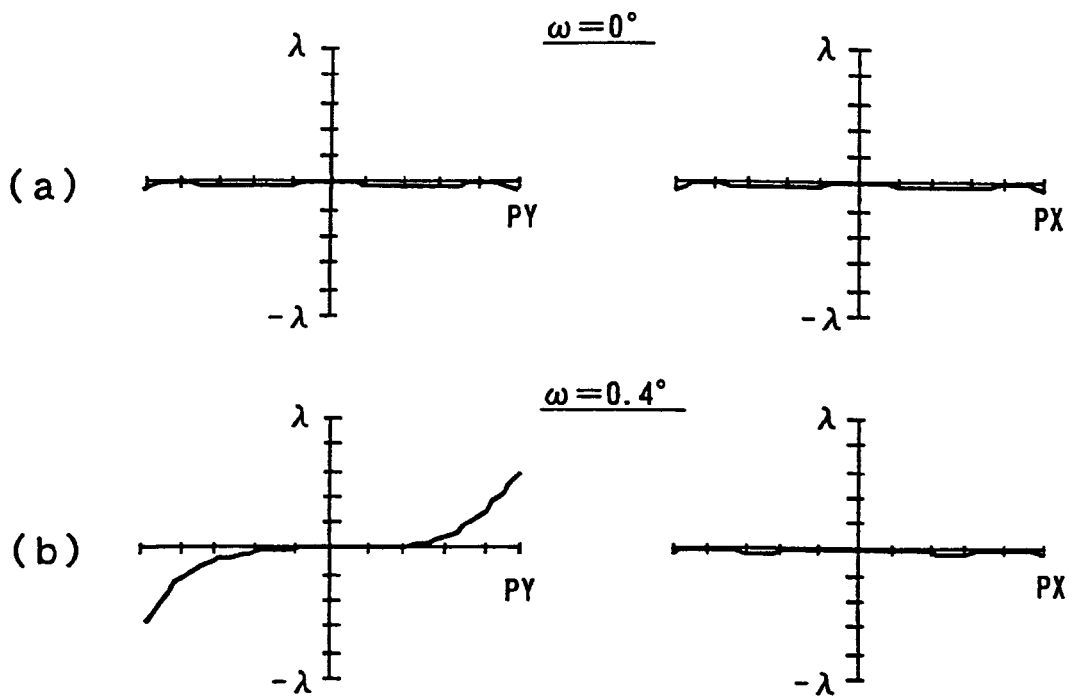
FIG. 26 is a view showing a wavefront aberration when recording or reproducing of CD 50 is carried out with the objective lens 2 of Example 4 under the condition that the incident angle ω of light of wavelength 785 nm is changed.

FIG. 24 is a wavefront aberration diagram at a time of recording or reproducing HD 30 with light of wavelength 405 nm (ω=0.0° in FIG. 24(a) and ω=0.4° in FIG. 24(b)). FIG. 25 is a wavefront aberration diagram in a case of recording of reproducing DVD 40 with light of wavelength 655 nm (ω=0.0° in FIG. 25(a) and ω=0.4° in FIG. 25(b)). FIG. 26 is a wavefront aberration diagram in a case of recording or reproducing CD 50 with light of wavelength 785 nm (ω=0.0° in FIG. 26(a) and ω=0.4° in FIG. 26(b)).

The values of wavefront aberrations at times of recording or reproducing HD, DVD and CD each becomes, as shown in FIGS. 24 to 26, a value within ±1 λ even under the condition that the incident light angle ω of the laser light is changed from 0.0° to 0.4°.

Figure 27:
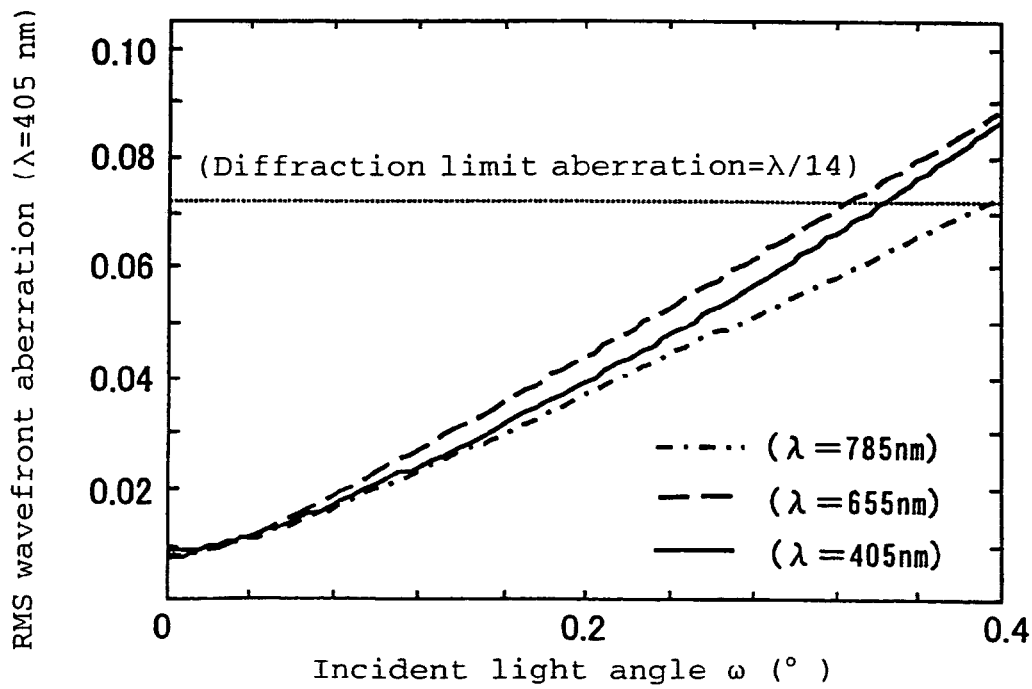
FIG. 27 is a view showing an RMS wavefront aberration of the objective lens of Example 4, in which the angle ω of the incident light is taken as the abscissa.

FIG. 27 is a RMS wavefront aberration diagram whose horizontal axis represents the incident light angle ω, which shows a case of recording or reproducing HD 30 with light of wavelength 405 nm, a case of recording or reproducing DVD 40 with light of wavelength 655 nm and a case of recording or reproducing CD 50 with light of wavelength 785 nm.

As shown in FIG. 27, values of RMS wavefront aberration at times of recording or reproducing HD, DVD, and CD each becomes a value within a diffraction limit of at most 0.07 λ and achieves a good performance. When recording or reproducing of HD 30, DVD 40 and CD 50 were carried out with the optical pickup device, faithful recording or reproducing was possible.

EXAMPLE 5

Example of the Present Invention

An objective lens 2 as shown in FIG. 1 is produced and an optical pickup device as shown in FIG. 3 is produced employing the objective lens 2. The material of the reference lens 2a is K-VC89 a trade name manufactured by SUMIDA Optical Glass Inc. and the material of the close-contact lens 2b is the same as that in Example 1. Tables 17 to 20 show the specification of the objective lens 2.

Figure 28:
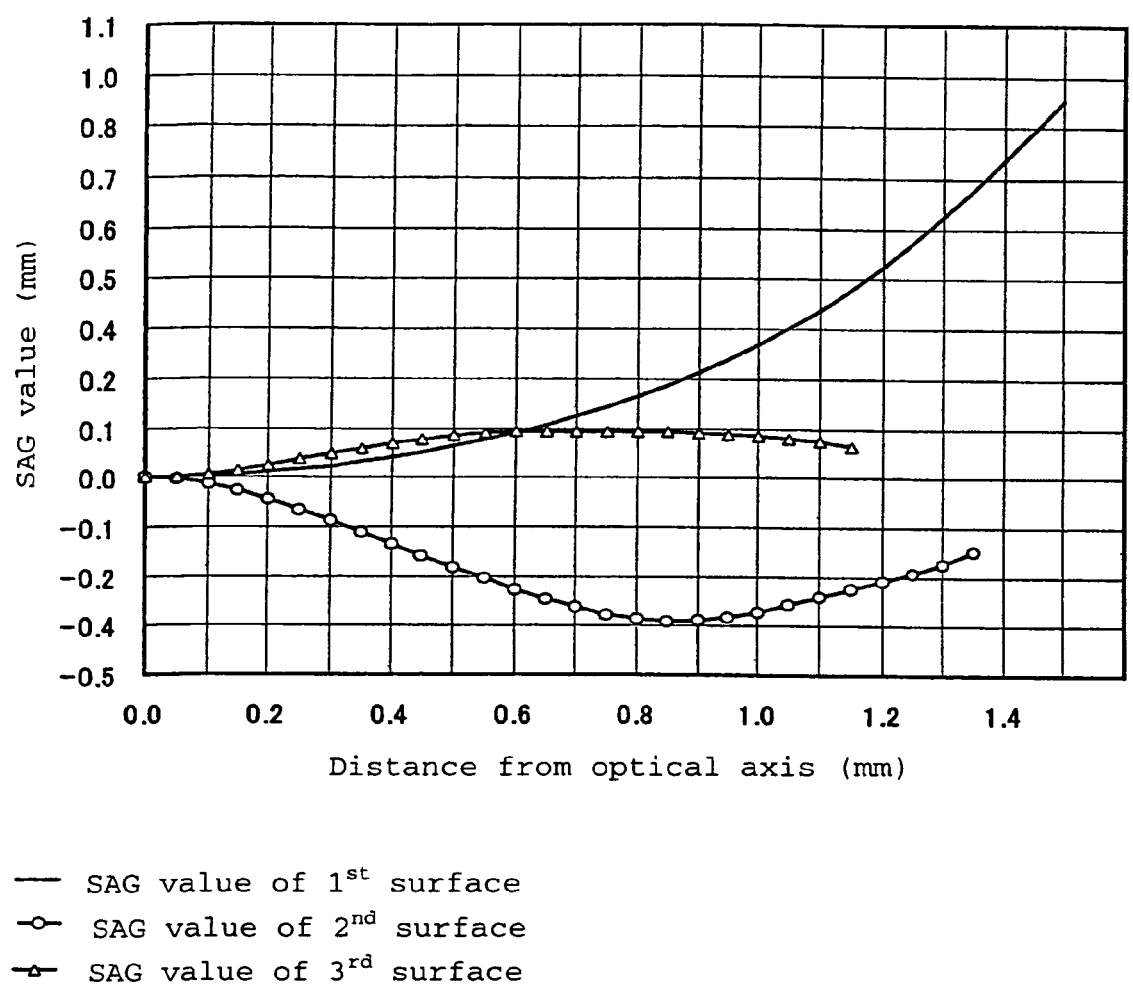
FIG. 28 is a graph showing a cross-sectional shape of the objective lens 2 of Example 5 by SAG value and the distance from the optical axis 6.
Figure 29:
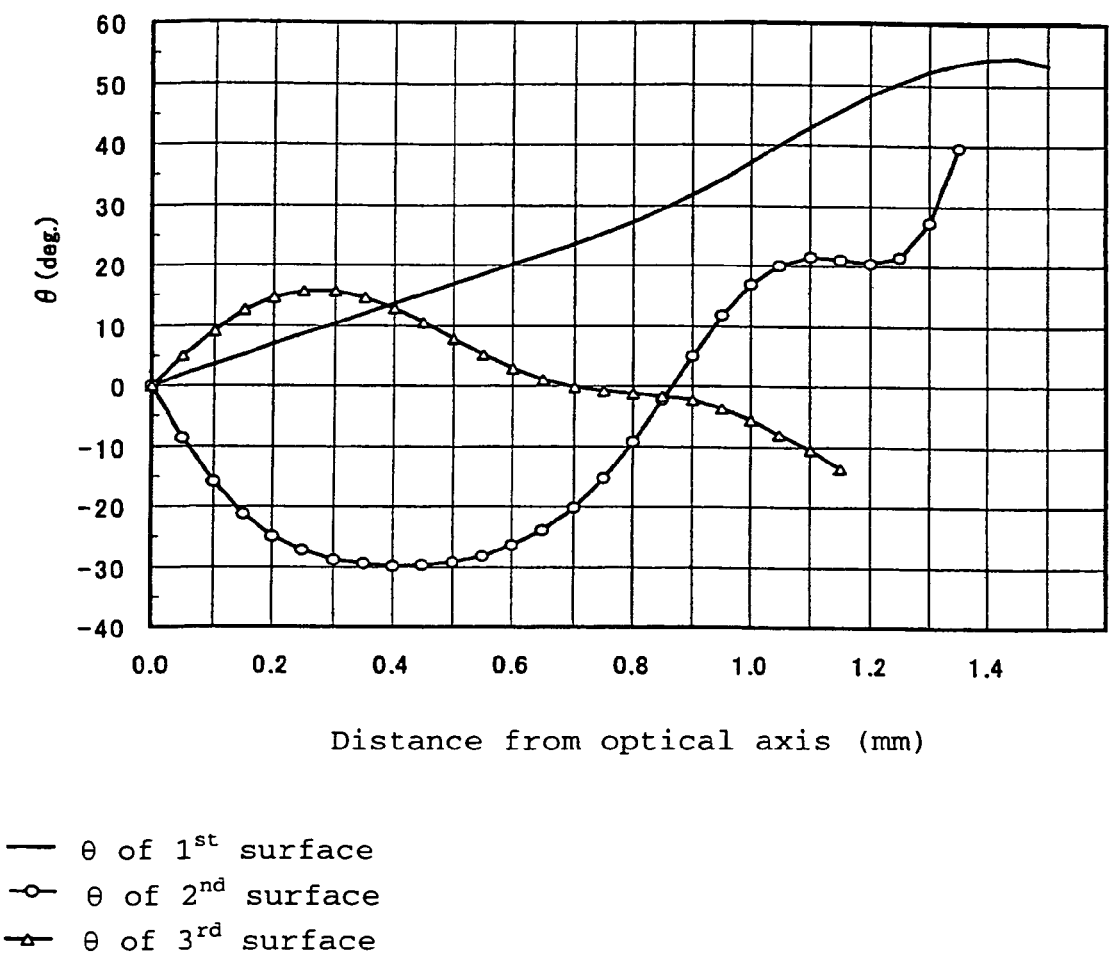
FIG. 29 is a graph showing an angle θ between the reference plane and a tangential plane, in relation to the distance from the optical axis between the objective lens 2 of Example 5.

FIG. 28 is a graph showing the cross-sectional shape (corresponding to the shape shown in FIG. 1) of the objective lens 2 by SAG value and the distance from the optical axis 6. FIG. 29 is a graph showing the relation between θ and the distance from the optical axis 6.

Figure 30:
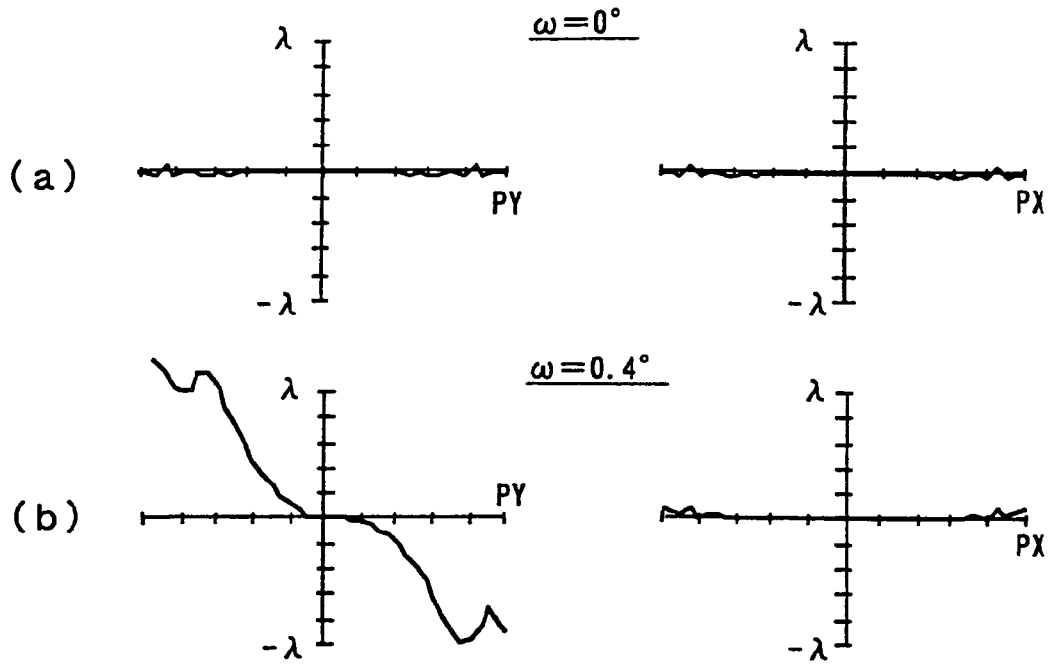
FIG. 30 is a view showing a wavefront aberration when recording or reproducing of HD 30 is carried out with the objective lens 2 of Example 5 under the condition that the incident angle ω of light of wavelength 405 nm is changed.
Figure 31:
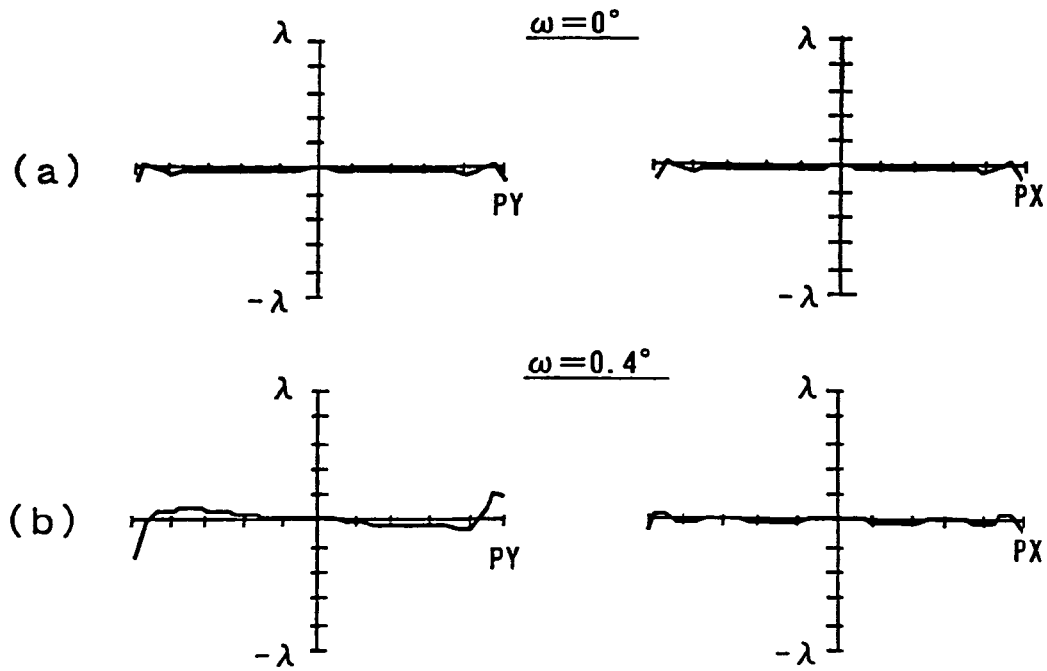
FIG. 31 is a view showing a wavefront aberration when recording or reproducing of DVD 40 is carried out with the objective lens 2 with Example 5 under the condition that the incident angle ω of light of wavelength 655 nm is changed.
Figure 32:
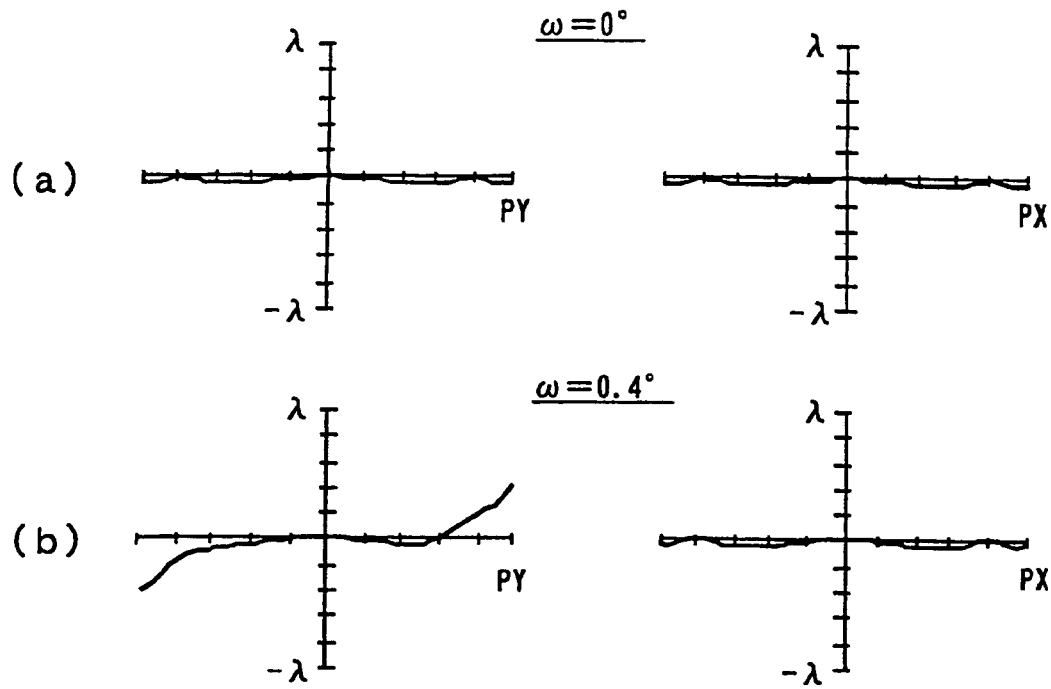
FIG. 32 is a view showing a wavefront aberration when recording or reproducing of CD 50 is carried out with the objective lens 2 of Example 5 under the condition that the incident angle ω of light of wavelength 785 nm is changed.

FIG. 30 is a wavefront aberration diagram at a time of recording or reproducing HD 30 with light of wavelength 405 nm (ω=0.0° in FIG. 30(a) and ω=0.4° in FIG. 30(b)). FIG. 31 is a wavefront aberration diagram in a case of recording of reproducing DVD 40 with light of wavelength 655 nm (ω=0.0° in FIG. 31(a) and ω=0.4° in FIG. 31(b)). FIG. 32 is a wavefront aberration diagram in a case of recording or reproducing CD 50 with light of wavelength 785 nm (ω=0.0° in FIG. 32(a) and ω=0.4° in FIG. 32(b)).

The values of wavefront aberration at times of recording or reproducing HD, DVD and CD each becomes, as shown in FIGS. 30 to 32, a value within ±1 λ even under the condition that the incident light angle ω of the laser light is changed from 0.0° to 0.4°.

Figure 33:
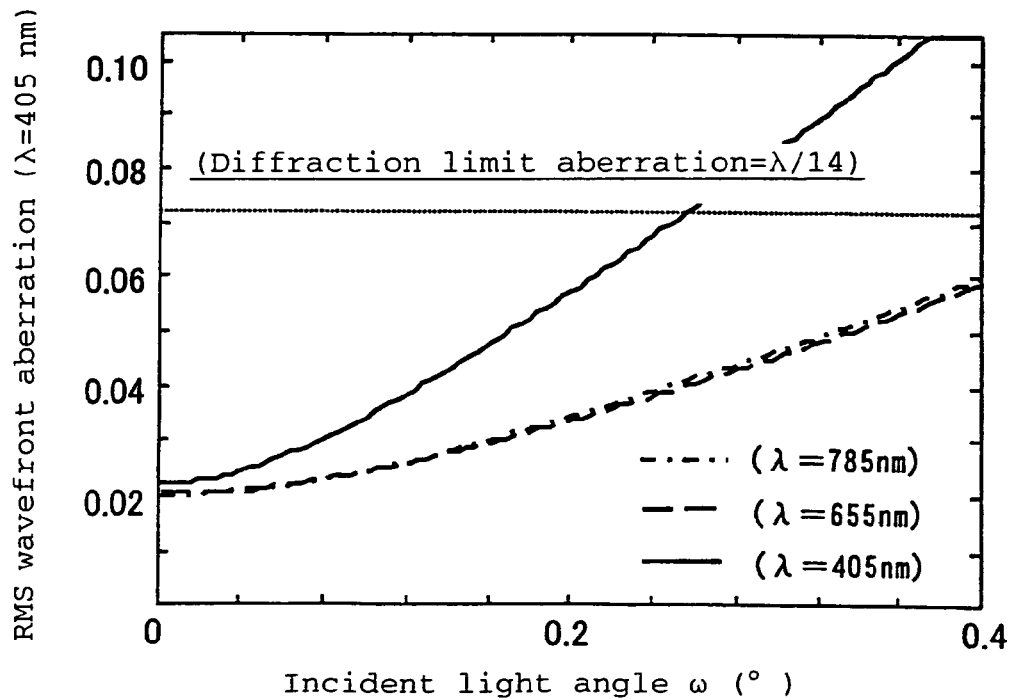
FIG. 33 is a view showing an RMS wavefront aberration of the objective lens 2 of Example 5, of which the angle ω of the incident light is taken as the abscissa.

FIG. 33 is a RMS wavefront aberration diagram whose horizontal axis represents the incident light angle ω, which shows a case of recording or HD 30 with light of wavelength 405 nm, a case of recording or reproducing DVD 40 with light of wavelength 655 nm and a case of recording or reproducing CD 50 with light of wavelength 785 nm. As shown in FIG. 33, at a time of recording or reproducing HD, RMS wavefront aberration becomes a value within the diffraction limit of at most 0.07 λ under the range of the incident light angle ω of from 0.0° to 0.25°.

Further, RMS wavefront aberration values at times of recording or reproducing DVD and CD all become values of within the refraction limit of at most 0.07 λ, and a good performance is achieved. If recording or reproducing of HD 30, DVD 40 and CD 50 are carried out with the optical pickup device, faithful recording or reproducing is possible.

TABLE 1

| Surface number | Curvature radius ($R_n$) | Interval between surfaces | Material name |
|---|---|---|---|
| 0 (Light source) | ∞ | (Refer to Table 4) | Air |
| 1 | 1.609002 | 1.20 (The thickness of reference lens 2a at the center) | TS32 |
| 2 | −2.128238 | 0.20 (The thickness of the close-contact lens 2b at the center) | APEL |
| 3 | 1.256234 | 0.174 | Air |

TABLE 1-continued

| Surface number | Curvature radius ($R_n$) | Interval between surfaces | Material name |
|---|---|---|---|
| 4 | ∞ | Working distance (Refer to Table 4) | Air |
| 5 | ∞ | Thickness of protective layer (Refer to Table 4) | Polycarbonate |
| 6 | ∞ | (Information recording plane) | — |

TABLE 2

| Surface of objective lens | Aspherical coefficient of objective lens | | |
|---|---|---|---|
| | First surface | Second surface | Third surface |
| $k_n$ | −0.3051681 | −69.05951 | −24.04954 |
| $A_{n1}$ | 0 | 0 | 0 |
| $A_{n2}$ | 1.7011016E−02 | 0.032345293 | 0.7845747 |
| $A_{n3}$ | −3.3836523E−02 | 0.12121863 | −3.9871093 |
| $A_{n4}$ | 3.8829903E−02 | 0.42891825 | 9.6924796 |
| $A_{n5}$ | −1.2607544E−02 | −1.1300856 | −13.555233 |
| $A_{n6}$ | −2.6520681E−03 | 1.0593464 | 11.003280 |
| $A_{n7}$ | 2.8978962E−03 | −0.46840567 | −4.7980546 |
| $A_{n8}$ | −6.4609974E−04 | 0.081478181 | 0.86550327 |

TABLE 3

| Surface of objective lens | Shape of surface of objective lens (mm) | | |
|---|---|---|---|
| | First surface | Second surface | Third surface |
| Outer diameter of objective lens (diameter) | 4.00 | 4.00 (Reference lens 2a)/ 2.70 (Close-contact lens 2b) | 2.70 |
| Surface diameter of objective lens (diameter) | 3.20 | 2.60 | 2.40 |
| Effective diameter of objective lens (diameter) | 3.00 | 2.56 | 2.25 |

TABLE 4

| | Wavelengths to be used, refractive index of material and intervals | | |
|---|---|---|---|
| Wavelength (nm) | 405 | 655 | 785 |
| Focal length (mm) | 1.727 | 2.000 | 2.050 |
| Refractive index of TS32 (Reference lens 2a) | 2.06404 | 1.97092 | 1.95621 |
| Refractive index of APEL (Close-contact lens 2b) | 1.55966 | 1.54064 | 1.53711 |
| Refractive index of protective layer | 1.62231 | 1.57995 | 1.57326 |
| Numerical aperture | 0.85 | 0.65 | 0.51 |
| Aperture diameter (diameter) (mm) | 3.00 | 2.50 | 2.08 |
| Distance of object point (mm) | ∞ | ∞ | 51.658 |
| Working distance (mm) | 0.649 | 0.522 | 0.260 |
| Thickness of protective layer (mm) | 0.10(HD) | 0.60(DVD) | 1.20(CD) |

TABLE 5

| Surface number | Curvature radius ($R_n$) | Interval between surfaces | Material name |
|---|---|---|---|
| 0 (Light source) | ∞ | (Refer to Table 8) | Air |
| 1 | 1.433652 | 1.20 (The thickness of reference lens 2a at the center) | TS32 |
| 2 | 2.740915 | 0.20 (The thickness of the close-contact lens 2b at the center) | APEL |
| 3 | 3.679639 | 0.135 | Air |
| 4 | ∞ | Working distance (Refer to Table 8) | Air |
| 5 | ∞ | Thickness of protective layer (Refer to Table 8) | Polycarbonate |
| 6 | ∞ | (Information recording plane) | — |

TABLE 6

| Surface of objective lens | Aspherical coefficient of objective lens | | |
|---|---|---|---|
| | First surface | Second surface | Third surface |
| $k_n$ | −1.5222340 | −13.50275 | −39.66445 |
| $A_{n1}$ | 0.0 | 0.0 | 0.0 |
| $A_{n2}$ | 5.0484752E−02 | 1.0140012E−01 | 5.4389106E−02 |
| $A_{n3}$ | 5.7602897E−03 | −4.7306258E−02 | −4.6792601E−02 |
| $A_{n4}$ | −9.0033076E−03 | 3.2052192E−02 | 3.6325051E−03 |
| $A_{n5}$ | 1.5072028E−02 | −1.5217075E−02 | 3.4134893E−03 |

TABLE 6-continued

| Surface of objective lens | Aspherical coefficient of objective lens | | |
|---|---|---|---|
| | First surface | Second surface | Third surface |
| $A_{n6}$ | −1.1510710E−02 | 0.0 | 0.0 |
| $A_{n7}$ | 4.6005561E−03 | 0.0 | 0.0 |
| $A_{n8}$ | −7.7275104E−04 | 0.0 | 0.0 |

TABLE 7

| Surface of objective lens | Shape of surface of objective lens (mm) | | |
|---|---|---|---|
| | First surface | Second surface | Third surface |
| Outer diameter of objective lens (diameter) | 3.20 | 3.20 (Reference lens 2a)/ 2.60 (Close-contact lens 2b) | 2.60 |
| Surface diameter of objective lens (diameter) | 3.20 | 2.50 | 2.40 |
| Effective diameter of objective lens (diameter) | 3.00 | 2.40 | 2.35 |

TABLE 8

| | Wavelengths to be used, refractive index of material and intervals | | |
|---|---|---|---|
| Wavelength (nm) | 405 | 655 | 785 |
| Focal length (mm) | 1.775 | 1.962 | 1.995 |
| Refractive index of TS32 (Reference lens 2a) | 2.06404 | 1.97092 | 1.95621 |
| Refractive index of APEL (Close-contact lens 2b) | 1.55966 | 1.54064 | 1.53711 |
| Refractive index of protective layer | 1.62231 | 1.57995 | 1.57326 |
| Numerical aperture | 0.85 | 0.65 | 0.51 |
| Aperture diameter (diameter) (mm) | 3.00 | 2.46 | 1.98 |
| Distance of object point (mm) | ∞ | ∞ | ∞ |
| Working distance (mm) | 0.667 | 0.511 | 0.160 |
| Thickness of protective layer (mm) | 0.10(HD) | 0.60(DVD) | 1.20(CD) |

TABLE 9

| Surface number | Curvature radius ($R_n$) | Intervals between surfaces | Material name |
|---|---|---|---|
| 0 (Light source) | ∞ | (Refer to Table 12) | Air |
| 1 | 1.726748 | 1.30 (The thickness of reference lens 2a at the center) | TS32 |
| 2 | −0.7523243 | 0.20 (The thickness of the close-contact lens 2b at the center) | Polycarbonate |
| 3 | 0.776006 | 0.1763 | Air |
| 4 | ∞ | Working distance (Refer to Table 12) | Air |
| 5 | ∞ | Thickness of protective layer (Refer to Table 12) | Polycarbonate |
| 6 | ∞ | (Information recording plane) | — |

TABLE 10

| Surface of objective lens | Aspherical coefficient of objective lens | | |
|---|---|---|---|
| | First surface | Second surface | Third surface |
| $k_n$ | −0.222288 | −10.91499 | −12.370443 |
| $A_{n1}$ | 0 | 0 | 0 |
| $A_{n2}$ | 0.023789917 | 0.018055062 | 1.073861 |
| $A_{n3}$ | −0.075028105 | 0.20800830 | −7.3983142 |
| $A_{n4}$ | 0.10048650 | 0.51291852 | 20.358699 |
| $A_{n5}$ | −0.045901288 | −0.64275054 | −31.086816 |
| $A_{n6}$ | 0.0054054488 | 0.0090523641 | 27.656275 |
| $A_{n7}$ | 0.0021676256 | 0.18098427 | −13.374163 |
| $A_{n8}$ | −6.6445121E−04 | −0.049399577 | 2.7045239 |

TABLE 11

| Surface of objective lens | Shape of surface of objective lens (mm) | | |
|---|---|---|---|
| | First surface | Second surface | Third surface |
| Outer diameter of objective lens (diameter) | 4.00 | 4.00 (Reference lens 2a)/ 2.70 (Close-contact lens 2b) | 2.70 |
| Surface diameter of objective lens (diameter) | 3.20 | 2.60 | 2.20 |
| Effective diameter of objective lens (diameter) | 3.00 | 2.50 | 2.10 |

TABLE 12

| | Wavelengths to be used, refractive index of material and intervals | | |
|---|---|---|---|
| Wavelength (nm) | 405 | 655 | 785 |
| Focal length (mm) | 1.721 | 1.987 | 2.037 |
| Refractive index of TS32 (Reference lens 2a) | 2.06404 | 1.97092 | 1.95621 |
| Refractive index of polycarbonate (Close-contact lens 2b) | 1.62231 | 1.57995 | 1.57326 |
| Refractive index of protective layer | 1.62231 | 1.57995 | 1.57326 |
| Numerical aperture | 0.85 | 0.65 | 0.51 |
| Aperture diameter (diameter) (mm) | 3.00 | 2.52 | 2.10 |
| Distance of object point (mm) | ∞ | ∞ | 45.451 |
| Working distance (mm) | 0.608 | 0.471 | 0.218 |
| Thickness of protective layer (mm) | 0.10 (HD) | 0.60 (DVD) | 1.20 (CD) |

TABLE 13

| Surface number | Curvature radius ($R_n$) | Interval between surfaces | Material name |
|---|---|---|---|
| 0 (Light source) | ∞ | (Refer to Table 16) | Air |
| 1 | 2.440032 | 1.40 (The thickness of reference lens 2a at the center) | TS32 |
| 2 | −4.868704 | 0.20 (The thickness of the close-contact lens 2b at the center) | Cytop |
| 3 | 1.018387 | 0.286472 | Air |
| 4 | ∞ | Working distance (Refer to Table 16) | Air |
| 5 | ∞ | Thickness of protective layer (Refer to Table 16) | Polycarbonate |
| 6 | ∞ | (Information recording plane) | — |

TABLE 14

| Surface of objective lens | Aspherical coefficient of objective lens | | |
|---|---|---|---|
| | First surface | Second surface | Third surface |
| $K_n$ | −0.8148051 | −99.44675 | −1.466747 |
| $A_{n1}$ | 6.1710283E−02 | 0 | 0 |
| $A_{n2}$ | 1.3182069E−02 | 1.3191181E−01 | −0.3251587 |
| $A_{n3}$ | 3.7273008E−03 | −9.9376343E−02 | 0.14955551 |
| $A_{n4}$ | −8.0390839E−04 | 7.5195880E−02 | −0.31810006 |
| $A_{n5}$ | 2.4005239E−04 | 9.1920535E−03 | 0.54675302 |
| $A_{n6}$ | 6.3853735E−04 | −3.8320284E−02 | −0.37379852 |
| $A_{n7}$ | −2.8712967E−04 | 1.5968122E−02 | 0.10630356 |
| $A_{n8}$ | 3.5748088E−05 | −1.9789088E−03 | −0.009838889 |

TABLE 15

| Surface of objective lens | Shape of surface of objective lens (mm) | | |
|---|---|---|---|
| | First surface | Second surface | Third surface |
| Outer diameter of objective lens (diameter) | 4.50 | 4.50 (Reference lens 2a)/ 3.15 (Close-contact lens 2b) | 3.15 |
| Surface diameter of objective lens (diameter) | 3.80 | 3.10 | 2.80 |
| Effective diameter of objective lens (diameter) | 3.60 | 3.00 | 2.60 |

TABLE 16

| | Wavelengths to be used, refractive index of material and intervals | | |
|---|---|---|---|
| Wavelength (nm) | 405 | 655 | 785 |
| Focal length (mm) | 2.079 | 2.393 | 2.451 |
| Refractive index of TS32 (Reference lens 2a) | 2.06404 | 1.97092 | 1.95621 |
| Refractive index of Cytop (Close-contact lens 2b) | 1.34798 | 1.34092 | 1.33952 |
| Refractive index of protective layer | 1.62231 | 1.57995 | 1.57326 |
| Numerical aperture | 0.85 | 0.65 | 0.51 |
| Aperture diameter (diameter) (mm) | 3.60 | 3.00 | 2.48 |
| Distance of object point (mm) | ∞ | ∞ | 72.132 |
| Working distance (mm) | 0.728 | 0.633 | 0.378 |
| Thickness of protective layer (mm) | 0.10 (HD) | 0.60 (DVD) | 1.20 (CD) |

TABLE 17

| Surface number | Curvature radius ($R_n$) | Interval between surfaces | Material name |
|---|---|---|---|
| 0 (Light source) | ∞ | (Refer to Table 20) | Air |
| 1 | 1.631143 | 1.40 (The thickness of reference lens 2a at the center) | K-VC89 |
| 2 | −0.3250746 | 0.20 (The thickness of the close-contact lens 2b at the center) | APEL |
| 3 | 0.5776536 | 0.1135 | Air |
| 4 | ∞ | Working distance (Refer to Table 20) | Air |
| 5 | ∞ | Thickness of protective layer (Refer to Table 20) | Polycarbonate |
| 6 | ∞ | (Information recording plane) | — |

TABLE 18

| Surface of objective lens | Aspherical coefficient of objective lens | | |
|---|---|---|---|
| | First surface | Second surface | Third surface |
| $k_n$ | −0.4660691 | −2.77635 | −4.108907 |
| $A_{n1}$ | 0 | 0 | 0 |
| $A_{n2}$ | −0.03249722 | 0.41473366 | −1.1120878 |
| $A_{n3}$ | 0.058695125 | −1.0654817 | 1.2308596 |
| $A_{n4}$ | −0.12836849 | 2.3365877 | 0.10664166 |
| $A_{n5}$ | 0.19432816 | −2.2693295 | −1.1761425 |
| $A_{n6}$ | −0.12788756 | 1.0672781 | 0.83141828 |
| $A_{n7}$ | 0.038270154 | −0.24213473 | −0.19123049 |
| $A_{n8}$ | −4.400139E−03 | 0.021789782 | 2.1776249E−03 |

TABLE 19

| Surface of objective lens | Shape of surface of objective lens (mm) | | |
|---|---|---|---|
| | First surface | Second surface | Third surface |
| Outer diameter of objective lens (diameter) | 4.00 | 4.00 (Reference lens 2a)/ 2.90 (Close-contact lens 2b) | 2.90 |
| Surface diameter of objective lens (diameter) | 3.20 | 2.80 | 2.50 |
| Effective diameter of objective lens (diameter) | 3.00 | 2.70 | 2.25 |

TABLE 20

| | Wavelengths to be used, refractive index of material and intervals | | |
|---|---|---|---|
| Wavelength (nm) | 405 | 655 | 785 |
| Focal length (mm) | 1.689 | 1.864 | 1.900 |
| Refractive index of D-VC89 | 1.84452 | 1.80419 | 1.79679 |
| Refractive index of APEL | 1.55966 | 1.54064 | 1.53711 |
| Refractive index of protective layer | 1.62231 | 1.57995 | 1.57326 |
| Numerical aperture | 0.85 | 0.65 | 0.51 |
| Aperture diameter (diameter) (mm) | 3.00 | 2.38 | 1.98 |
| Distance of object point (mm) | ∞ | ∞ | 34.559 |
| Working distance (mm) | 0.623 | 0.417 | 0.169 |
| Thickness of protective layer (mm) | 0.10(HD) | 0.60(DVD) | 1.20(CD) |

EXAMPLE 6

Example of the Present Invention

An objective lens 2 as shown in FIG. 1 is produced and an optical pickup device as shown in FIG. 3 is produced employing this objective lens 2. The material of the reference lens 2a is K-VC89 a trade name manufactured by SUMIDA Optical Glass Inc. and the material of the close-contact lens 2b is a glass material TS2 manufactured by Asahi Glass Co. and the reference lens 2a and the close-contact lens 2b are bonded with the thin resin adhesive layer shown in Table 21. Tables 21 to 24 show the specification of the objective lens 2.

In this Example, a lens surface of the reference lens 2a on the side of the close-contact lens 2b is designated as the second surface, and a lens surface of the close-contact lens 2b on the side of the reference lens 2a is designated as the third surface, and a lens surface of the close-contact lens 2b on the side of the optical disk is designated as the fourth surface. The aspherical shapes of the second surface and the third surface are preferably aspherical surfaces of different shapes from each other from the viewpoint of increasing the flexibility of design. However, in this Example, they are the same aspherical shapes. By thus constructing, there are effects that it is easy to maintain the spacing between the bonding surfaces constant and it is easy to improve the decentering performance of the objective lens produced.

Further, in this Example, as shown in Table 24, three types of laser light sources having center wavelengths of 405 nm, 660 nm and 785 nm respectively, are employed, the thicknesses of the protective layers of the corresponding disks for recording/reproducing are 0.6 mm, 0.6 mm and 1.2 mm respectively, and the numerical apertures NA are 0.65, 0.65 and 0.5° respectively.

Figure 35:
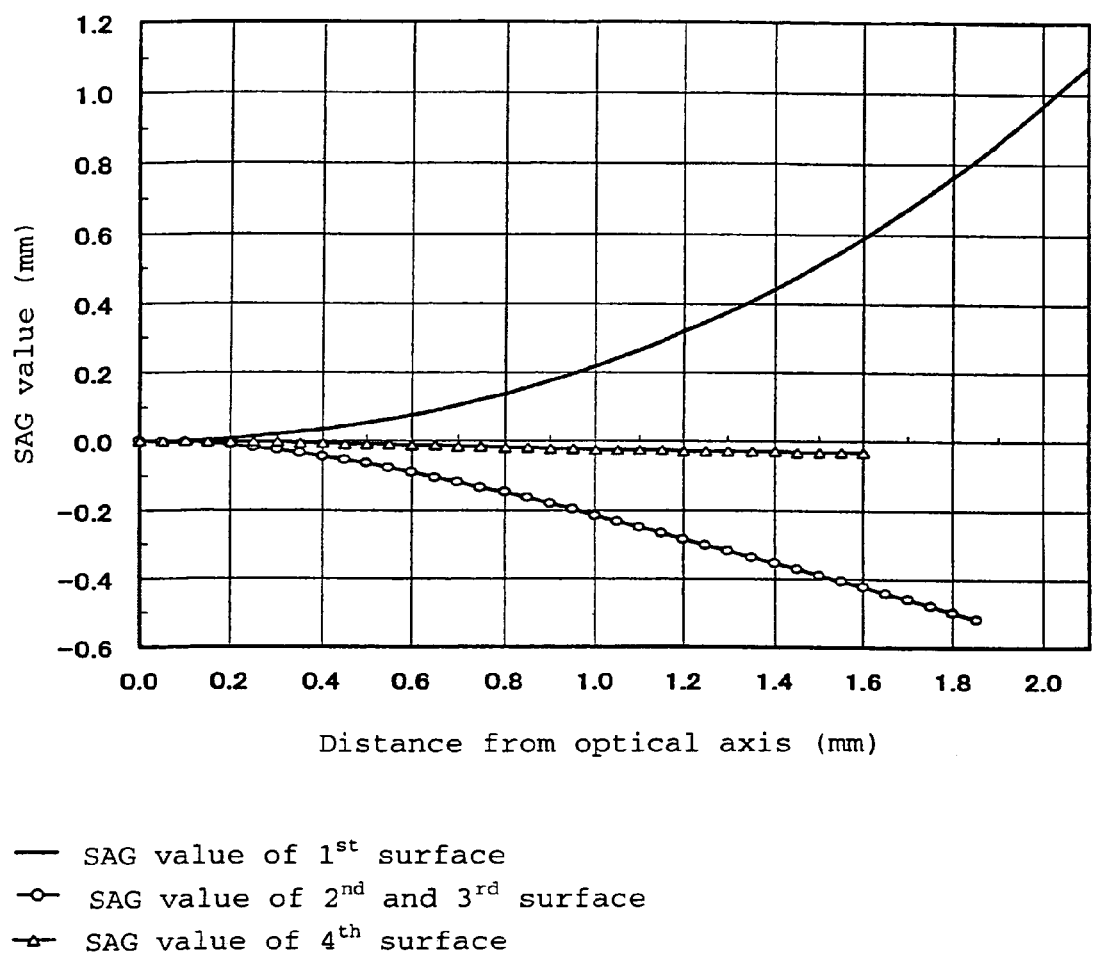
FIG. 35 is a graph showing a cross-sectional shape of the objective lens 2 of Example 6 by SAG value and the distance from the optical axis 6.
Figure 36:
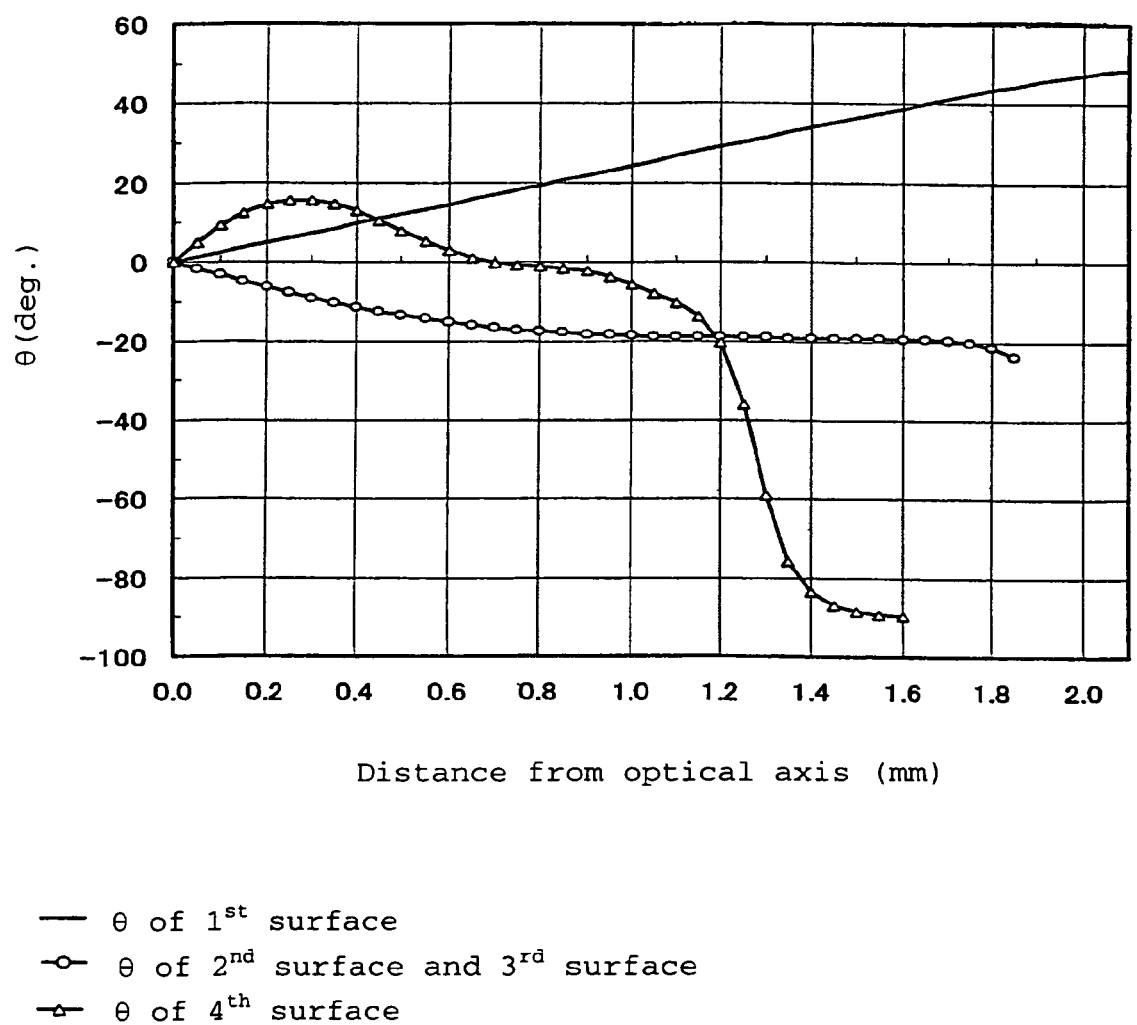
FIG. 36 is a graph showing an angle θ between the reference plane and a tangential plane, in relation to the distance from the optical axis 6 in the objective lens 2 of Example 6.

FIG. 35 is a graph showing the cross-sectional shape (corresponding to the shape shown in FIG. 1) of the objective lens 2 by SAG value and the distance from the optical axis 6. FIG. 36 is a graph showing the relation between θ and the distance from the optical axis 6.

Figure 37:
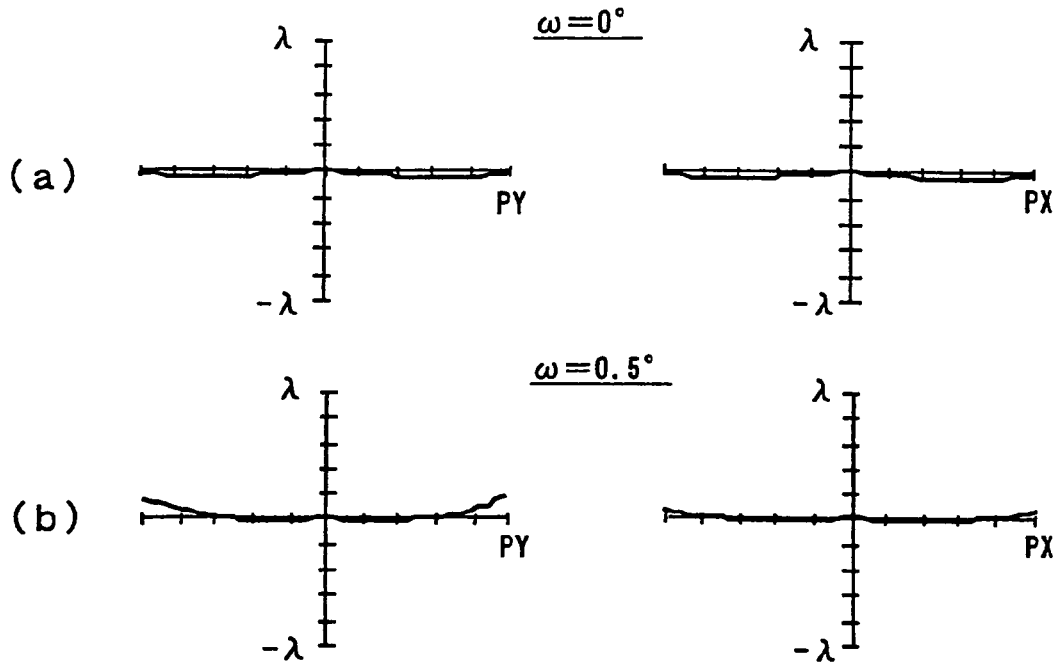
FIG. 37 is a view showing a wavefront aberration when recording or reproducing of HD 30 is carried out with the objective lens 2 of Example 6 under the condition that the incident angle ω of light of wavelength 405 nm is changed.
Figure 38:
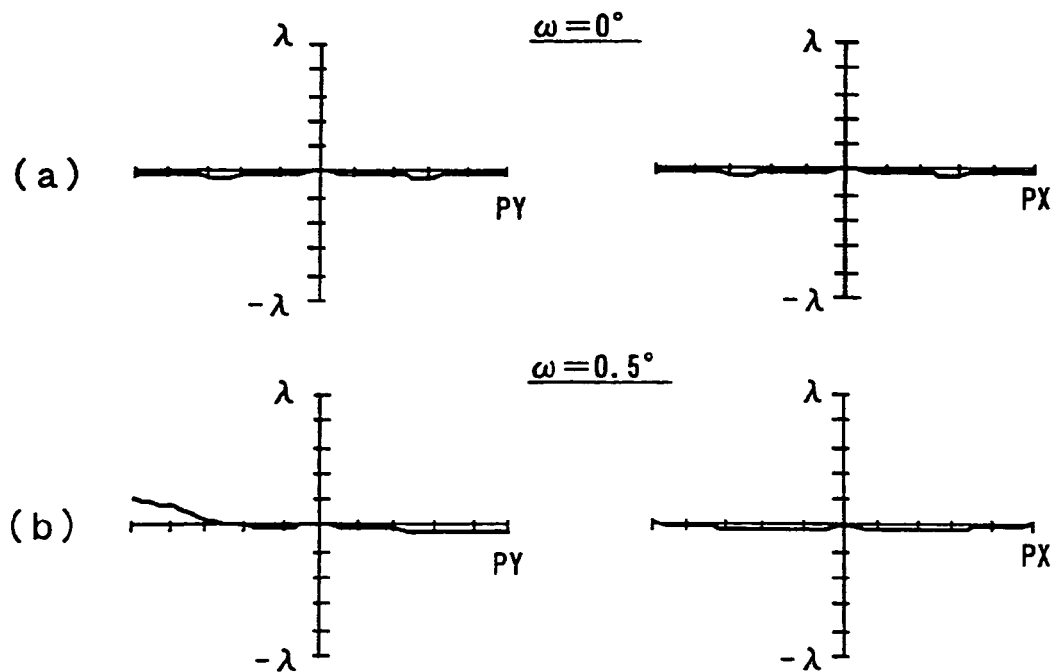
FIG. 38 is a view showing a wavefront aberration when recording or reproducing of DVD 40 is carried out with the objective lens 2 of Example 6 under the condition that the incident angle ω of light of wavelength 660 nm is changed.
Figure 39:
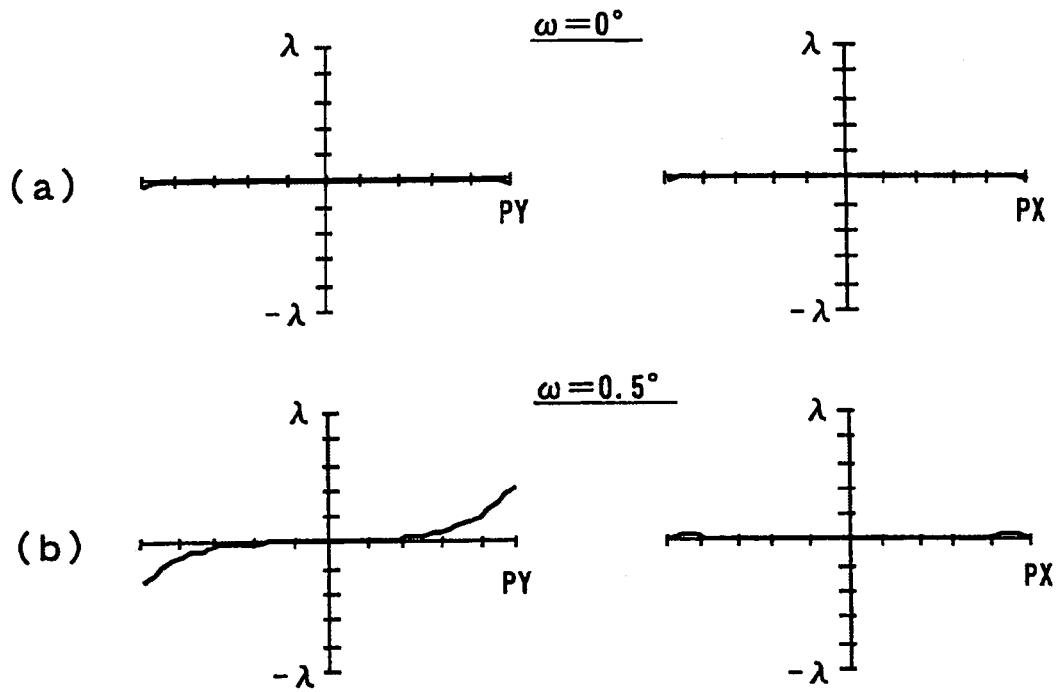
FIG. 39 is a view showing a wavefront aberration when recording or reproducing of CD 50 is carried out with the objective lens 2 of Example 6 under the condition that an incident angle ω of light of wavelength 785 nm is changed.

FIG. 37 is a wavefront aberration diagram at a time of recording or reproducing HD 30 with light of wavelength 405 nm (ω=0.0° in FIG. 37(a) and ω=0.5° in FIG. 37(b)). FIG. 38 is a wavefront aberration diagram in a case of recording or reproducing DVD 40 with light of wavelength 660 nm (ω=0.0° in FIG. 38(a) and ω=0.5° in FIG. 31(b)). FIG. 39 is a wavefront aberration diagram in a case of recording or reproducing CD 50 with light of wavelength 785 nm (ω=0.0° in FIG. 39(a) and ω=0.5° in FIG. 39(b)).

The values of wavefront aberrations at times of recording or reproducing HD, DVD and CD each becomes, as shown in FIGS. 37 to 39, a value within ±1 λ even under the condition that the incident light angle ω of the laser light is changed from 0.0° to 0.5°.

Figure 40:
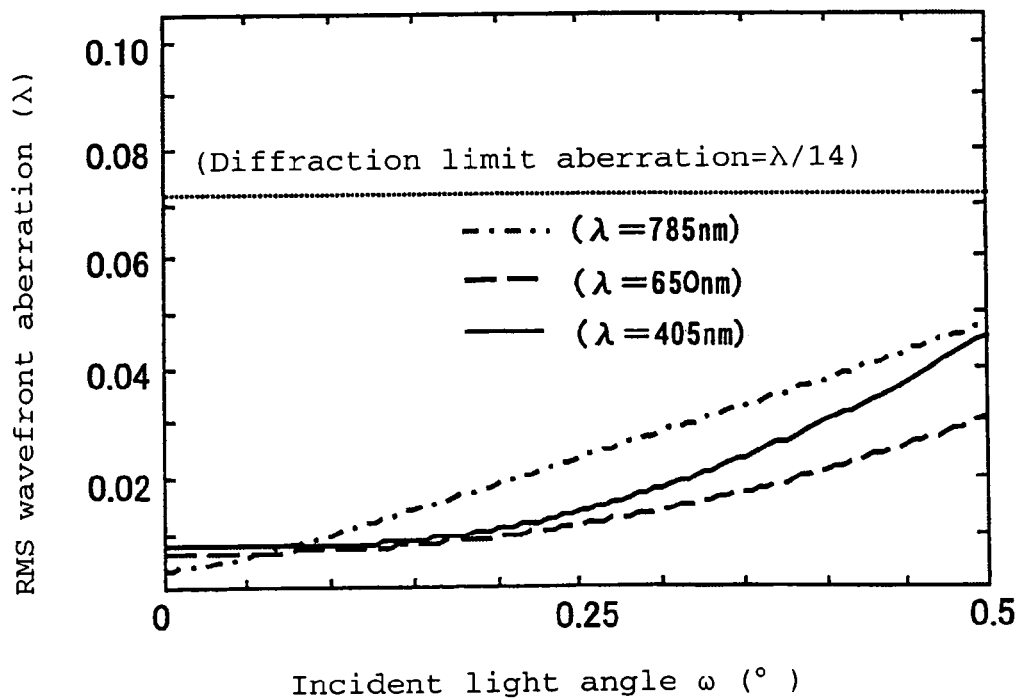
FIG. 40 is a view showing an RMS wavefront aberration of the objective lens 2 of Example 6, in which the angle ω of the incident light is taken as the abscissa.

FIG. 40 is a RMS wavefront aberration diagram whose horizontal axis represents the incident light angle ω, which shows a case of recording or reproducing HD 30 with light of wavelength 405 nm, a case of recording or reproducing DVD 40 with light of wavelength 660 nm and a case of recording or reproducing CD 50 with light of wavelength 785 nm. As shown in FIG. 40, at a time of recording or reproducing HD, RMS wavefront aberration becomes a value within the diffraction limit of at most 0.07λ under the range of the incident light angle ω of from 0.0° to 0.5°. Further, the values of RMS wavefront aberrations at times of recording or reproducing DVD and CD are each a value within the diffraction limit of at most 0.07λ, and a good performance is achieved.

Figure 41:
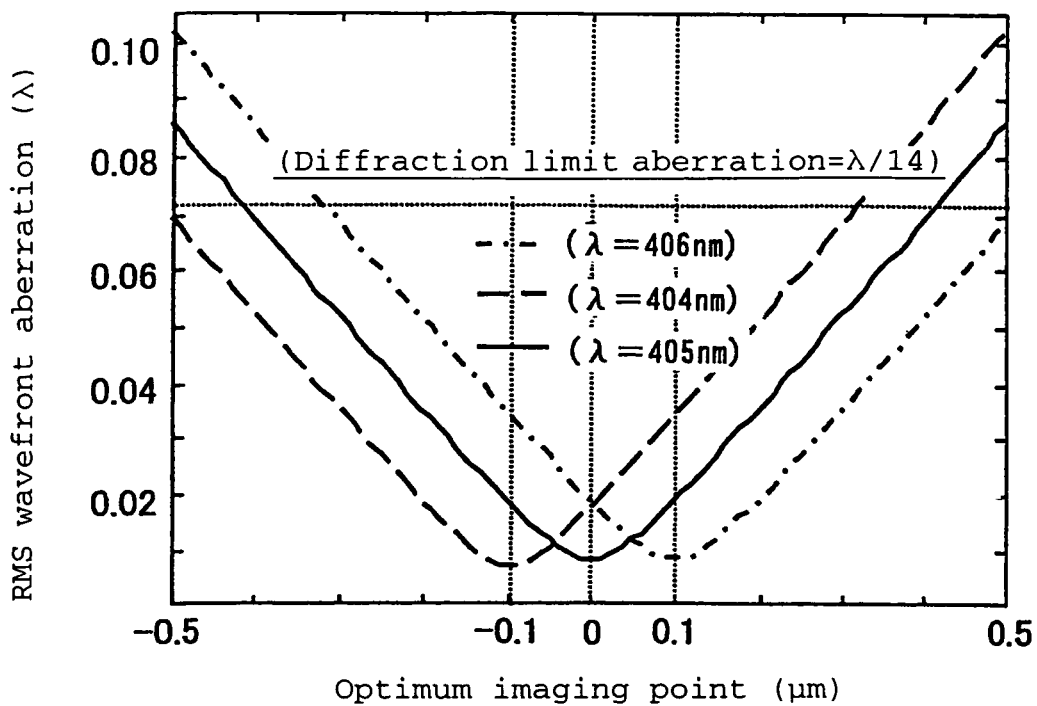
FIG. 41 is a view showing a wavefront aberration in the vicinity of the optimum imaging point of the wavefront aberration of light of wavelength 405 nm when recording or reproducing of HD 30 is carried out with light of wavelength 405 nm and light of wavelengths 405±1 nm with the objective lens 2 of Example 6.

Further, since the wavelength of the laser light source fluctuates by e.g. switching between recording and reproducing or fluctuation of the temperature, the fluctuation of refractive index of the glass material of the objective lens due to the fluctuation of the wavelength becomes larger as the wavelength of laser is shorter, and as a result, fluctuation of the optimum imaging position or RMS wavefront aberration tends to be large. FIG. 41 is a view showing the wavefront aberration corresponding to ±1 nm fluctuation of the wavelength of blue laser of wavelength 405 nm in such a manner that the position of optimum imaging point at 405 nm is designated as the reference position (0 μm). As understandable from the Figure, the positions of the optimum (minimum) wavefront aberration in terms of RMS wavefront aberration at wavelengths 406 nm and 404 nm only deviate about ±0.1 μm from the position of the optimum (minimum) wavefront aberration at 405 nm, and it is understandable that the device has a good wavelength-dispersion-compensation property.

Figure 42:
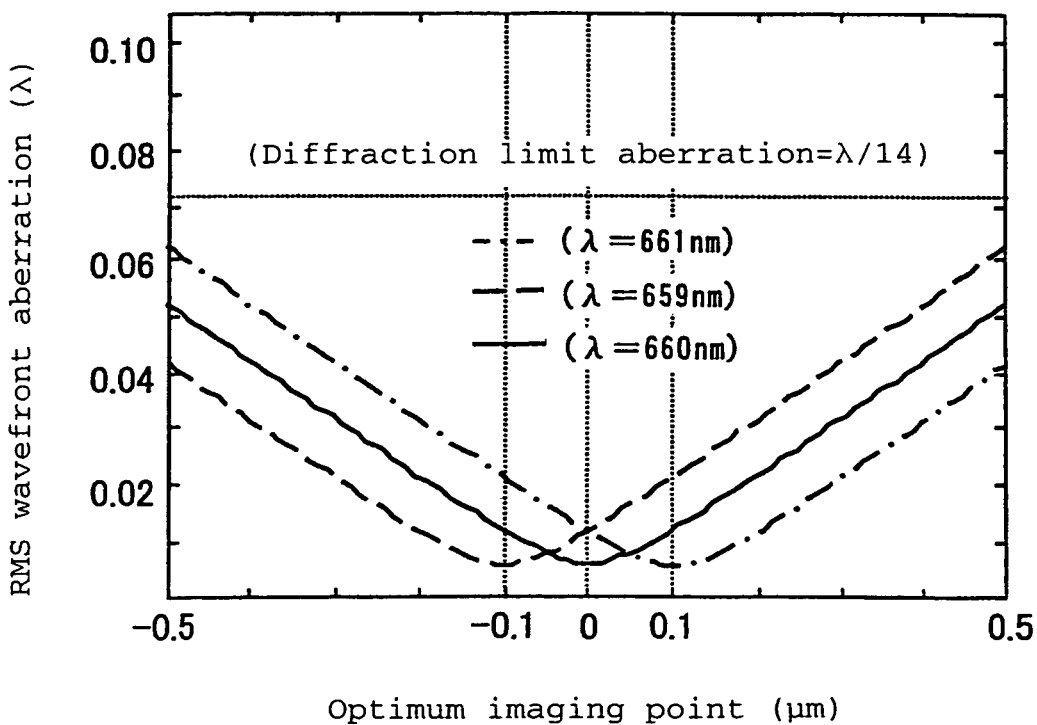
FIG. 42 is a view showing a wavefront aberration in the vicinity of the optimum imaging point in terms of wavefront aberration of light of wavelength 660 nm when recording or reproducing of DVD 40 is carried out with light of wavelength 660 nm and light of wavelengths 660±1 nm with the objective lens 2 of Example 6.

In the same manner, FIG. 42 shows the wavelength-dispersion-compensation property at wavelength 660 nm. As evident from this, the positions of the optimum (minimum) wavefront aberration in terms of RMS wavefront aberration at wavelengths 661 nm and 659 nm only deviate about ±0.1 μm with respect to the position of the optimum (minimum) wavefront aberration at 660 nm, and it is understandable that device has a good wavelength-dispersion-compensation property.

Figure 43:
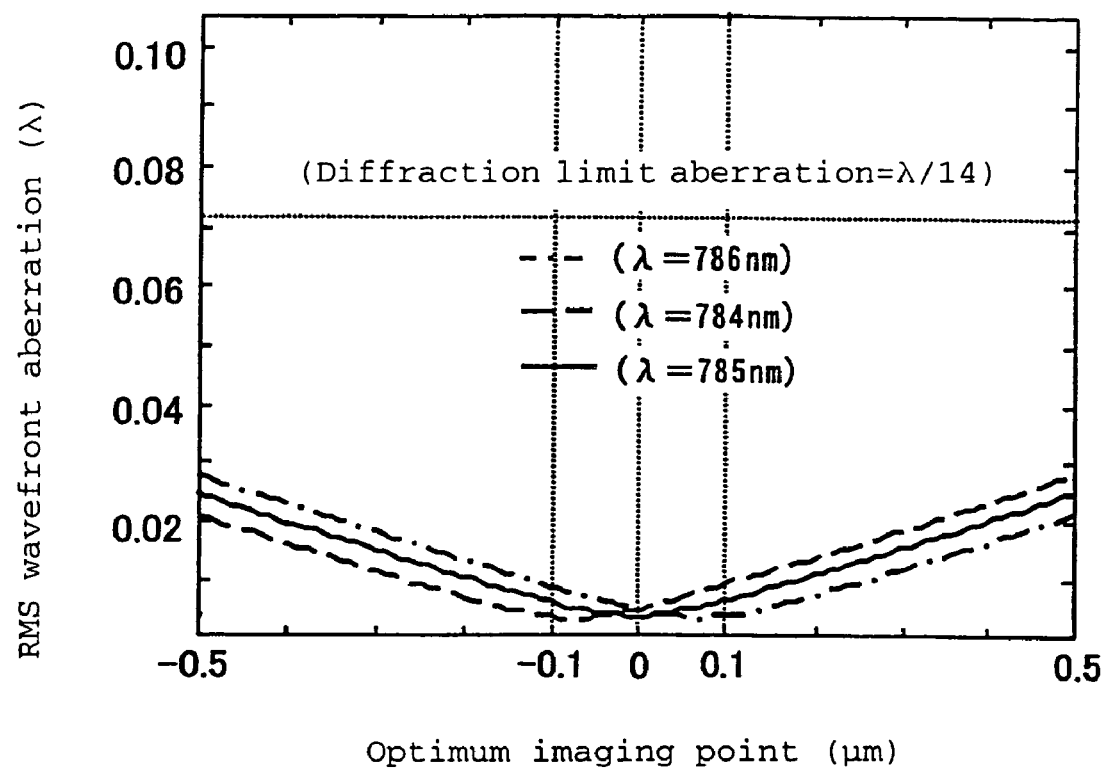
FIG. 43 is a view showing a wavefront aberration in the vicinity of the optimum imaging point in terms of the wavelengths of light of wavelength 785 nm when recording or reproducing of CD 50 is carried out with light of wavelength 785 nm and light of wavelengths 785±1 nm with the objective lens 2 of Example 6.

Further in the same manner, FIG. 43 shows the wavelength-dispersion-compensation property at wavelength 785 nm. As evident from this, positions of the optimum (minimum) wavefront aberrations in terms of RMS wavefront aberration at wavelengths 786 nm and 784 nm deviates ±0.1 μm with respect to the position of the optimum (minimum) wavefront aberration at 785 nm, and it is understandable that the device has a good wavelength-dispersion-compensation property.

From the foregoing discussions, the objective lens of this Example has a good optical performance for recording or reproducing optical disks with three types of light sources of wavelengths 405 nm, 660 nm and 785 nm corresponding to the optical disks. When recording or reproducing of HD 30, DVD 40 and CD 50 are carried out with an optical pickup device employing this objective lens, faithful recording or reproducing can be performed.

TABLE 21

| Surface number | Curvature radius ($R_n$) | Interval between surfaces | Material name |
|---|---|---|---|
| 0 (Light source) | ∞ | (Refer to Table 24) | Air |
| 1 | 2.356125 | 1.90 (The thickness of reference lens 2a at the center) | K-VC89 |
| 2 | −1.762696 | 0.05 (The thickness of adhesive layer at the center) | Resin adhesive agent |
| 3 | −1.762696 | 0.30 (The thickness of the close-contact lens 2b at the center) | TS2 |
| 4 | −12.50357 | Working distance (Refer to Table 24) | Air |
| 5 | ∞ | Thickness of protective layer (Refer to Table 24) | Polycarbonate |
| 6 | ∞ | (Information recording plane) | — |

TABLE 22

| Surface of objective lens | Aspherical coefficient of objective lens | | | |
|---|---|---|---|---|
| | First surface | Second surface | Third surface | Fourth surface |
| $k_n$ | −0.4506814 | −4.214085 | −4.214085 | −11.00995 |
| $A_{n1}$ | 0 | 0 | 0 | 0 |
| $A_{n2}$ | 0.0011260762 | 0.026239017 | 0.026239017 | 0.021701902 |
| $A_{n3}$ | −1.0469505E−04 | −0.016383368 | −0.016383368 | −0.0077696567 |
| $A_{n4}$ | 1.209055E−04 | 0.011628836 | 0.011628836 | 0.0021463078 |

TABLE 22-continued

| Surface of objective lens | Aspherical coefficient of objective lens | | | |
|---|---|---|---|---|
| | First surface | Second surface | Third surface | Fourth surface |
| $A_{n5}$ | −1.9919434E−05 | −0.0054975454 | −0.0054975454 | −7.2169689E−05 |
| $A_{n6}$ | −1.5491154E−05 | 0.0013249001 | 0.0013249001 | −2.7709701E−04 |
| $A_{n7}$ | 6.3883289E−06 | −1.2588546E−04 | −1.2588546E−04 | 6.8826443E−05 |
| $A_{n8}$ | −7.4971285E−07 | 0 | 0 | 0 |

TABLE 23

| Surface of objective lens | Shape of surface of objective lens (mm) | | | |
|---|---|---|---|---|
| | First surface | Second surface | Third surface | Fourth surface |
| Outer diameter of objective lens (diameter) | 5.00 | 5.00 | 5.00 | 5.00 |
| Surface diameter of objective lens (diameter) | 4.50 | 3.70 | 3.70 | 3.20 |
| Effective diameter of objective lens (diameter) | 4.20 | 3.50 | 3.50 | 3.00 |

TABLE 24

| wavelength | Wavelengths to be used, refractive index of material and intervals | | |
|---|---|---|---|
| (nm) | 405 | 660 | 785 |
| Focal length (mm) | 3.002 | 3.034 | 3.046 |
| Reactive index of K-VC89 | 1.84452 | 1.80383 | 1.79679 |
| Reactive index of resin adhesive | 1.54844 | 1.52711 | 1.52403 |
| Reactive index of TS2 | 2.06404 | 1.97018 | 1.95621 |
| Refractive index of protective layer | 1.62231 | 1.57961 | 1.57326 |
| Numerical aperture | 0.65 | 0.65 | 0.50 |
| Aperture diameter (diameter) (mm) | 3.900 | 3.962 | 3.176 |
| Distance of object point (mm) | ∞ | ∞ | 51.293 |
| Working distance (mm) | 1.353 | 1.387 | 1.210 |
| Thickness of protective layer (mm) | 0.60 (HD) | 0.60 (DVD) | 1.20 (CD) |

EXAMPLE 7

Example of the Present Invention

An objective lens 2 shown in FIG. 1 is produced and an optical pickup device shown in FIG. 3 is produced employing the objective lens 2. The material of the reference lens 2a is K-VC89 a trade name manufactured by SUMIDA Optical Glass Inc. and the material of the close-contact lens 2b is a glass material-TS32A manufactured by Asahi Glass Co. shown in Table 25, and the reference lens 2a and the close-contact lens 2b are bonded with a thin UV-curable adhesive layer shown in table 25. Tables 25 to 28 show the specification of the objective lens 2.

Also in this Example, a lens surface of the reference lens 2a on the side of the close-contact lens 2b is designated as the second surface, a lens surface of the close-contact lens 2b on the side of the reference lens 2a is designated as the third surface and a lens surface of the close-contact lens 2b on the side of the optical disk is designated as the fourth surface.

Further, in this Example, as shown in Table 28, three types of laser light sources having center wavelengths of 405 nm, 660 nm and 785 nm respectively, are employed, the thicknesses of the protective layers of the corresponding disks for recording/reproducing are 0.0875 mm, 0.6 mm and 1.2 mm respectively, and the numerical apertures NA are 0.85, 0.65 and 0.51 respectively.

Figure 44:
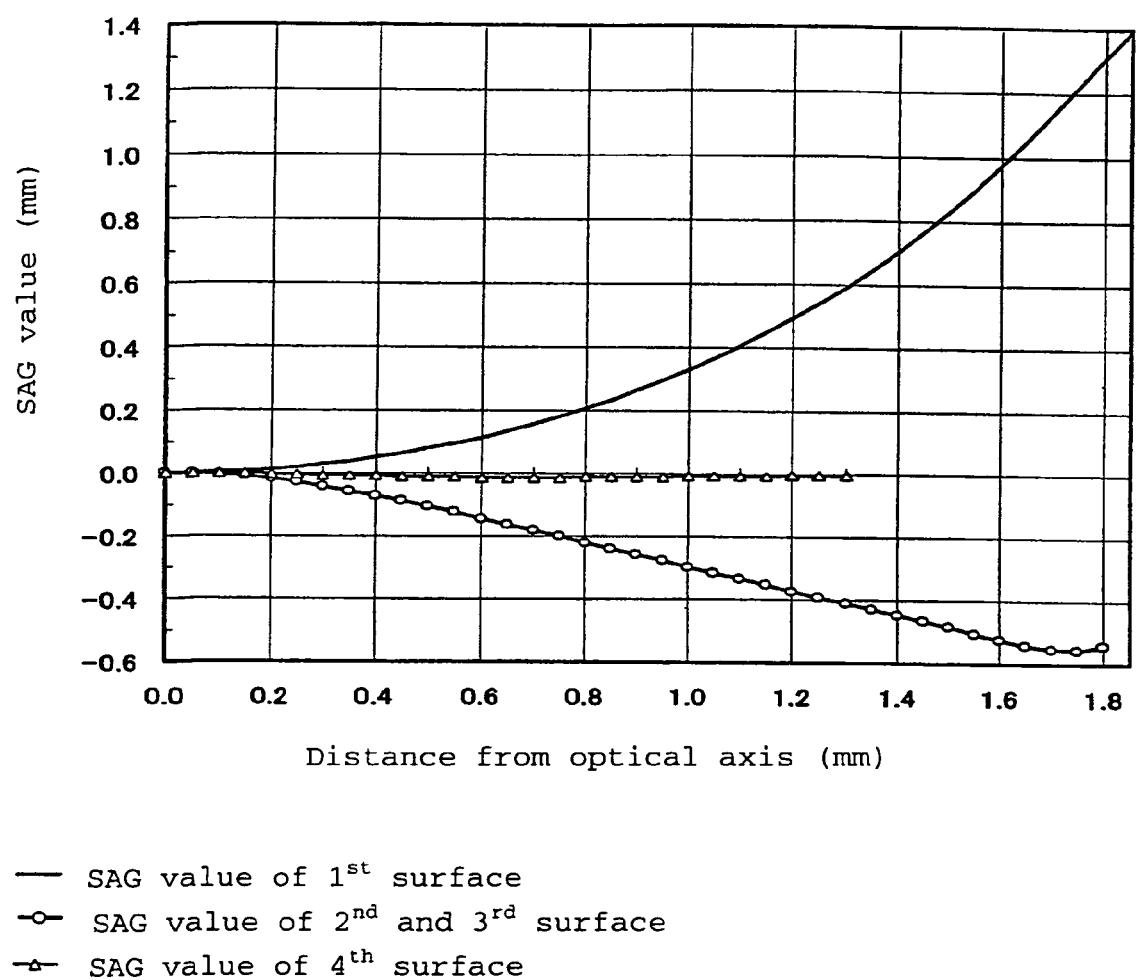
FIG. 44 is a graph showing the cross-sectional shape of the objective lens 2 of Example 7 by SAG value and the distance from the optical axis 6.
Figure 45:
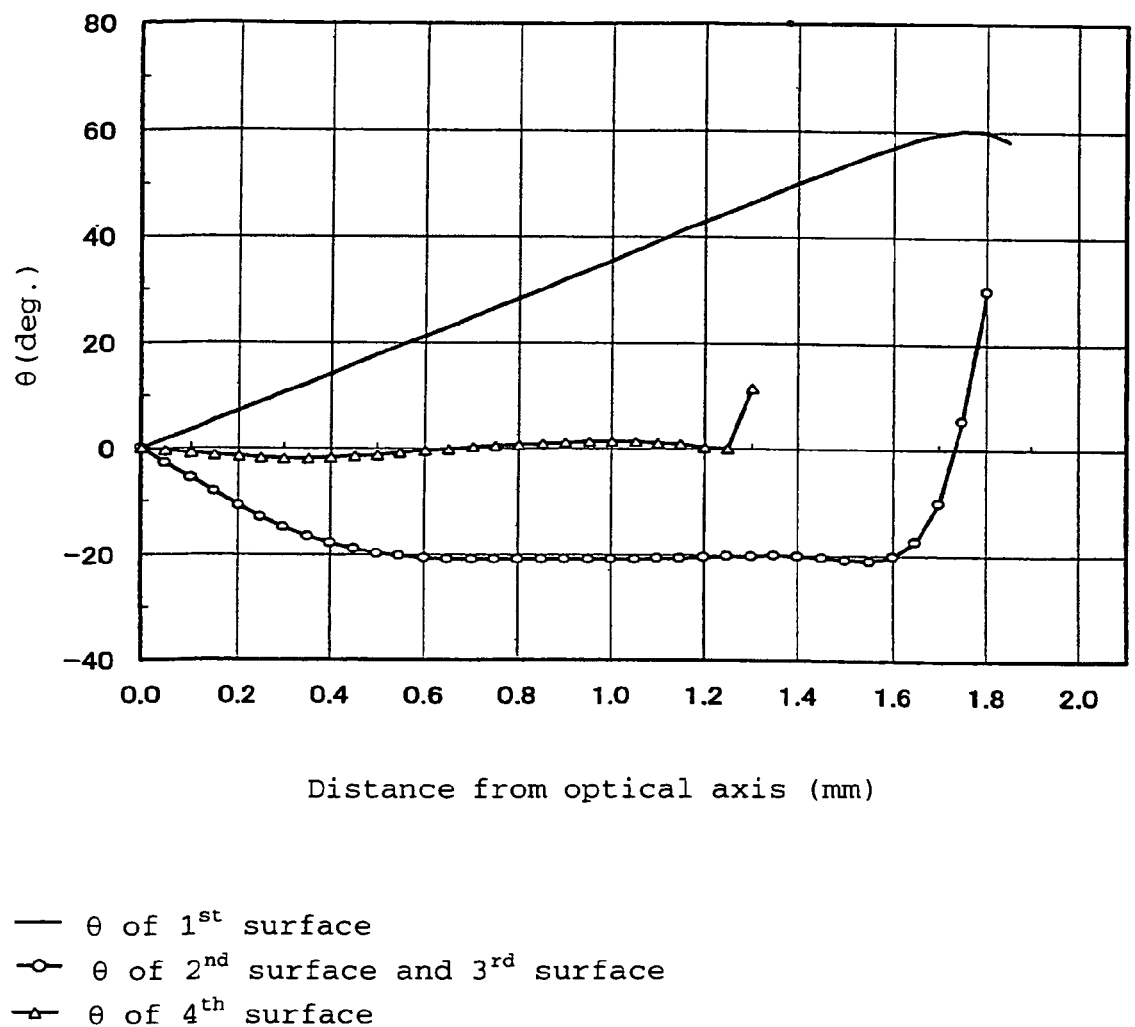
FIG. 45 is a graph showing the angle θ between the reference plane and a tangential plane, in relation to the distance from the optical axis 6 in the objective lens 2 of Example 7.

FIG. 44 is a graph showing the cross-sectional shape (corresponding to the shape shown in FIG. 1) of the objective lens 2 by SAG value and the distance from the optical axis 6. FIG. 45 is a graph showing the relation between θ and the distance from the optical axis 6.

Figure 46:
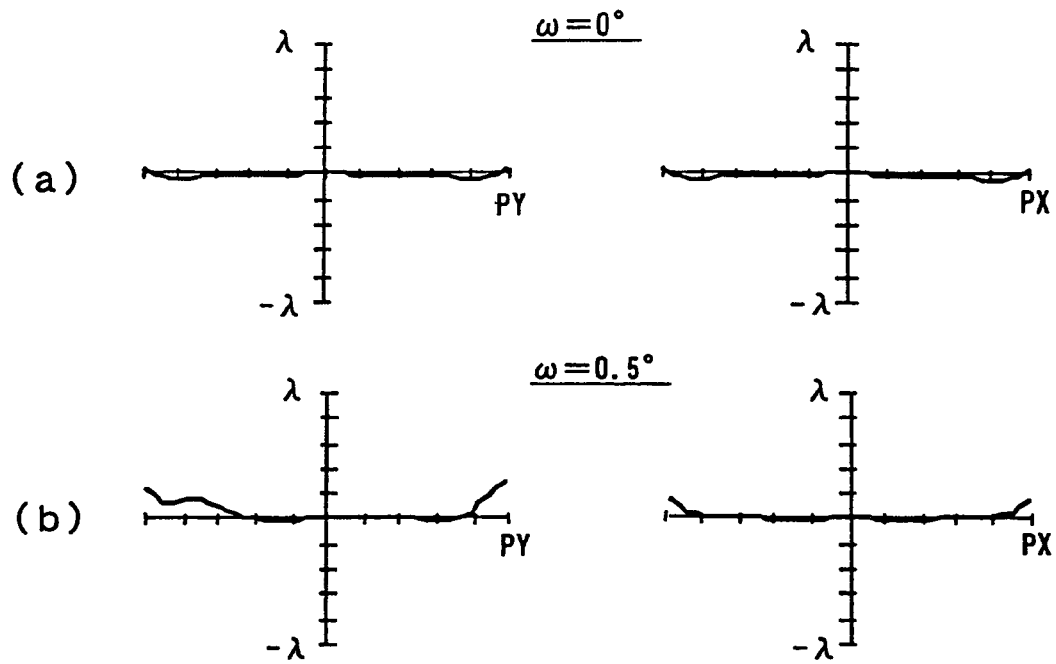
FIG. 46 is a view showing a wavefront aberration when recording or reproducing of HD 30 is carried out with the objective lens 2 of Example 7 under the condition that the incident angle ω of light of wavelength 405 nm is changed.
Figure 47:
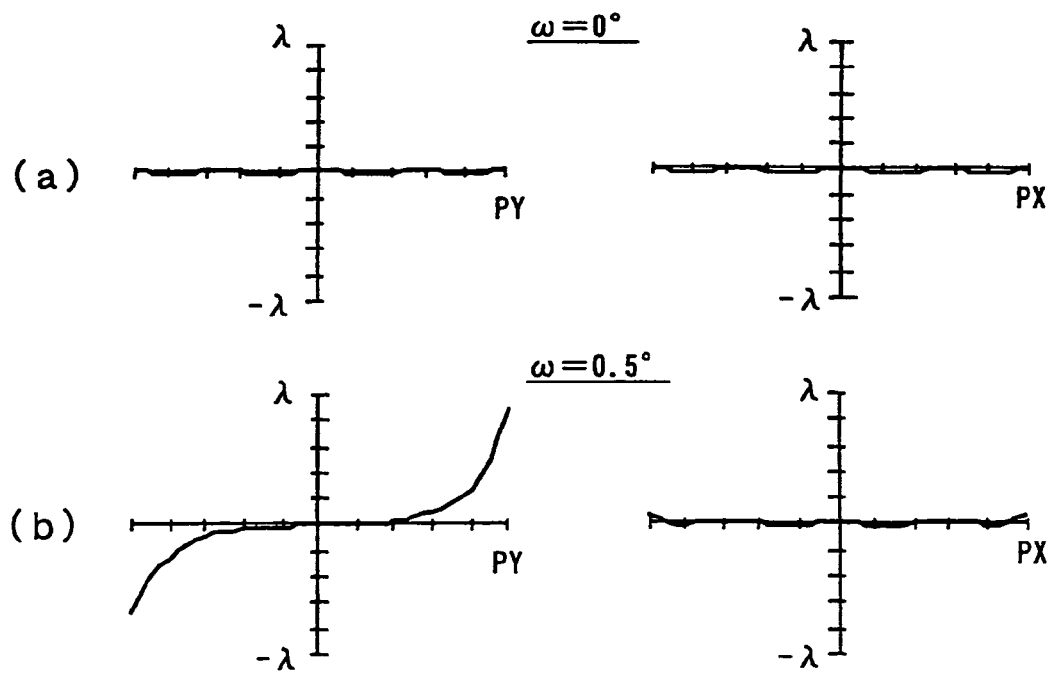
FIG. 47 is a view showing a wavefront aberration when recording or reproducing of DVD 40 is carried out with the objective lens 2 of Example 7 under the condition that the incident angle ω of light of wavelength 655 nm is changed.
Figure 48:
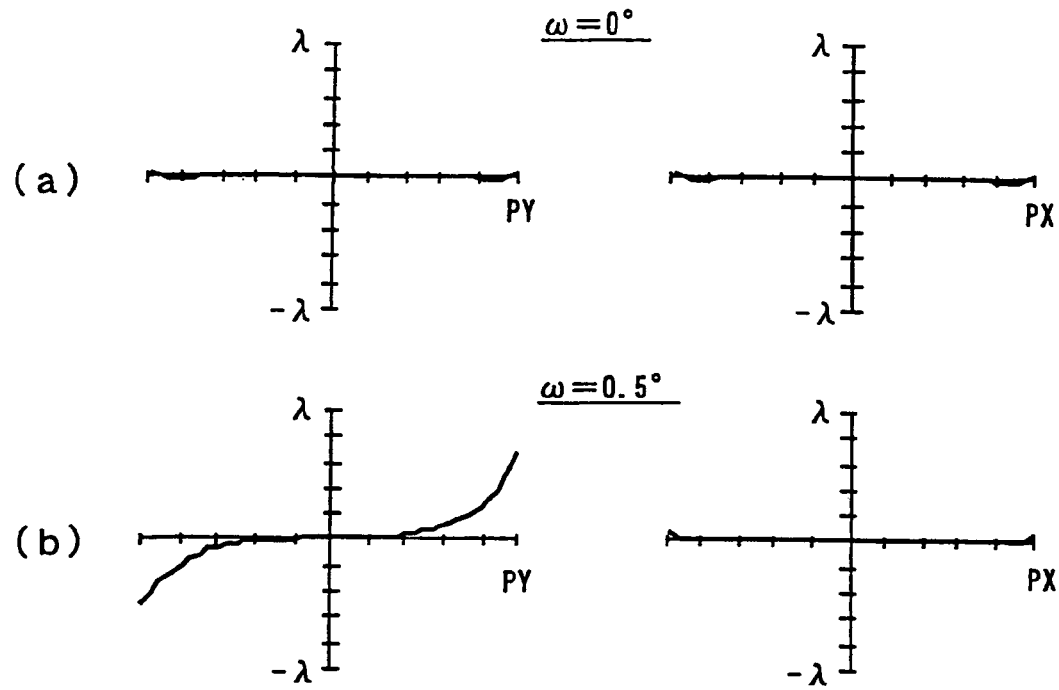
FIG. 48 is a view showing a wavefront aberration when recording or reproducing of CD 50 is carried out with the objective lens 2 of Example 7 under the condition that the incident angle ω of light of wavelength 785 nm is changed.

FIG. 46 is a wavefront aberration diagram at a time of recording or reproducing HD 30 with light of wavelength 405 nm (ω=0.0° in FIG. 46(a) and ω=0.5° in FIG. 46(b)). FIG. 47 is a wavefront aberration diagram in a case of recording of reproducing DVD 40 with light of wavelength 655 nm (ω=0.0° in FIG. 47(a) and ω=0.5° in FIG. 47(b)). FIG. 48 is a wavefront aberration diagram in a case of recording or reproducing CD 50 with light of wavelength 785 nm (ω=0.0° in FIG. 48(a) and ω=0.5° in FIG. 48(b)).

The values of wavefront aberrations at times of recording or reproducing HD, DVD and CD each becomes, as shown in FIGS. 46 to 48, a value within ±1 λ even under the conditions that the incident light angle ω of the laser light is changed from 0.0° to 0.5°.

Figure 49:
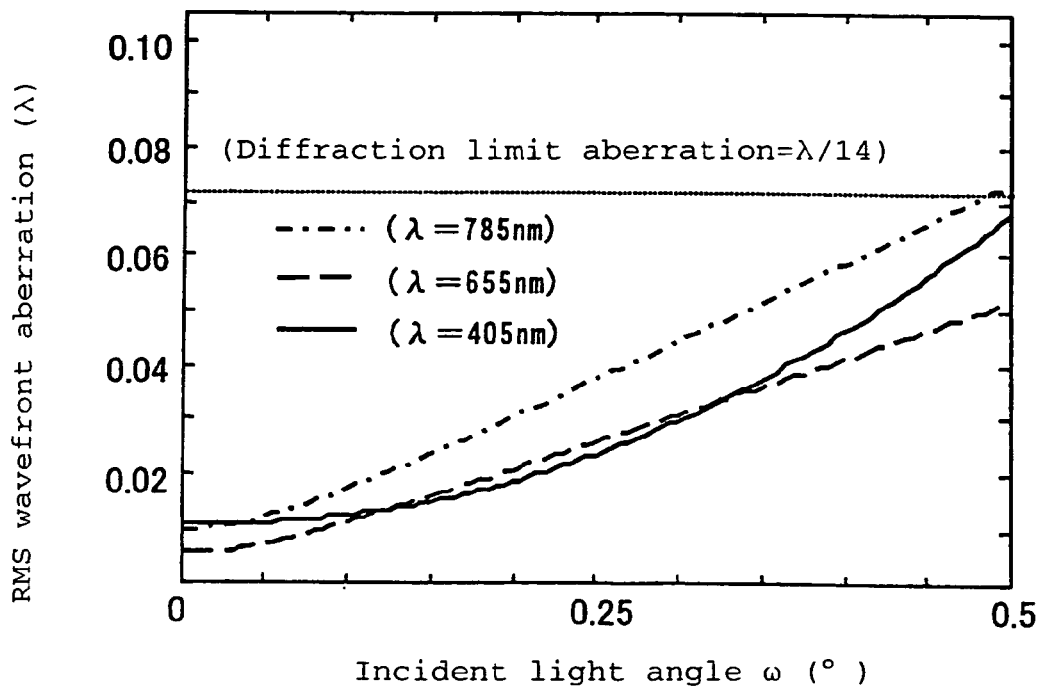
FIG. 49 is a view showing an RMS wavefront aberration of the objective lens 2 of Example 7, in which the angle ω of the incident light is taken as the abscissa.

FIG. 49 is a RMS wavefront aberration diagram whose horizontal axis represents the incident light angle ω, which shows a case of recording or reproducing HD 30 with light of wavelength 405 nm, a case of recording or reproducing DVD 40 with light of wavelength 655 nm and a case of recording or reproducing CD 50 with light of wavelength 785 nm. As shown in FIG. 49, at a time of recording or reproducing HD, RMS wavefront aberration becomes a value within the diffraction limit of at most 0.07λ under the range of the incident light angle ω of from 0.0° to 0.5°. Further, the almost all values of RMS wavefront aberrations at a times of recording or reproducing DVD and CD are each a value within the diffraction limit of at most 0.07 λ, and a good performance is achieved.

Figure 50:
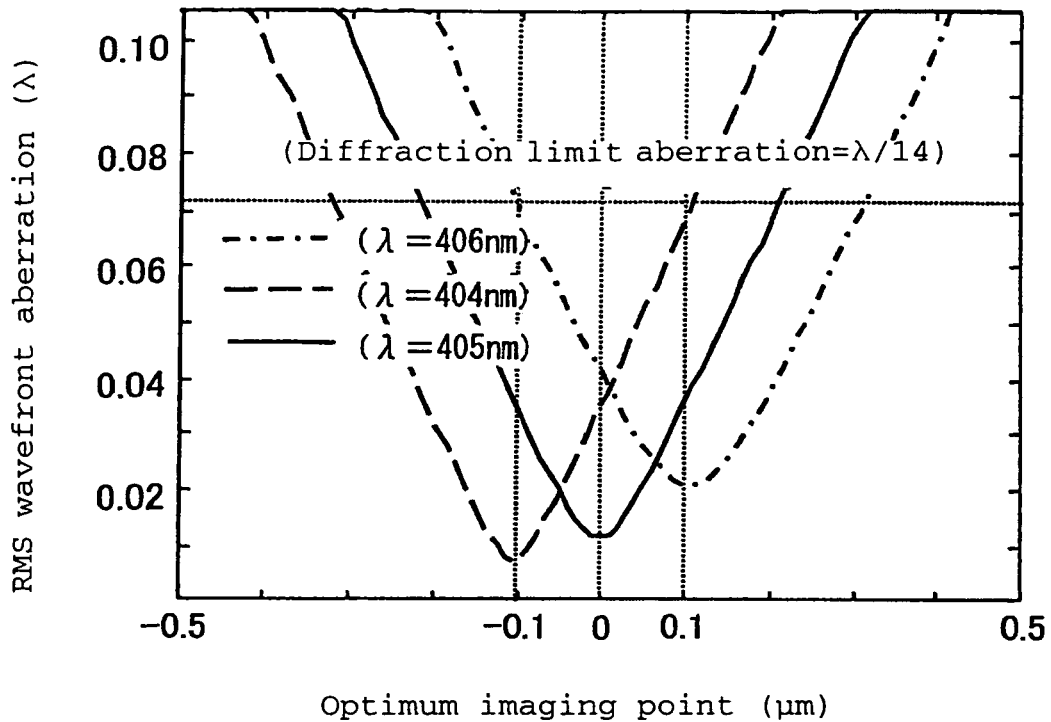
FIG. 50 is a view showing a wavefront aberration in the vicinity of the optimum imaging point in terms of wavefront aberration of the light of wavelength 405 nm when recording or reproducing of HD 30 is carried out with light of wavelengths 405 nm and 405±1 nm with the objective lens 2 of Example 7.

Further, since the wavelength of the laser light source fluctuates by e.g. switching between recording and reproducing or fluctuation of the temperature, the fluctuation of refractive index of the glass material of the objective lens due to the fluctuation of the wavelength becomes larger as the fluctuation of laser is shorter, and as a result, fluctuation of the optimum imaging position or RMS wavefront aberration tends to be large. FIG. 50 is a view showing the wavefront aberration corresponding to ±1 nm fluctuation of the wavelength of blue laser of wavelength 405 nm in such a manner that the position of optimum imaging point at 405 nm is designated as the reference position (0 μm). As understandable from the Figure, the positions of the optimum (minimum) wavefront aberration in terms of RMS wavefront aberration at wavelengths 406 nm and 404 nm only deviate about ±0.1 μm from the position of the optimum (minimum) wavefront aberration at 405 nm, and it is understandable that the device has a good wavelength-dispersion-compensation property.

Figure 51:
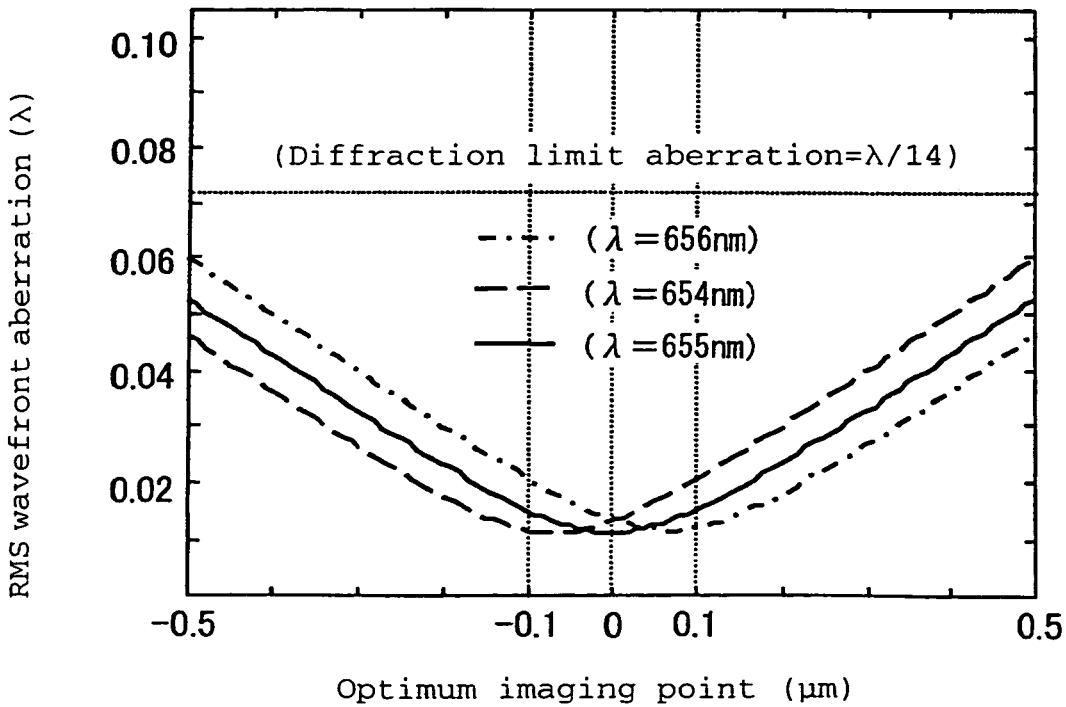
FIG. 51 is a view showing a wavefront aberration in the vicinity of the optimum imaging point in terms of wavefront aberration of the light of wavelength 655 nm when recording or reproducing of DVD 40 is carried out with light of wavelengths 655 nm and 655±1 nm with the objective lens 2 of Example 7.

In the same manner, FIG. 51 shows the wavelength-dispersion-compensation property at wavelength 660 nm. As evident from this, the positions of the optimum (minimum) wavefront aberration in terms of RMS wavefront aberration at wavelengths 656 nm and 654 nm only deviate about ±0.1 μm with respect to the position of the optimum (minimum) wavefront aberration at 665 nm, and it is understandable that device has a good wavelength-dispersion-compensation property.

Figure 52:
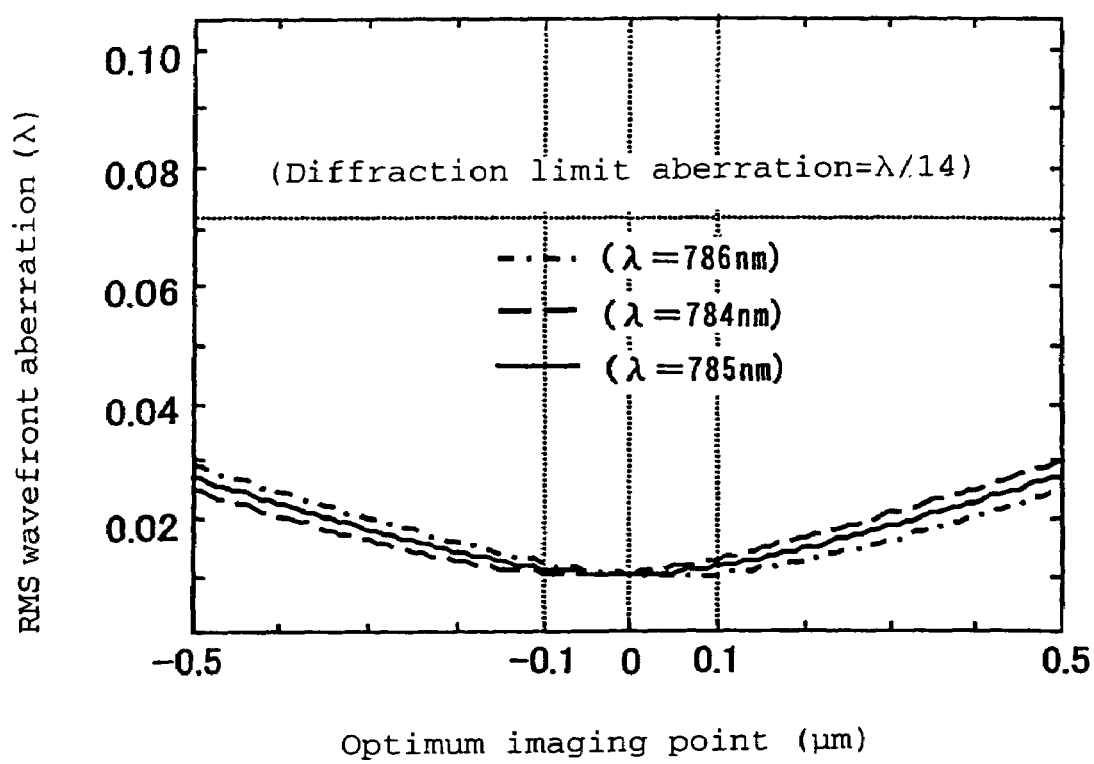
FIG. 52 is a view showing a wavefront aberration in the vicinity of the optimum imaging point in terms of wavefront aberration of the light of wavelength 785 nm when recording or reproducing of CD 50 is carried out with light of wavelengths 785 nm and 785±1 nm with the objective lens 2 of Example 7.

Further in the same manner, FIG. 52 shows the wavelength-dispersion-compensation property at wavelength 785 nm. As evident from this, positions of the optimum (minimum) wavefront aberrations in terms of RMS wavefront aberration at wavelengths 786 nm and 784 nm deviates 0.05 μm with respect to the position of the optimum (minimum) wavefront aberration at 785 nm, and it is understandable that the device has a good wavelength-dispersion-compensation property.

From the foregoing discussions, the objective lens of this Example has a good optical performance for recording or reproducing optical disks with three types of light sources of wavelengths 405 nm, 660 nm and 785 nm corresponding to the optical disks. When recording or reproducing HD 30, DVD 40 and CD 50 are carried out with an optical pickup device employing this objective lens, faithful recording or reproducing can be performed.

TABLE 25

| Surface number | Curvature radius ($R_n$) | Interval between surfaces | Material name |
|---|---|---|---|
| 0 (Light source) | ∞ | (Refer to Table 28) | Air |
| 1 | 2.95647 | 1.969986 (The thickness of reference lens 2a at the center) | K-VC89 |
| 2 | 0.626221 | 0.01 (The thickness of the close-contact lens 2b at the center) | UV-curable resin |
| 3 | 0.626221 | 0.301376 (The thickness of the close-contact lens 2b at the center) | TS-32A |
| 4 | 31.729545 | Working distance (Refer to Table 28) | Air |
| 5 | ∞ | Thickness of protective layer (Refer to Table 28) | Polycarbonate |
| 6 | ∞ | (Information recording plane) | — |

TABLE 26

| Surface of objective lens | Aspherical coefficient of objective lens | | | |
|---|---|---|---|---|
| | First surface | Second surface | Third surface | Fourth surface |
| $K_n$ | −2.3473390 | −1.154704 | −1.154704 | 588.44410 |
| $A_{n1}$ | 0.13967722 | −1.3011574 | −1.3011574 | −0.090987737 |
| $A_{n2}$ | 0.025735051 | 0.42637417 | 0.42637417 | 0.11476777 |
| $A_{n3}$ | 2.9876692E−03 | −0.18667076 | −0.18667076 | 0.048826824 |
| $A_{n4}$ | −1.4112001E−03 | 0.0027118987 | 0.0027118987 | −0.34892066 |
| $A_{n5}$ | 2.1425946E−03 | 0.050905521 | 0.050905521 | 0.46284262 |
| $A_{n6}$ | −1.2919873E−03 | −0.026663171 | −0.026663171 | −0.29826771 |
| $A_{n7}$ | 3.915205E−04 | 5.53542040E−03 | 5.53542040E−03 | 0.096200694 |
| $A_{n8}$ | −4.8386644E−05 | −4.0272974E−04 | −4.0272974E−04 | −0.012541244 |

TABLE 27

| Surface of objective lens | Shape of surface of objective lens (mm) | | | |
|---|---|---|---|---|
| | First surface | Second surface | Third surface | Fourth surface |
| Outer diameter of objective lens (diameter) | 4.50 | 4.50 | 4.50 | 4.50 |
| Surface diameter of objective lens (diameter) | 3.70 | 3.60 | 3.60 | 2.60 |
| Effective diameter of objective lens (diameter) | 3.50 | 3.30 | 3.30 | 2.50 |

TABLE 28

| | Wavelengths to be used, refractive index of material and intervals | | |
|---|---|---|---|
| Wavelength (nm) | 405 | 655 | 785 |
| Focal length (mm) | 2.061 | 2.094 | 2.104 |
| Refractive index of K-VC89 | 1.84452 | 1.80419 | 1.79679 |
| Refractive index of UV-curable resin | 1.54210 | 1.52258 | 1.51925 |
| Refractive index of TS-32A | 2.06728 | 1.97367 | 1.95893 |
| Refractive index of protective layer | 1.62231 | 1.57995 | 1.57326 |
| Numerical aperture | 0.85 | 0.65 | 0.51 |
| Aperture diameter (diameter) (mm) | 3.50 | 2.765 | 2.30 |
| Distance of object point (mm) | ∞ | 37.746 | 19.538 |
| Working distance (mm) | 0.723 | 0.558 | 0.315 |
| Thickness of protective layer (mm) | 0.0875 | 0.60 | 1.20 |

INDUSTRIAL APPLICABILITY

According to the present invention, recording or reproducing of HD, DVD and CD can be performed with the objective lens of the present invention, whereby the construction of an optical pickup device can be simplified, improvement of productivity can be achieved, and miniaturization, weight saving and improvement of precision of the optical pickup device can be achieved.

The objective lens and the optical pickup device of the present invention can compensate wavefront aberration well. Further, since the shape of the objective lens is not too complicated, fabrication is not very difficult and the productivity can be improved. Further, since the thickness of the objective lens in the vicinity of its periphery is maintained, miniaturization of the objective lens is easy.

With the objective lens and the optical pickup device of the present invention, recording or reproducing of a plurality of optical information recording media having different thicknesses and/or refractive indexes of the protective layers, is possible.

The entire disclosure of Japanese Patent Application No. 2002-357564 filed on Dec. 10, 2002 including specification, claims, drawings and summary is incorporated herein by reference in its entirety.

What is claimed is:

1. An objective lens for an optical information recording medium, comprising a reference lens and a close-contact lens bonded or joined so as to be closely in contact or substantially closely in contact with a lens surface of the reference lens, the material of the close-contact lens being a material different from the material of the reference lens, and the lens surface of the reference lens and a lens surface of the close-contact lens each having an aspherical shape, wherein the reference lens has a converging function, and the close-contact lens has a region providing a positive refractive power and a region providing a negative refractive power.

2. An objective lens for an optical information recording medium, comprising a reference lens and a close-contact lens bonded or joined so as to be closely in contact or substantially closely in contact with a lens surface of the reference lens, the material of the contact lens being different from the material of the reference lens, and the lens surface of the reference lens and a lens surface of the close-contact lens each having an aspherical shape, wherein the reference lens has a converging function, and a close-contact lens-outer surface has an aspherical shape where the close-contact lens-outer surface is a surface of the close-contact lens on the side opposite from the reference lens, and the close-contact lens-outer surface has a region in which the aspherical shape of the close-contact lens-outer surface deviates in the direction opposite from the reference lens as the distance from the optical axis increases.

3. An objective lens for an optical information recording medium, comprising a reference lens and a close-contact lens bonded or joined so as to be closely in contact or substantially closely in contact with a lens surface of the reference lens, the material of the close-contact lens being different from the material of the reference lens, and the lens surface of the reference lens and a lens surface of the close-contact lens each having an aspherical shape, wherein the reference lens has a converging function, each surface of the close-contact lens has an aspherical shape, and when a plane perpendicular to the optical axis is designated as a reference plane and an angle between the reference plane and a tangential plane tangential to an optional point within the effective diameter of one surface or both surfaces of the close-contact lens, is designated as θ, the one surface or the both surfaces of the close-contact lens have such a shape that when the optional point is moved from the top of the surface towards the outer periphery, the optional point moves to the side of increasing the thickness of the close-contact lens as the distance from the optical axis increases, and wherein the one surface or the both surfaces of the close-contact lens have such a shape that when the optional point is moved until the outer-most periphery of the effective diameter, the value and the sign of θ change and there is at least one point where θ is 0° other than the top point.

4. The objective lens according to claim 3, wherein each of the both surfaces of the close-contact lens has at least one extreme point where the extreme point is a point that θ becomes 0°, and an extreme point closest to the optical axis among extreme points on a close-contact lens-outer surface is closer to the optical axis than an extreme point closest to the optical axis among extreme points on a close-contact lens-inner surface, where the close-contact lens-inner surface is a surface of the close-contact lens on the side of the reference lens and the close-contact lens-outer surface is a surface of the contact lens on a side opposite from the reference lens.

5. The objective lens according to claim 3, wherein each of the both surfaces of the close-contact lens has at least one extreme point where the extreme point is a point that θ becomes 0°, and an extreme point closest to the optical axis among extreme points on a close-contact lens-inner surface, is closer to the optical axis than an extreme point closest to the optical axis among extreme points on a close-contact lens-outer surface, where the close-contact lens-inner surface is a surface of the close-contact lens on the side of the reference lens, and the close-contact lens-outer surface is a surface of the close-contact lens on the side opposite from the reference lens.

6. The objective lens according to claim 1, wherein the refractive index of the material of the reference lens for light of wavelength from 385 to 825 nm is from 1.75 to 2.20, and the refractive index of the material of the close-contact lens for light of wavelength of from 385 to 825 nm is from 1.20 to 2.20.

7. The objective lens according to claim 1, wherein the outer diameter of the objective lens is from 0.5 to 5.0 mm.

8. The objective lens according to claim 1, wherein where the reference lens-outer surface is a surface of the reference lens on the side opposite from the close-contact lens, the curvature radius of a reference lens-outer surface is from 0.2 to 8.0 mm at the top of the reference lens-outer surface.

9. The objective lens according to claim 1, wherein the refractive index of the reference lens, the aspherical shape of the reference lens, the refractive index of the close-contact lens and the aspherical shape of the close-contact lens are set so as to provide an optimum optical performance at the location of the reference lens on the side of the light source.

10. The objective lens according to claim 9, wherein where the reference lens-outer surface is a surface of the reference lens on the side opposite from the close-contact lens, the curvature radius $R_1$ at the top of the reference lens-outer surface and diameter E of incident light flux satisfy a relation $$0.2 \leq E/R_1 \leq 8.0.$$

11. The objective lens according to claim 9, wherein the fluctuation of the optimum imaging point in terms of root mean square of wavefront aberration is at most ±0.2 μm under the fluctuation of ±1 nm from the center wavelength with respect to the wavelength of light from a light source.

12. The objective lens according to claim 11, wherein the reference lens is configured to have a refractive index smaller than the refractive index of the close-contact lens so that the fluctuation of the optimum imaging point in terms of the root mean square of wavefront aberration becomes at most ±0.1 μm under the fluctuation of ±1 nm from the center wavelength in a case where the center wavelength of light from a light source is within any one of the ranges of from 385 to 425 nm, from 617 to 683 nm and from 745 to 825 nm.

13. The objective lens according to claim 1, wherein the center thickness of the close-contact lens is from 0.01 to 0.50 mm.

14. The objective lens according to claim 1, wherein the center thickness of the reference lens is from 0.5 to 3.0 mm.

15. The objective lens according to claim 2, wherein where the extreme point is a point where θ becomes 0°, the thickness $t_1$ of the close-contact lens at an extreme point and the center thickness $t_0$ of the close-contact lens satisfy a relation $$t_0+(t_0/2)<t_1<4t_0.$$

16. The objective lens according to claim 1, wherein where the reference lens-outer surface is a surface of the reference lens on the side opposite from the close-contact lens, the radius $h_{1max}$ of the effective diameter of a reference lens-outer surface and the maximum depth $z_{1max}$ of the effective diameter of the reference lens-outer surface satisfy a relation $$z_{1max}<h_{1max}.$$

17. The objective lens according to claim 1, wherein where the close-contact lens-inner surface is a surface of the close-contact lens on the side of the reference lens, the radius $h_{2max}$ of the effective diameter of a close-contact lens-inner surface and the maximum depth $z_{2max}$ of the effective diameter of the close-contact lens-inner surface satisfy a relation $$0<z_{2max}<h_{2max}/2.$$

18. The objective lens according to claim 1, wherein the radius $h_{2max}$ of the effective diameter of the close-contact lens-inner surface and the maximum depth $z_{2max}$ of the effective diameter satisfy a relation $$h_{2max}/10 \leq z_{2max} < h_{2max}/2.$$

19. The objective lens according to claim 1, wherein the radius $h_{3max}$ of the effective diameter of a close-contact lens-outer surface and the maximum depth $z_{3max}$ of the effective diameter of the close-contact lens-outer surface satisfy a relation $$h_{3max}/12 \leq z_{3max} < h_{3max}/3,$$

where the close-contact lens-outer surface is a surface of the close-contact lens on the side opposite from the reference lens.

20. The objective lens according to claim 1, wherein the curvature radius $R_1$ (mm) at the top of a reference lens-outer surface and the refractive index $n_1$ of the material of the reference lens satisfy a relation $$0.1 \leq (n_1-1)/R_1 \leq 5.0,$$

where the reference lens-outer surface is a surface of the reference lens on the side opposite from the close-contact lens.

21. The objective lens according to claim 1, wherein the refractive power $\psi_1$ of the reference lens for light of wavelength from 385 nm to 825 nm and a refractive power $\psi_2$ of the material of the close-contact lens for light of wavelength from 385 nm to 825 nm satisfy relations $$0.3 \leq \psi_1 \leq 5.0, \ -5.0 \leq \psi_2 \leq -0.2 \text{ and } |\psi_1+\psi_2| \leq 4.0.$$

22. The objective lens according to claim 1, wherein the center thickness of the close-contact lens is thinner than the thickness of the close-contact lens at a portion other than the center within the effective diameter of the close-contact lens.

23. The close-contact lens according claim 4, wherein the thickness of the close-contact lens at the outermost periphery of the effective diameter is thinner than the thickness of the close-contact lens at the extreme point.

24. The objective lens according to claim 1, wherein when a surface of the reference lens on the side opposite from the close-contact lens is designated as a reference lens-outer surface and a surface of the close-contact lens on the side opposite from the reference lens is designated as a close-contact lens-outer surface, and when the shape of the reference lens-outer surface and the shape of the close-contact lens-outer surface are plotted in a coordinate plane whose vertical axis represents a distance (SAG value) in the direction of the optical axis and whose horizontal axis represents the distance from the optical axis under a condition that a cross-section of the objective lens including the optical axis and in parallel with the optical axis is observed from the direction perpendicular to the cross-section, a curve showing the reference lens-outer surface and a curve showing the close-contact lens-outer surface cross each other when the position of the top of the reference lens-outer surface and the position of the top of the close-contact lens-outer surface are made coincident with each other by moving them in the direction of the optical axis.

25. The objective lens according to claim 1, wherein when a surface of the reference lens on the side opposite from the close-contact lens is designated as a reference lens-outer surface, and a surface of the close-contact lens on the side of the reference lens is designated as a close-contact lens-inner surface, when the shape of the reference lens-outer surface and the shape of the close-contact lens-inner surface are plotted in a coordinate plane whose vertical axis represents a distance (SAG value) in the direction of the optical axis and whose horizontal axis represents the distance from the optical axis under a condition that a cross-section of the objective lens including the optical axis and in parallel with the optical axis, is observed from a direction perpendicular to the cross-section, a region where a curve showing the reference lens-outer surface and a curve showing the close-contact lens-inner surface are in parallel or substantially in parallel, is present when the position of the top of the reference lens-outer surface and the position of the top of the close-contact lens-inner surface are made coincident with each other by moving them in the direction of the optical axis.

26. The objective lens according to claim 1, wherein when a surface of the reference lens on the side opposite from the close-contact lens is designated as a reference lens-outer surface, and a surface of the close-contact lens on the side opposite from the reference lens is designated as a close-contact lens-outer surface, when a coordinate plane whose vertical axis represents an angle and whose horizontal axis represents the distance from the optical axis is provided, and when an angle between a tangential plane tangent to the reference lens-outer surface at an optional point and a reference plane, and an angle between a tangential plane tangent to the close-contact lens-outer surface at an optional point and the reference plane, are plotted as the optional points are moved from the respective tops of the respective surfaces towards the respective outer peripheries where the reference plane is a plane perpendicular to the optical axis, the two plotted curves cross each other.

27. The objective lens according to claim 1, wherein when a surface of the close-contact lens on the side of the reference lens is designated as a close-contact lens-inner surface, and a surface of the close-contact lens on the side opposite from the reference lens is designated as a close-contact lens-outer surface, when a coordinate plane whose vertical axis represents an angle and whose horizontal axis represents the distance from the optical axis is provided, and when an angle between a tangential plane tangent to the close-contact lens-inner surface at an optional point and a reference plane, and an angle between a tangential plane tangent to the close-contact lens-outer surface at an optional point, are plotted as the optional points are moved from the respective tops of the respective surfaces towards the respective outer peripheries where the reference plane is a plane perpendicular to the optical axis, the two plotted curves cross each other.

28. The objective lens according to claim 1, wherein the reference lens and the close-contact lens are bonded to each other via an adhesive layer and the thickness of the adhesive layer is from 0.01 to 20 µm.

29. The objective lens according to claim 1, wherein when the outer diameter of the objective lens is from 0.5 to 5.0 mmΦ, the refractive index of the reference lens, the aspherical shape of the reference lens, the refractive index of the close-contact lens and the aspherical shape of the close-contact lens are configured so that a diameter E of incident light flux of light from the light source and a working distance L between the objective lens and an optical information recording medium, satisfy relations:

$L/E \geq 1/6$ when the wavelength of the light from the light source is from 385 to 425 nm, $L/E \geq 1/6$ when the wavelength from the light from the light source is from 617 to 683 nm, and $L/E \geq 1/10$ when the wavelength from the light from the light source is from 745 to 825 nm.

30. An optical pickup device which converges, for recording or reproducing a blue-laser optical disk, light of wavelength from 385 to 425 nm emitted from a light source on an information recording plane of the blue-laser optical disk through the objective lens as defined in claim 1, and irradiates a photo-receiving element with reflected light from the information recording plane through the objective lens to record or reproduce data of the information recording plane, which converges, for recording or reproducing a digital video disk, light of wavelength from 617 to 683 nm from a light source on an information recording plane of the digital video disk through the objective lens, and irradiates a photo-receiving element with reflected light from the information recording plane through the objective lens to record or reproduce data of the information recording plane, and which converges, for recording or reproducing a compact disk, light of wavelength from 745 to 825 nm from a light source on an information recording plane of the compact disk through the objective lens, and irradiates a photo-receiving element with reflected light from the information recording plane through the objective lens to record or to reproduce data of the information recording plane.

31. An optical pickup device which converts, for recording or reproducing blue-laser optical disk or a digital video disk, light from a light source into a parallel light, transmits the light through the objective lens as defined in claim 1, and converges it on an information recording plane of the blue-laser optical disk or on an information recording plane of the digital video disk, and irradiates a photo-receiving element with reflected light from the information recording plane of the blue-laser optical disk or from the information recording plane of the digital video disk through the objective lens to record or reproduce data of the information recording plane, and which, for recording or reproducing a compact disk, makes light from a light source incident in the objective lens as a divergent light and transmits it through the objective lens so as to converge the light on an information recording plane of the compact disk, and irradiates a photo-receiving element with reflected light from the compact disk through the objective lens to record or reproduce data of the information recording plane.

* * * * *